US012664263B1

(12) United States Patent
Bhat et al.

(10) Patent No.: US 12,664,263 B1
(45) Date of Patent: Jun. 23, 2026

(54) KERNEL-LEVEL MONITORING FOR SOFTWARE APPLICATIONS

(71) Applicant: Citibank, N.A., New York, NY (US)

(72) Inventors: Ganesh Prasad Bhat, West Orange, NJ (US); James Randolph Myers, Clearwater Beach, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/455,564

(22) Filed: Jan. 21, 2026

Related U.S. Application Data

(63) Continuation of application No. 19/375,898, filed on Oct. 31, 2025.

(51) Int. Cl.
G06F 21/55 (2013.01)
G06F 21/53 (2013.01)

(52) U.S. Cl.
CPC ............ G06F 21/552 (2013.01); G06F 21/53 (2013.01); *G06F 2221/034* (2013.01)

(58) Field of Classification Search
CPC ... G06F 21/552; G06F 21/53; G06F 2221/034
See application file for complete search history.

(56) References Cited

U.S. PATENT DOCUMENTS

| | | | |
|---|---|---|---|
| 11,861,423 B1 * | 1/2024 | Potyraj | G06F 9/3877 |
| 2022/0327219 A1 * | 10/2022 | Choi | G06F 21/575 |
| 2023/0259399 A1 * | 8/2023 | Rao | G06F 11/3442 |
| | | | 718/104 |

* cited by examiner

*Primary Examiner* — Amie C. Lin
(74) *Attorney, Agent, or Firm* — Perkins Coie LLP; Sumedha Ahuja; Willa Wu

(57) ABSTRACT

The systems and methods disclosed herein monitor application (e.g., artificial intelligence (AI) model) operations using interactions between the application and a kernel. The systems and methods disclosed herein intercept, using a kernel interface, one or more function invocations transmitted from the application (e.g., an AI model without model modification). Event record(s) are generated for one or more functions to define process identifiers, resource interaction types, timestamps, and/or resource identifiers. Observed pattern(s) for the application are identified by comparing current event record(s) with previous record(s), and the identified observed pattern(s) are evaluated against reference pattern(s) to generate score(s). Data packet(s) that indicate observed pattern(s), corresponding score(s), and/or cryptographic digital fingerprint(s) of the one or more functions are generated. The data packet(s) are transmitted to distributed ledgers for immutable storage.

20 Claims, 27 Drawing Sheets

100

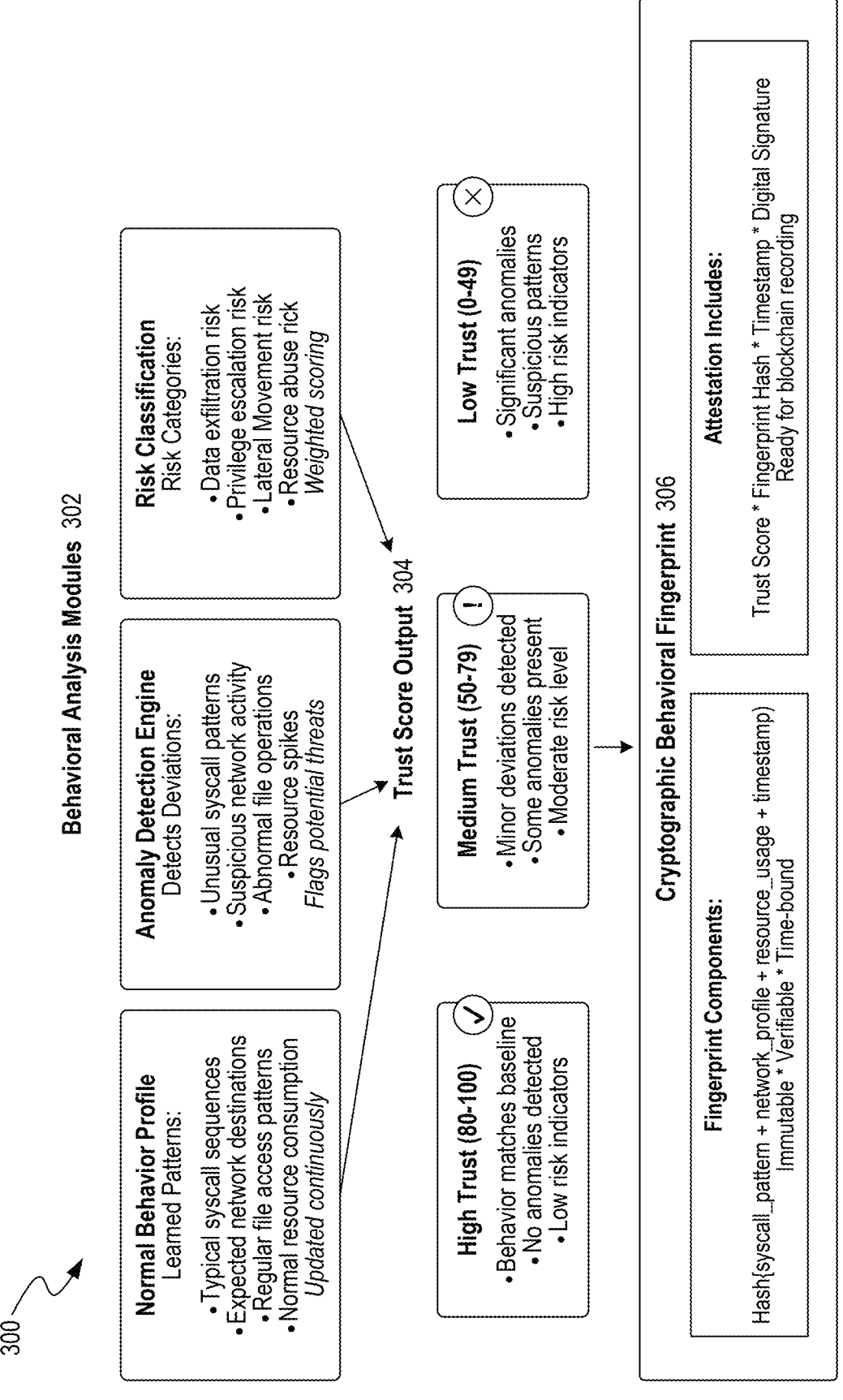

Behavioral Analysis Modules 302

Normal Behavior Profile
Learned Patterns:

• Typical syscall sequences
• Expected network destinations
• Regular file access patterns
• Normal resource consumption
  *Updated continuously*

Anomaly Detection Engine
Detects Deviations:

• Unusual syscall patterns
• Suspicious network activity
• Abnormal file operations
  • Resource spikes
  *Flags potential threats*

Risk Classification
Risk Categories:

• Data exfiltration risk
• Privilege escalation risk
• Lateral Movement risk
• Resource abuse rick
  *Weighted scoring*

Trust Score Output 304

High Trust (80-100) ✓
• Behavior matches baseline
• No anomalies detected
• Low risk indicators

Medium Trust (50-79) !
• Minor deviations detected
• Some anomalies present
• Moderate risk level

Low Trust (0-49) ✕
• Significant anomalies
• Suspicious patterns
• High risk indicators

Cryptographic Behavioral Fingerprint 306

Fingerprint Components:

Hash[syscall_pattern + network_profile + resource_usage + timestamp)
Immutable * Verifiable * Time-bound

Attestation Includes:

Trust Score * Fingerprint Hash * Timestamp * Digital Signature
Ready for blockchain recording

Figure 5:
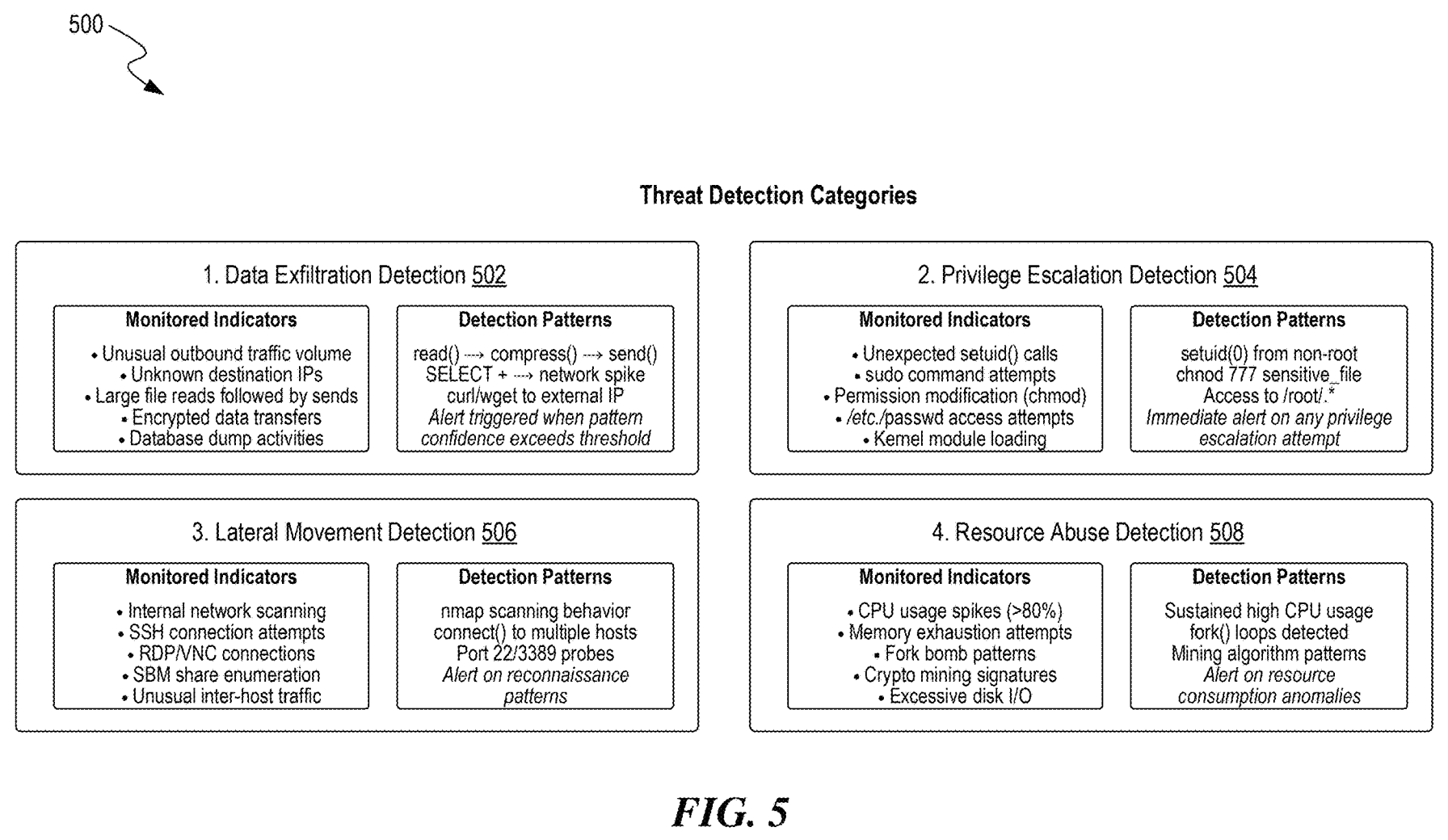

Threat Detection Categories

1. Data Exfiltration Detection 502

Monitored Indicators
- Unusual outbound traffic volume
- Unknown destination IPs
- Large file reads followed by sends
- Encrypted data transfers
- Database dump activities Detection Patterns
read() → compress() → send()
SELECT + → network spike
curl/wget to external IP
*Alert triggered when pattern confidence exceeds threshold*

2. Privilege Escalation Detection 504

Monitored Indicators
- Unexpected setuid() calls
- sudo command attempts
- Permission modification (chmod)
- /etc./passwd access attempts
- Kernel module loading Detection Patterns
setuid(0) from non-root
chmod 777 sensitive_file
Access to /root/.*
*Immediate alert on any privilege escalation attempt*

3. Lateral Movement Detection 506

Monitored Indicators
- Internal network scanning
- SSH connection attempts
- RDP/VNC connections
- SBM share enumeration
- Unusual inter-host traffic Detection Patterns
nmap scanning behavior
connect() to multiple hosts
Port 22/3389 probes
*Alert on reconnaissance patterns*

4. Resource Abuse Detection 508

Monitored Indicators
- CPU usage spikes (>80%)
- Memory exhaustion attempts
- Fork bomb patterns
- Crypto mining signatures
- Excessive disk I/O Detection Patterns
Sustained high CPU usage
fork() loops detected
Mining algorithm patterns
*Alert on resource consumption anomalies*

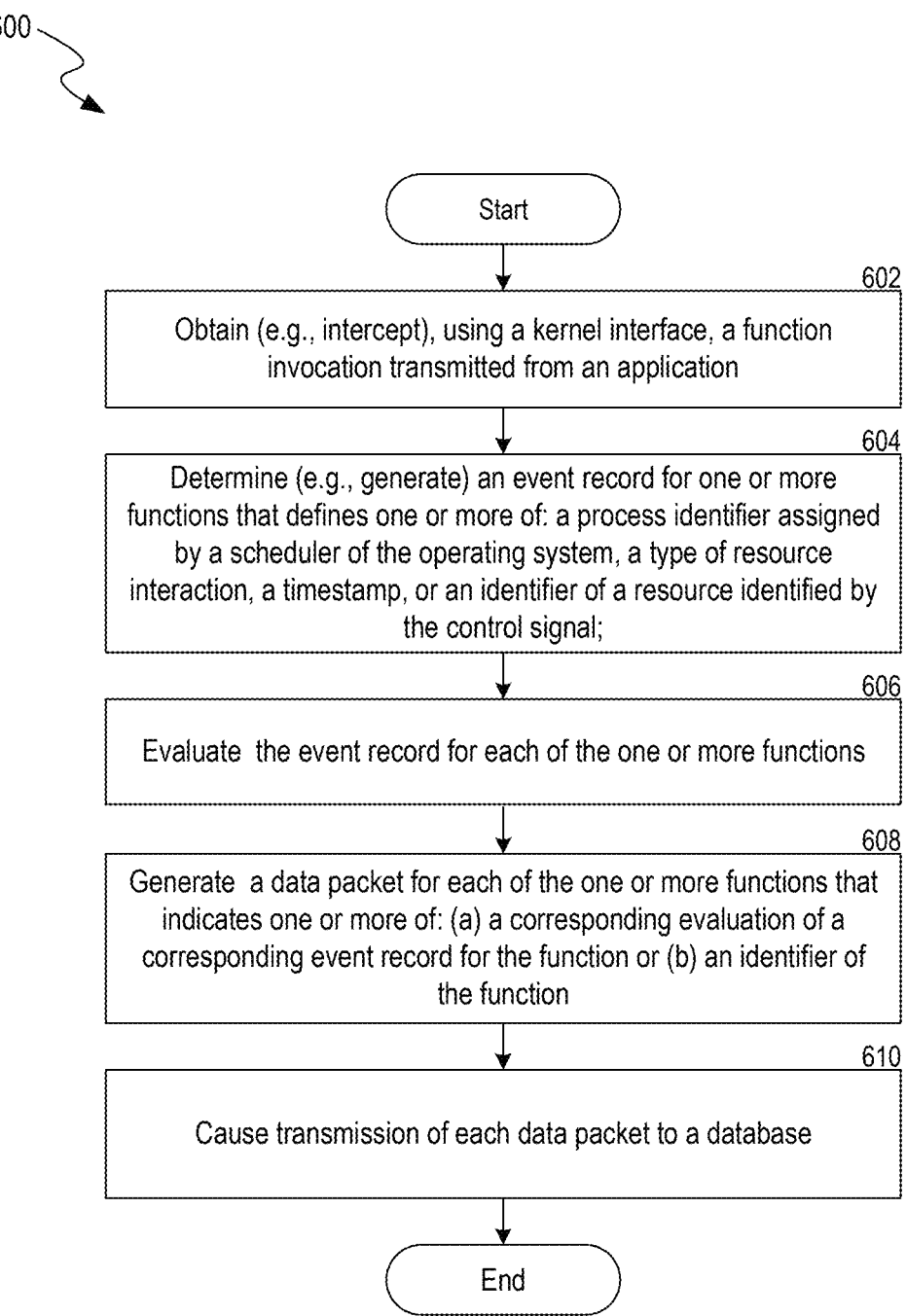

Start

602

Obtain (e.g., intercept), using a kernel interface, a function invocation transmitted from an application

604

Determine (e.g., generate) an event record for one or more functions that defines one or more of: a process identifier assigned by a scheduler of the operating system, a type of resource interaction, a timestamp, or an identifier of a resource identified by the control signal;

606

Evaluate the event record for each of the one or more functions

608

Generate a data packet for each of the one or more functions that indicates one or more of: (a) a corresponding evaluation of a corresponding event record for the function or (b) an identifier of the function

610

Cause transmission of each data packet to a database

End

*FIG. 6*

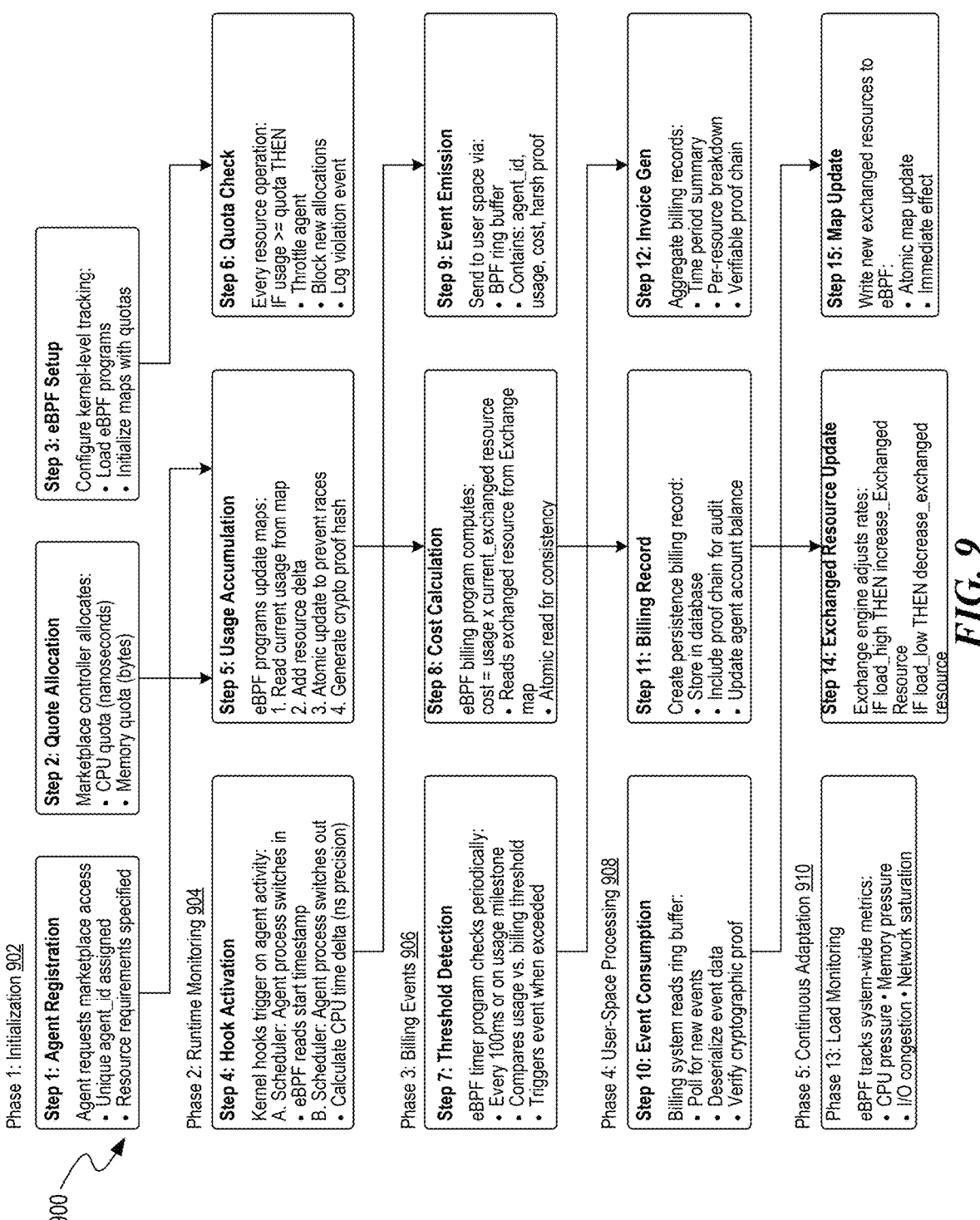

Phase 1: Initialization 902

Step 1: Agent Registration
Agent requests marketplace access
- Unique agent_id assigned
- Resource requirements specified

Step 2: Quote Allocation
Marketplace controller allocates:
- CPU quota (nanoseconds)
- Memory quota (bytes)

Step 3: eBPF Setup
Configure kernel-level tracking:
- Load eBPF programs
- Initialize maps with quotas

Phase 2: Runtime Monitoring 904

Step 4: Hook Activation
Kernel hooks trigger on agent activity:
A. Scheduler: Agent process switches in
- eBPF reads start timestamp
B. Scheduler: Agent process switches out
- Calculate CPU time delta (ns precision)

Step 5: Usage Accumulation
eBPF programs update maps:
1. Read current usage from map
2. Add resource delta
3. Atomic update to prevent races
4. Generate crypto proof hash

Step 6: Quota Check
Every resource operation:
IF usage >= quota THEN
- Throttle agent
- Block new allocations
- Log violation event

Phase 3: Billing Events 906

Step 7: Threshold Detection
eBPF timer program checks periodically:
- Every 100ms or on usage milestone
- Compares usage vs. billing threshold
- Triggers event when exceeded

Step 8: Cost Calculation
eBPF billing program computes:
cost = usage x current_exchanged resource
- Reads exchanged resource from Exchange map
- Atomic read for consistency

Step 9: Event Emission
Send to user space via:
- BPF ring buffer
- Contains: agent_id, usage, cost, harsh proof
- Verifiable proof chain

Phase 4: User-Space Processing 908

Step 10: Event Consumption
Billing system reads ring buffer:
- Poll for new events
- Deserialize event data
- Verify cryptographic proof

Step 11: Billing Record
Create persistence billing record:
- Store in database
- Include proof chain for audit
- Update agent account balance

Step 12: Invoice Gen
Aggregate billing records:
- Time period summary
- Per-resource breakdown
- Verifiable proof chain

Phase 5: Continuous Adaptation 910

Phase 13: Load Monitoring
eBPF tracks system-wide metrics:
- CPU pressure • Memory pressure
- I/O congestion • Network saturation

Step 14: Exchanged Resource Update
Exchange engine adjusts rates:
IF load_high THEN increase_Exchanged Resource
IF load_low THEN decrease_exchanged resource

Step 15: Map Update
Write new exchanged resources to eBPF:
- Atomic map update
- Immediate effect

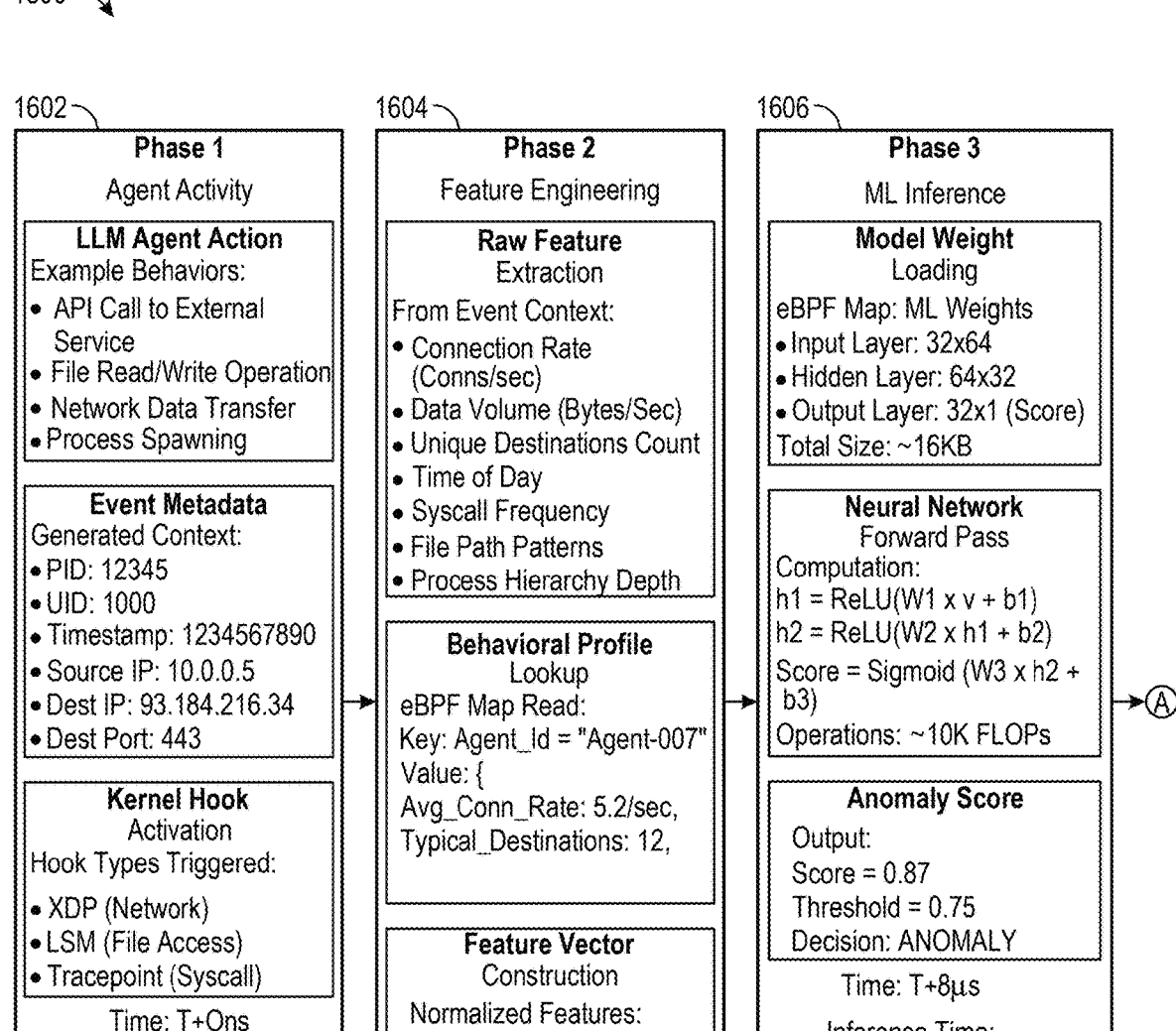

Phase 1

Agent Activity

LLM Agent Action
Example Behaviors:
- API Call to External Service
- File Read/Write Operation
- Network Data Transfer
- Process Spawning

Event Metadata
Generated Context:
- PID: 12345
- UID: 1000
- Timestamp: 1234567890
- Source IP: 10.0.0.5
- Dest IP: 93.184.216.34
- Dest Port: 443

Kernel Hook
Activation
Hook Types Triggered:
- XDP (Network)
- LSM (File Access)
- Tracepoint (Syscall)

Time: T+0ns
Kernel Context Switch:
<100ns

Phase 2

Feature Engineering

Raw Feature
Extraction
From Event Context:
- Connection Rate (Conns/sec)
- Data Volume (Bytes/Sec)
- Unique Destinations Count
- Time of Day
- Syscall Frequency
- File Path Patterns
- Process Hierarchy Depth

Behavioral Profile
Lookup
eBPF Map Read:
Key: Agent_Id = "Agent-007"
Value: {
Avg_Conn_Rate: 5.2/sec,
Typical_Destinations: 12,

Feature Vector
Construction
Normalized Features:
V = [0.85, 1.2, 0.3, 0.9, ...]
Dimension: 32 Features
Scale: [0. 1] Range Time: T+2μs
Feature Extraction:
~2 Microseconds

Phase 3

ML Inference

Model Weight
Loading
eBPF Map: ML Weights
- Input Layer: 32x64
- Hidden Layer: 64x32
- Output Layer: 32x1 (Score)
Total Size: ~16KB

Neural Network
Forward Pass
Computation:
h1 = ReLU(W1 x v + b1)
h2 = ReLU(W2 x h1 + b2)
Score = Sigmoid (W3 x h2 + b3)
Operations: ~10K FLOPs

Anomaly Score
Output:
Score = 0.87
Threshold = 0.75
Decision: ANOMALY

Time: T+8μs

Inference Time:
~6 Microseconds (A)

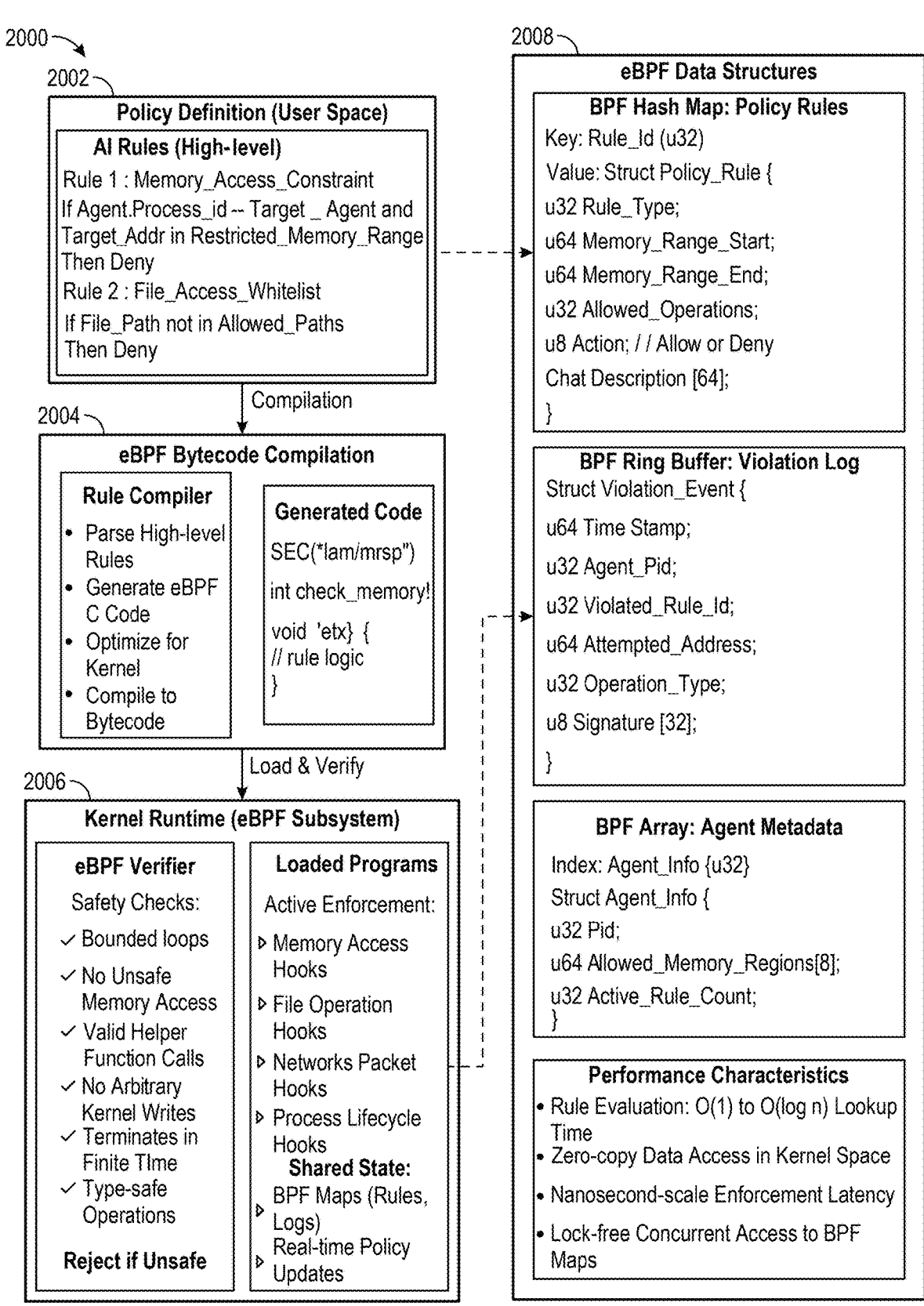

2000

2002

Policy Definition (User Space)

AI Rules (High-level)

Rule 1 : Memory_Access_Constraint

If Agent.Process_id -- Target _ Agent and Target_Addr in Restricted_Memory_Range Then Deny Rule 2 : File_Access_Whitelist If File_Path not in Allowed_Paths Then Deny Compilation

2004 eBPF Bytecode Compilation

Rule Compiler

- Parse High-level Rules
- Generate eBPF C Code
- Optimize for Kernel
- Compile to Bytecode

Generated Code

SEC(*lam/mrsp")

int check_memory!

void 'etx} {
// rule logic
}

Load & Verify

2006

Kernel Runtime (eBPF Subsystem)

eBPF Verifier

Safety Checks:

✓ Bounded loops

✓ No Unsafe Memory Access

✓ Valid Helper Function Calls

✓ No Arbitrary Kernel Writes

✓ Terminates in Finite TIme

✓ Type-safe Operations

Reject if Unsafe

Loaded Programs

Active Enforcement:

▷ Memory Access Hooks

▷ File Operation Hooks

▷ Networks Packet Hooks

▷ Process Lifecycle Hooks

Shared State:

▷ BPF Maps (Rules, Logs)

▷ Real-time Policy Updates

2008 eBPF Data Structures

BPF Hash Map: Policy Rules

Key: Rule_Id (u32)

Value: Struct Policy_Rule { u32 Rule_Type;

u64 Memory_Range_Start;

u64 Memory_Range_End;

u32 Allowed_Operations;

u8 Action; / / Allow or Deny

Chat Description [64];

}

BPF Ring Buffer: Violation Log

Struct Violation_Event { u64 Time Stamp;

u32 Agent_Pid;

u32 Violated_Rule_Id;

u64 Attempted_Address;

u32 Operation_Type;

u8 Signature [32];

}

BPF Array: Agent Metadata

Index: Agent_Info {u32}

Struct Agent_Info { u32 Pid;

u64 Allowed_Memory_Regions[8];

u32 Active_Rule_Count;

}

Performance Characteristics

- Rule Evaluation: O(1) to O(log n) Lookup Time
- Zero-copy Data Access in Kernel Space
- Nanosecond-scale Enforcement Latency
- Lock-free Concurrent Access to BPF Maps

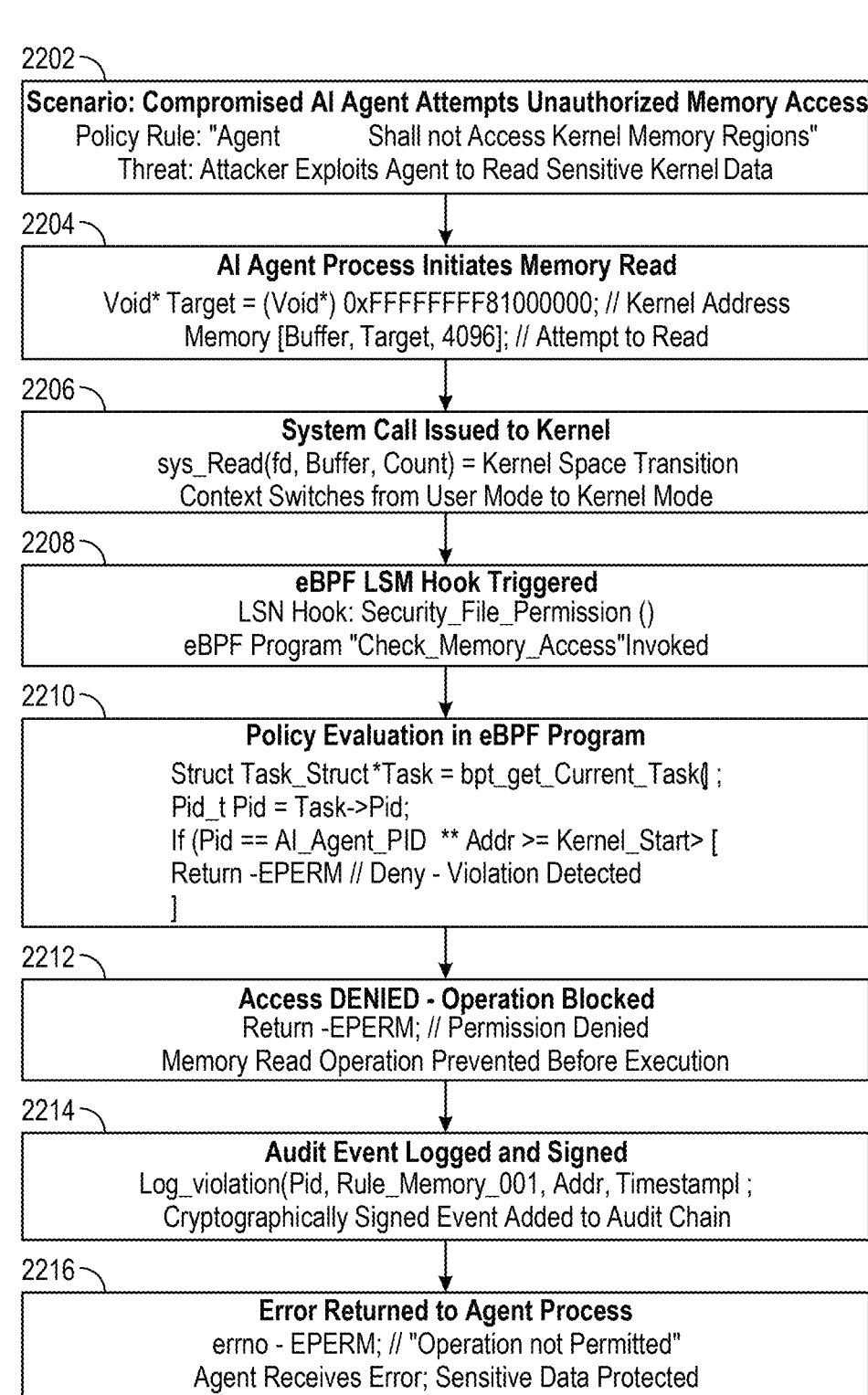

2202

Scenario: Compromised AI Agent Attempts Unauthorized Memory Access
Policy Rule: "Agent     Shall not Access Kernel Memory Regions"
Threat: Attacker Exploits Agent to Read Sensitive Kernel Data

2204

AI Agent Process Initiates Memory Read
Void* Target = (Void*) 0xFFFFFFFF81000000; // Kernel Address
Memory [Buffer, Target, 4096]; // Attempt to Read

2206

System Call Issued to Kernel
sys_Read(fd, Buffer, Count) = Kernel Space Transition
Context Switches from User Mode to Kernel Mode

2208 eBPF LSM Hook Triggered
LSN Hook: Security_File_Permission ()
eBPF Program "Check_Memory_Access"Invoked

2210

Policy Evaluation in eBPF Program
Struct Task_Struct*Task = bpt_get_Current_Task() ;
Pid_t Pid = Task->Pid;
If (Pid == AI_Agent_PID ** Addr >= Kernel_Start> [
Return -EPERM // Deny - Violation Detected
]

2212

Access DENIED - Operation Blocked
Return -EPERM; // Permission Denied
Memory Read Operation Prevented Before Execution

2214

Audit Event Logged and Signed
Log_violation(Pid, Rule_Memory_001, Addr, Timestampl ;
Cryptographically Signed Event Added to Audit Chain

2216

Error Returned to Agent Process
errno - EPERM; // "Operation not Permitted"
Agent Receives Error; Sensitive Data Protected

*FIG. 22*

KERNEL-LEVEL MONITORING FOR SOFTWARE APPLICATIONS

CROSS-REFERENCE TO RELATED APPLICATIONS

This application is a continuation of U.S. application Ser. No. 19/375,898, titled "KERNEL-LEVEL MONITORING FOR SOFTWARE APPLICATIONS", and filed Oct. 31, 2025, the entirety of which is incorporated herein by reference.

BACKGROUND

A kernel is a computer program within an operating system that operates with the highest level of system privileges and provides services to other software running on a computer system. The kernel executes in a protected memory region referred to as kernel space where the kernel has unrestricted access to system resources such as physical memory, processor registers, hardware devices, and so forth. Kernel code can directly manipulate hardware components (e.g., network interfaces, storage controllers, memory management units). The kernel operates as the intermediary between a software application and computer hardware. System calls enable software applications to request services without direct hardware manipulation.

A user space represents the restricted execution environment where application programs and user processes operate with limited privileges and controlled access to system resources. User space processes execute in virtual memory spaces that are isolated from each other and from kernel memory to prevent unauthorized access to system resources. Rather than directly accessing hardware devices, modifying system configurations, or manipulating kernel data structures, applications running in user space instead request these services from the kernel via system call interfaces that provide controlled access to system functionality. However, malicious applications can exploit this system call interface to access kernel space resources, by, for example, bypassing user space security controls or manipulating system resources at the kernel level to conceal malicious activities and evade detection by user space monitoring systems.

BRIEF DESCRIPTION OF THE DRAWINGS

FIG. 3 shows a schematic illustrating an example environment of a behavioral analysis engine used by a kernel-based management platform to score AI agents, in accordance with some implementations of the present technology.

FIG. 5 shows a schematic illustrating an example environment of a threat detection module implemented by a kernel-based management platform to detect threatening agent activities, in accordance with some implementations of the present technology.

FIG. 6 is a flow diagram illustrating an example process of monitoring AI model operations using a kernel-based management platform, in accordance with some implementations of the present technology.

FIG. 9 is a flow diagram illustrating an example process of managing resources using a kernel-based management platform, in accordance with some implementations of the present technology.

FIG. 20 is a block diagram showing an example rules transformation for a guideline-based security engine used by a kernel-based management platform, in accordance with some implementations of the present technology.

FIG. 22 is a block diagram illustrating a use case for a guideline-based security engine used by a kernel-based management platform, in accordance with one or more implementations of the present technology.

Figure 1:
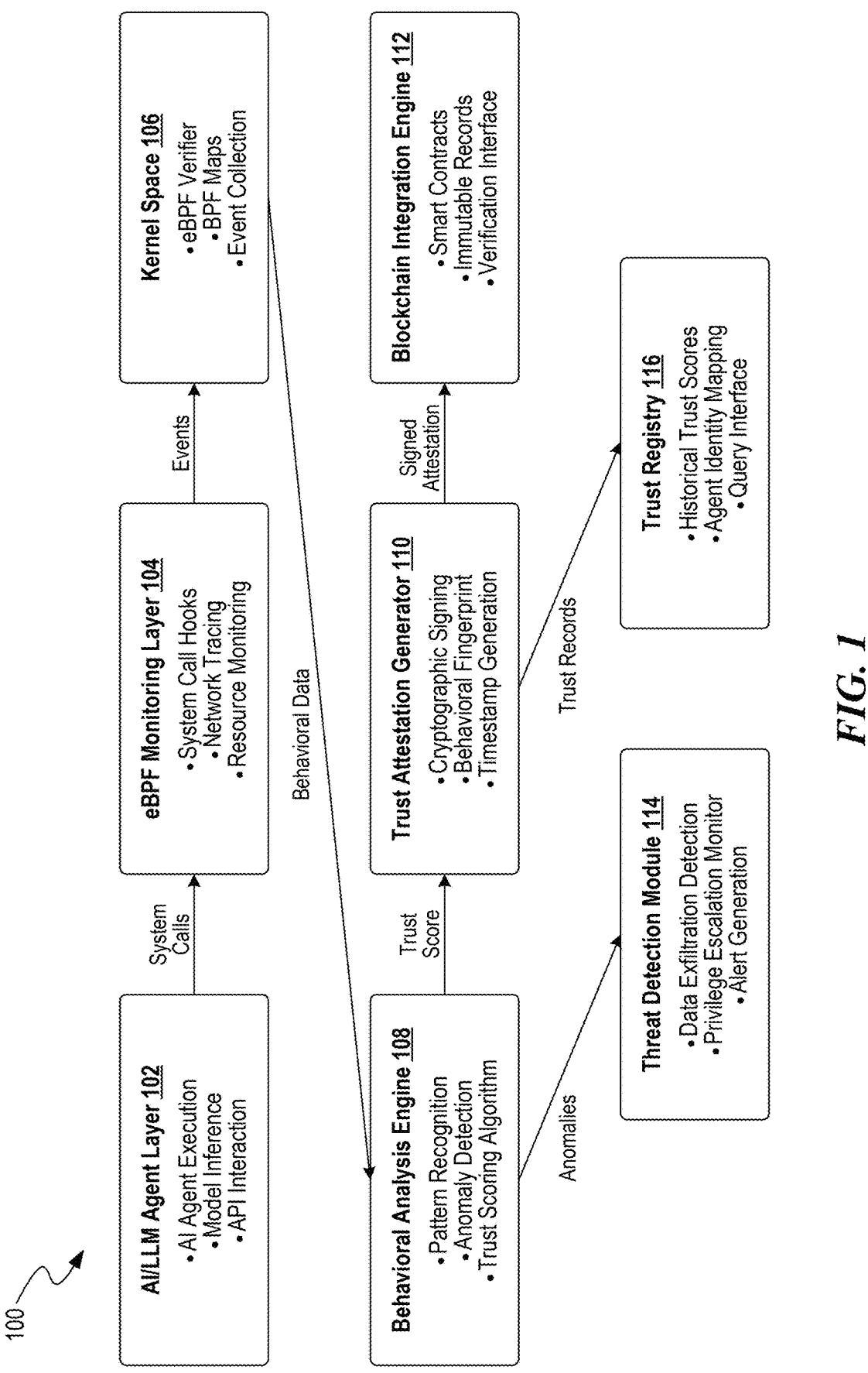
FIG. 1 shows a schematic illustrating an example environment of an architecture of a kernel-based management platform used to monitor AI agents, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained.

In contrast, an artificial intelligence (AI) agentic model ("agent"), whether autonomous or semi-autonomous, refers to a persistent software and/or hardware entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks. The actions autonomously executed by agents are responsive to their respective objective functions. For example, an agent's objective function may direct the agent to minimize task completion latency. During autonomous execution, the agent can determine a degree of expected utility of candidate actions by evaluating the actions against the agent's objective function and select executable actions that align with the agent's assigned objectives within the imposed operational constraints or boundaries set by a system the agent is interacting with.

Some traditional application monitoring approaches for applications (e.g., software applications, AI agent applications, AI model applications) rely on instrumentation that embed monitoring code directly within the application software through code modification, library injection, and/or runtime hooks that execute alongside the primary application logic. Instrumentation-based monitoring typically require developers to manually insert monitoring calls throughout the application code, with these monitoring functions executing within the same user space process context as the monitored application and relying on user space libraries and frameworks for data collection and analysis. These approaches therefore operate at the application layer of the operating system stack.

However, using these traditional application monitoring approaches, malicious or unauthorized agent behaviors typically are detected only after the actions have already been executed and potentially caused damage to system resources or compromised sensitive data. This delayed detection occurs because traditional monitoring systems operate in user space, and therefore typically require data to be transferred from kernel space to user space for evaluation and/or validation. This introduces latencies during which malicious operations can complete. In some examples, when an application performs a system call, while the operation executes in kernel space, traditional monitoring approaches require the kernel to log event data to user space accessible buffers, and rely on a separate user space monitoring process to detect, retrieve, and evaluate the data. This multi-step process creates a temporal gap where the original agent operation may have already completed its execution of malicious operations before the user space monitoring process can evaluate the behavior and implement protective measures. In some examples, a malicious agent can exploit this latency window by rapidly issuing thousands of individually valid system calls that collectively constitute an attack pattern, such as establishing numerous network connections to exfiltrate data. While each individual system call appears legitimate and executes successfully in kernel space, the user space monitoring process cannot evaluate the aggregate pattern quickly enough to detect the malicious behavior, thereby enabling the malicious agent to complete substantial portions of data theft, privilege escalation, or resource exhaustion attacks before the user space monitoring process recognizes the threat pattern.

Some traditional application monitoring approaches for agent applications and model applications rely on Software Development Kit (SDK) integration techniques that require developers to incorporate third-party monitoring libraries and frameworks directly into their application codebase. SDK-based monitoring, however, creates significant coupling between the application and monitoring infrastructure because the monitoring SDK typically requires the application to load monitoring libraries into its memory space and execute monitoring code within the same process context as the primary application functionality. The tight coupling introduces reliability risks because SDK bugs or failures can crash the entire application. Furthermore, because the monitoring code executes with the same privileges as the application, malicious applications can manipulate monitoring data by calling SDK functions with false information, disabling monitoring components through API manipulation, or otherwise exploiting SDK vulnerabilities to gain unauthorized access to system resources. In addition, applications are rebuilt and redeployed whenever monitoring requirements change, leading to increased development overhead and service disruptions.

Further, some traditional application monitoring approaches for applications rely on agent modification that require direct alteration of the software that embed monitoring functionality within the execution environment (e.g., an agent's execution environment). Agent modification approaches typically include inserting monitoring hooks at specific execution points within the agent code, modifying agent initialization routines to establish monitoring connections, and/or integrating monitoring libraries that execute as part of the agent's process space to collect behavioral data and performance metrics. This approach creates significant deployment challenges because each agent is individually modified. The modification process introduces compatibility risks because monitoring code changes can conflict with agent updates. The approach creates maintenance overhead because monitoring modifications are updated whenever agents are upgraded.

As such, the inventors have developed systems (hereinafter "kernel-based management platform") and related methods to monitor application operations (e.g., an AI application, an agent application, a software application) using kernel commands. The kernel-based management platform can obtain (e.g., intercept), using a kernel interface, one or more function invocations (e.g., without model modification). The kernel interface can be structured to manage communications with the kernel of an operating system. The kernel-based management platform can generate event record(s) for one or more functions to define process identifiers, resource interaction types, timestamps, and/or resource identifiers. To evaluate the event record(s), the kernel-based management platform can identify observed pattern(s) for the application by comparing current event record(s) with previous record(s), and the identified observed pattern(s) can be evaluated against reference pattern(s) to generate score(s). The kernel-based management platform can generate data packet(s) that indicate observed pattern(s), corresponding score(s), and/or cryptographic digital fingerprint(s) of the one or more functions. The kernel-based management platform can cause transmission of the data packet(s) to distributed ledgers for immutable storage.

The kernel-based management platform can operate at the kernel level without awareness or cooperation from the monitored applications (e.g., monitored AI agents) through extended Berkeley Packet Filter (eBPF) programs that execute within the operating system kernel's privileged execution environment to observe agent behavior via system call interception and resource usage monitoring. The kernel-based management platform enables rejection or approval of agent actions with reduced latency (e.g., sub-microsecond as opposed to milliseconds) through kernel-level decision making. The kernel-based management platform can thus keep pace with rapidly executing agents. In addition, this kernel-level approach reduces deployment friction because applications require no modifications, recompilation, or configuration changes to enable comprehensive behavioral monitoring, enabling existing agents to be monitored without development overhead. The kernel-level monitoring further prevents monitoring code from interfering with agent functionality because the monitoring programs execute in isolated kernel space that is separate from the agent's user space execution environment, thereby reducing the possibility of monitoring code causing agent crashes, memory corruption, or performance degradation through direct interaction with agent processes. Furthermore, the kernel-level architecture ensures monitoring cannot be disabled or circumvented by agents because user space processes lack the necessary privileges to access or modify kernel memory where the monitoring programs execute.

As artificial intelligence agents become increasingly prevalent in computing environments, multiple applications such as AI agents frequently access shared computational resources including processor time, memory allocations, storage capacity, and network bandwidth within distributed computing systems that host multiple concurrent agent processes. The proliferation of AI agents creates complex resource contention scenarios where individual agents compete for limited system resources while executing their corresponding tasks that require a portion of the computational capacity.

Existing user space resource management solutions suffer from enforcement gaps (as described above) that enable malicious applications (e.g., AI applications, AI agents) to circumvent user space quota systems. For example, malicious applications can circumvent user space quota systems by invoking system calls before user space quota managers can intercept and validate the requests, bypassing the intended resource management workflow where user space libraries check quotas prior to making kernel requests for memory allocation or processor time. In some examples, applications can make simultaneous resource requests to create timing windows where resource allocations exceed established limits. This creates opportunities for resource theft and gaming where applications such as agents consume more resources than allocated through exploitation of enforcement weaknesses, leading to unfair resource exchange (e.g., exchanging monetary resources for system resources used to execute the agent's tasks) scenarios where other agents subsidize resource overconsumption by malicious agents.

Further, current exchange systems (e.g., marketplaces) typically operate with second-level or millisecond-level precision using timestamp mechanisms that record resource usage events at a coarse temporal granularity, which is insufficient for accurately measuring the resource consumption of rapidly executing AI operations within AI applications that can be completed within microsecond or nanosecond timeframes. For example, AI inference operations frequently execute in microsecond timeframes when processing queries or performing cached computations. This coarse granularity leads to resource exchange inaccuracies where short-duration but resource-intensive operations are under-billed due to temporal quantization errors, while longer-duration operations may be over-billed when resource consumption is averaged across coarse time intervals that do not reflect actual usage patterns.

In addition, static resource exchange models fail to respond to dynamic changes in system load or resource availability that occur throughout normal system operation cycles. During periods of low system load when computational resources are abundant and underutilized, resources remain underutilized because fixed exchanged resources (e.g., a monetary resource such as a price) do not provide incentives for agents to increase resource consumption when additional capacity is available at reduced marginal cost to the kernel-based management platform. The static resource exchange prevents efficient resource utilization by maintaining artificial scarcity through fixed resource exchanges that do not reflect actual resource availability. Conversely, during high-demand periods when system resources are scarce and heavily contested, the marketplace can become oversubscribed.

As such, the kernel-based management platform is further enabled to provide kernel-enforced quotas that are used to monitor and control computational resource consumption. The kernel-based management platform can implement a multi-layered architecture where eBPF programs execute within kernel space to intercept system operations and maintain resource usage statistics in kernel-managed data structures (e.g., a database). The kernel-based management platform can continuously monitor system load metrics (e.g., CPU utilization, memory pressure, I/O congestion, and network saturation) to determine aggregate load scores that automatically adjust resource exchange rates (e.g., resource prices) through configurable zones that each resource is mapped to (e.g., ranging from discounted rates during low-demand periods to premium exchange (e.g., pricing) during high-demand periods). The kernel-based management platform can generate cryptographic proof chains where each resource usage record is linked to its predecessor (e.g., through SHA-256 hash functions computed within kernel space), thereby creating tamper-evident audit trails.

This kernel-level approach provides significant advantages over traditional user space resource management approaches by reducing enforcement gaps used by malicious agents and responding to system load conditions with reduced latency. The cryptographic proof provides immutable audit trails with mathematical guarantees against tampering. Further, quota violations are prevented at the system call level where they cannot be bypassed through user space manipulation or privilege escalation attempts.

As AI systems become increasingly complex and autonomous, tracking the provenance and lineage of data processed by AI agents presents significant technical challenges. Data provenance refers to the record of data origins, transformations, and/or movements through computational processes. Data lineage represents the sequential flow and dependencies of data as it moves between different processing stages or systems. Traditional data provenance systems typically require explicit instrumentation of application code, where developers manually insert function calls, logging statements, and metadata collection routines at every point where data is read, modified, or transmitted within the application logic. This instrumentation approach creates technical challenges by introducing opportunities for implementation errors when developers overlook edge cases such as exception handling paths or complex data transformation pipelines. Additionally, instrumentation-based systems increase maintenance burden because the provenance tracking logic is tightly coupled with the application codebase, thus requiring developers to update tracking functions whenever application logic changes and modify data structure definitions when new data types are introduced.

Current systems and methods for provenance tracking create additional technical challenges because existing systems cannot easily be retrofitted with provenance tracking without substantial refactoring of core application architectures. For example, the refactoring often requires inserting the tracking code at hundreds or thousands of locations throughout existing codebases and implementing new communication protocols between distributed system components to maintain provenance chains across service boundaries. Moreover, technical challenges arise from the security vulnerabilities of application-level tracking implementations where malicious actors can bypass tracking mechanisms (e.g., by directly modifying application binary code to remove or disable tracking function calls, manipulating application memory structures to corrupt provenance data before it is recorded, and so forth).

Existing systems and methods for provenance tracking create additional challenges because, in multi-agent systems where different agents can be developed by different organizations, it is difficult to establish a unified provenance tracking mechanism through application-level approaches. Multi-agent systems refer to distributed computing environments where multiple autonomous software agents execute concurrently and interact, with each agent potentially developed using different programming languages, frameworks, and/or architectures. Application-level provenance tracking approaches typically require each agent to implement standardized tracking interfaces, but within heterogeneous development environments, different organizations can experience interoperability failures. This creates significant gaps in the audit trail where data transformations, transfers, or processing operations performed by incompatible agents are not recorded. These audit trail gaps reduce the ability to verify data handling compliance across multi-agent workflows because auditors cannot trace complete data lineage from original sources through the intermediate processing steps to final outputs.

As such, the kernel-based management platform is enabled to intercept all data operations and resource consumption activities at the kernel level, where they cannot be bypassed or manipulated by application code. The kernel-based management platform can implement a multi-layered architecture where eBPF programs are attached to system call entry and exit points, such as file operations (e.g. read, write, open, close), network operations (e.g. send, receive, connect), process operations (e.g. fork, exec), and resource allocation functions (e.g. malloc, mmap, sched_setaffinity). The kernel-based management platform can capture metadata about each operation, including process identifiers, file paths, network endpoints, data sizes, resource allocation amounts, and operation timestamps using kernel monotonic clocks that provide consistent time measurement independent of system clock adjustments.

The kernel-based management platform can record the sequence and relationships of data operations by maintaining temporal ordering of events and establishing dependency links between related operations, such as connecting file read operations to subsequent network transmissions or linking input data sources to output file writes, thereby creating a lineage graph (or other data structure) that shows data dependencies through directed acyclic graph structures where nodes represent data objects and edges represent transformation or transfer operations. The kernel-based management platform can determine (e.g., generate, obtain, access) cryptographic hashes (e.g. SHA-256 or SHA-512 hashes) of the data content as the data content passes through system calls, where hash computation happens entirely in kernel space by accessing data buffers through kernel memory addresses without copying data to user space. Thus, this reduces latency and reduces the performance overhead associated with kernel-to-user-space data transfers.

This kernel-level approach provides significant advantages over traditional user space resource management approaches by operating transparently and, in some implementations, without requiring modification to AI agent code. Cryptographic hashes create fingerprints that reduce performance impact by enabling later verification of data integrity without copying data to user space. Provenance records stored in a blockchain ledger provide cryptographic proof that provenance records have not been altered after creation, enabling verification of the complete audit trail. The kernel-based management platform can provide security guarantees. Since provenance tracking can operate at the kernel level, it cannot be bypassed by application code. Even if an AI agent is compromised, the attacker cannot disable or manipulate provenance tracking without gaining kernel-level access, which requires separate privilege escalation.

Moreover, the use of cryptographic hashing can ensure data integrity. Any modification to tracked data can result in a hash mismatch, enabling detection of unauthorized changes. The blockchain storage can provide non-repudiation, such that once a provenance record is committed to the blockchain, it cannot be altered or deleted without detection. The kernel-based management platform can support role-based access control for provenance queries. Different users or systems can be granted varying levels of access to provenance data based on their authentication credentials and authorization policies. This can enable separation of concerns where AI agent developers can access provenance data for their own agents while auditors have broader access across all agents.

The proliferation of AI agents, particularly those based on LLMs with tool-use capabilities, has introduced new security challenges in enterprise and cloud computing environments. Tool-use capabilities enable these models to interact with external systems via application programming interfaces, command-line utilities, and/or other system functions. These autonomous agents can execute complex tasks including API calls, file operations, network requests, and system interactions, creating potential attack vectors for data exfiltration, lateral movement, and resource abuse. However, the operational capabilities of AI agents create attack vectors where agents can perform data exfiltration by accessing sensitive files and transmitting contents to external destinations, lateral movement by using network access to probe or access additional systems within the computing environment, and resource abuse through consumption of CPU time, memory allocation, or network bandwidth beyond intended usage parameters.

Traditional security monitoring approaches operate in user space and encounter several technical challenges. First, user space monitoring introduces latency (e.g., in the millisecond range) due to the overhead of inter-process communication, system call invocation, and data transfer between monitoring processes and kernel interfaces, which can be insufficient for threat mitigation (e.g., real-time or near-real-time) that requires faster response times. Second, traditional security monitoring approaches are vulnerable to tampering by compromised processes with elevated privileges that can modify monitoring process memory, disable monitoring services, and/or manipulate monitoring data structures because user space processes lack protection mechanisms against other user space processes with sufficient permissions. Third, traditional security monitoring approaches impose performance overhead due to context switching between user and kernel space (e.g., the computational cost of saving and restoring processor state, memory mappings, and execution context when transitioning between different privilege levels or processes). Fourth, the traditional security monitoring approaches lacks visibility into low-level system operations because user space monitoring relies on higher-level abstractions and fails to observe kernel-internal events (e.g., memory management operations, interrupt handling, or device driver interactions).

Existing security monitoring approaches typically employ signature-based or rule-based approaches that cannot adapt to novel attack patterns or the dynamic behavioral characteristics of AI agents. Signature-based detection systems rely on predefined patterns or fingerprints of known malicious activities, such as specific byte sequences in network packets, file hash values of known malware, or characteristic system call patterns associated with documented exploits, which cannot identify previously unseen attack variants or zero-day exploits that do not match existing signatures. Rule-based approaches use conditional logic statements that define suspicious behavior through threshold values, sequence patterns, or Boolean combinations of system events, but these static rules cannot accommodate the evolving and context-dependent behaviors exhibited by AI agents that can legitimately perform operations resembling malicious activities depending on their assigned tasks. Machine learning based anomaly detection systems are predominantly deployed in user space execution environments that process collected data after events have occurred, rather than performing real-time analysis during event execution.

Furthermore, conventional quarantine approaches rely on user space enforcement, which can be bypassed by sophisticated attacks or may fail to prevent damage during the enforcement delay. User space enforcement refers to security measures implemented through application-level processes that operate with standard user privileges and depend on operating system services to restrict system access. Some conventional quarantine approaches use network isolation, which typically requires updating firewall rules or Access Control Lists (ACLs) (i.e., configuration databases that define permitted and denied network connections), and these operations take an increased time interval (e.g., hundreds of milliseconds) to propagate through network infrastructure components. During this enforcement delay period, which represents the time gap between quarantine decision and actual network restriction implementation, an agent can continue executing malicious operations such as exfiltrating data volumes through existing network connections that have not yet been terminated.

As such, the kernel-based management platform is enabled to detect and automatically quarantine anomalous agents using kernel-level mechanisms that operate within the operating system's privileged execution context. The kernel-based management platform can intercept and evaluate AI agent activities at one or more kernel hook points before packets enter the kernel network stack. Each intercepted event can be evaluated using one or more neural network inference operations implemented within eBPF programs, where model weights can be stored in eBPF maps accessible through kernel memory addresses. The kernel-based management platform avoids user-space latency penalties (e.g., context switching overhead, inter-process communication delays) that would occur if inference required data transfer to user space processes. The kernel-based management platform can implement automatic quarantine operations at the kernel level by applying restrictive actions such as blocking system calls through error code returns, dropping network packets through operations that prevent packet transmission, restricting file access and so forth.

By implementing eBPF programs that execute directly within kernel space, the kernel-based management platform reduces the context switching overhead and inter-process communication delays associated with user space security approaches. The kernel-based management platform avoids the adaptability limitations of signature-based and rule-based detection approaches by implementing neural network inference directly within eBPF programs, where machine learning models stored in eBPF maps can evaluate behavioral patterns and detect anomalous activities that do not match predefined signatures or static rules. The kernel-based management platform reduces the enforcement delay challenges of conventional quarantine approaches by applying restrictive actions triggered upon anomaly detection within the kernel execution path, thereby preventing malicious operations from completing during the time intervals typically required for firewall rule propagation or ACL updates in network-based isolation approaches.

As artificial intelligence systems become increasingly autonomous and are deployed in applications, ensuring their safe operation presents technical challenges. Current security approaches to AI safety typically rely on agent-level constraints, where safety rules are implemented within the AI agent's decision-making process through programmatic logic, configuration parameters, or training-time behavioral conditioning. However, agent-level enforcement mechanisms can be bypassed if the agent process is compromised through software vulnerabilities that manipulate input data to cause unintended behavior, or malicious modifications where attackers alter the agent's executable code or configuration files to disable safety constraints. Moreover, existing security approaches typically require the AI agent to voluntarily comply with policies through cooperative behavior and provide no enforcement guarantees against malfunctioning agents that experience software errors or hardware failures, or adversary-controlled agents that seek to exploit system resources.

Traditional security approaches such as sandboxing, which isolates processes within restricted execution environments, and virtualization, which creates isolated virtual machines with limited resource access, introduce performance overhead through additional abstraction layers and computational complexity. Audit trails of agent behavior are typically maintained by the agent itself through self-reporting mechanisms, and are therefore vulnerable to tampering by compromised processes. For example, while constitutional AI represents a framework for encoding guidelines such as safety principles and behavioral constraints into AI systems through structured rule sets and ethical guidelines, existing constitutional AI implementations operate entirely at the application layer within user space processes, making them susceptible to the same challenges as described above.

As such, the kernel-based management platform is further enabled to provide a system and method for kernel-level enforcement of security policies using eBPF technology. The kernel-based management platform transforms high-level guidelines (e.g., constitutional AI rules) that define particular operative boundaries for a particular set of applications into eBPF programs that are loaded into the kernel and attached to particular interception points to create an immutable security layer that operates independently of the AI agent process. In some implementations, the kernel-based management platform includes a policy manager component that compiles the rules expressed in a high-level policy language into eBPF bytecode. This compilation process optimizes or otherwise biases the rules for kernel space execution while maintaining the semantic meaning of the original guidelines. In some implementations, the kernel-based management platform utilizes eBPF programs attached to LSM hooks, kernel probes (kprobes), tracepoints, and other kernel interception mechanisms to inter-cept system calls and operations initiated by AI agent processes. These eBPF programs evaluate incoming operations against the compiled guidelines before the operations are permitted to execute.

In some implementations, the kernel-based management platform maintains policy rules and runtime state in eBPF maps, which are specialized data structures residing in kernel space. These maps, in some implementations, enable efficient $O(1)$ to $O(\log n)$ policy lookup and enforcement without requiring context switches to user space. In some implementations, the kernel-based management platform provides a cryptographic audit trail mechanism that generates signed records of all policy enforcement decisions. Each audit event includes a digital signature generated using kernel-accessible cryptographic keys, creating a chain of custody for policy compliance verification.

While the current description provides examples related to LLMs and agents, one of skill in the art would understand that the disclosed techniques can apply to other forms of machine learning or algorithms, including unsupervised, semi-supervised, supervised, and reinforcement learning techniques. For example, the disclosed kernel-based management platform can evaluate model outputs from support vector machine (SVM), k-nearest neighbor (KNN), decision-making, linear regression, random forest, naïve Bayes, or logistic regression algorithms, and/or other suitable computational models.

Further, the current description provides examples related to both sandbox and non-sandboxed architectures (e.g., eBPF architectures) for application (e.g., AI agent) monitoring, one of skill in the art would understand that the disclosed kernel-based management platform operations are interchangeable across various execution environments and containment configurations. A sandbox environment refers to a restricted execution context that limits the number and types of commands that can be executed in kernel mode, where the sandbox acts as an intermediary layer that filters and controls which system operations are permitted to reach the kernel through predefined rule sets stored in kernel-accessible databases. The disclosed kernel-level monitoring, management, and/or enforcement operations can be implemented across multiple architectural configurations including sandboxed environments where applications execute within restricted command sets that interface directly with the kernel, thereby bypassing operating system service layers. In non-sandboxed environments, applications can execute directly in user space and communicate with the kernel through operating system interfaces (e.g., system calls and device drivers), and the operating system mediates kernel interactions. The kernel-based management platform can be implemented using technologies such as Docker or Kubernetes where applications run within isolated container environments that provide their own namespace and/or resource allocation boundaries while still using the underlying kernel-based management platform for monitoring and enforcement. Hybrid architectures can combine multiple containment approaches where some agent operations are directed through operating system interfaces, while other operations bypass the operating system and interface directly with the kernel via sandbox-controlled paths.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Kernel-Level Monitoring of AI Agents Using the Kernel-Based Management Platform

FIG. 1 shows a schematic illustrating an example environment 100 of an architecture of a kernel-based management platform used to monitor AI agents, in accordance with some implementations of the present technology. The environment 100 can be implemented using components of example computer system 2400 illustrated and described in more detail with reference to FIG. 24. Likewise, implementations of example environment 100 can include different and/or additional components or can be connected in different ways.

The environment 100 is enabled to capture, analyze, and record AI agent behavior without modifications to the AI agents themselves (e.g., zero-modification). The kernel-based management platform can be implemented in a multi-layered architecture where AI agents (or other applications) operate in user space above an operating system layer, while the monitoring and enforcement functionality (e.g., rules, data, functions) resides within the kernel space that maintains direct access to hardware resources.

The AI/LLM agent layer 102 represents the monitored agents including semi-autonomous AI agents and autonomous AI agents executing their corresponding computational functions, which can include model inference operations that process input data through neural network architectures, API interactions that communicate with external services and data sources, and other computational tasks such as data processing, decision-making algorithms, and/or response generation operations. The agents can operate without awareness of or modification for the kernel-based management platform, i.e., maintaining their original software architecture and execution patterns while the monitoring system observes their behavior through system-level interfaces. AI agents can interact with the kernel through standard system call interfaces that request operating system services such as memory allocation operations that reserve computational resources for model execution, file system operations that read training data or write output results, network socket operations that establish connections to external APIs or data sources, process management operations that spawn child processes or manage execution threads, and so forth. These kernel interactions occur automatically as part of "normal," or non-interfered agent execution and provide visibility into agent behavior without requiring any modifications to the agent software or awareness by the agent of the monitoring infrastructure.

The eBPF monitoring layer 104 is structured to reside between the agent processes and the kernel through eBPF programs that execute within kernel space 106 to intercept and record system calls, network activity, and/or resource usage of the monitored agent(s) or application(s). The eBPF programs can operate as verified code segments that attach to specific kernel events and execute custom monitoring logic whenever agents perform system operations such as file access, network communication, or memory allocation. The monitoring can occur entirely within the kernel space 106, which refers to the privileged execution environment of the operating system where kernel code and device drivers execute with unrestricted access to system resources and hardware components. Kernel space 106 provides visibility into all system operations because every user space process must request kernel services to perform computational work, thereby ensuring that no agent activity can occur without being observable by the kernel-based management platform. The kernel-based management platform therefore reduces tampering possibilities because user space processes cannot directly modify kernel memory or interfere with kernel-level monitoring operations.

In some implementations, the application such as an AI agent operates within a sandbox architecture that use specialized programs (e.g., eBPF programs) to create isolated execution environments by confining the program to a specific memory region or set of resources it is permitted to interact with. The specialized eBPF programs can execute directly within the kernel, which eliminates (or otherwise reduces) the need for context switches between user space and kernel space (resource-intensive operations). This direct access to kernel data structures and resources significantly reduces overhead and improves performance. However, to protect the kernel, the specialized eBPF programs can only interact with a limited set of kernel functions and data structures (e.g., those exposed through "helper functions"), which thereby restricts the program's potential impact on the kernel. Thus, even if an agent compromises its user space environment or breaks out of traditional container boundaries, the kernel-level management platform continues to restrict access to system resources according to the policies maintained in kernel memory.

The sandbox eBPF programs can attach to hooks (e.g., LSM hooks), system call entry points, network stack interfaces, and so forth, to enforce one or more rules (e.g., policies, conditions) stored in eBPF maps that restrict application operations. The restricted operations can relate to, for example, access to specific file system paths, network destinations, memory regions, hardware resources, and so forth. In some implementations, the sandbox maintains allow-lists and deny-lists in kernel-accessible data structures that define permitted operations for each sandboxed application. Unauthorized system calls can receive error responses (such as -EPERM or -EACCES) before kernel processing begins. In some implementations, multiple applications (e.g., multiple AI agents) can operate within a common sandbox. The sandbox can apply a subset of the rules stored to a particular agent based on, for example, an agent identifier, a domain of the agent, and so forth.

The kernel-based management platform can configure different sandbox environments with rule sets customized to specific agent types, application domains, or security requirements. Different agents can be assigned to different sandbox configurations based on their operational requirements, trust levels, functional categories, or other descriptor, such that, for example, high-privilege agents can be granted broader system access while untrusted or experimental agents operate under more restrictive policies. The sandbox architecture can be extended beyond AI agents to encompass various program types including database applications, web services, computational workloads, and so forth, where each program category receives operational boundaries defined through the rule sets.

The sandbox architecture can implement routing decisions that determine whether specific operations should be processed through operating system interfaces or directed to kernel-level handlers. In some implementations, for individualized operations that require customized handling, such as agent-specific security policies, personalized resource quotas, or otherwise unique operations, the kernel-based management platform routes the requests through user space pathways. Standard operations that are common (or otherwise shared) across application groups, such as routine file read/write operations, can be routed directly through kernel-level handlers that can process these operations with reduced latency by avoiding user space context switches. The kernel-based management platform can use, for example, lookup tables stored in eBPF maps that associate operation types with routing policies, where each entry contains routing flags indicating whether an operation should be handled in user space or kernel space. The kernel-based management platform can dynamically adjust routing decisions based on runtime conditions (e.g., current system load).

The behavioral analysis engine 108 processes the raw event data from the eBPF layer and can identify normal and potentially malicious or otherwise flagged behavior patterns by generating behavioral data using pattern recognition and anomaly detection operations. Pattern recognition operations evaluate sequences of system calls, network connections, and resource usage patterns to identify known behavioral signatures that correspond to legitimate agent activities such as model loading sequences that follow predictable patterns of memory allocation and file access, API communication patterns that demonstrate consistent request-response cycles, or data processing workflows that exhibit regular computational resource usage. The pattern recognition operations can use databases of known "reference" (i.e., satisfactory) behavioral templates to compare observed agent behavior against these templates to determine whether agent actions conform to expected operational patterns.

In some implementations, continuous streams of system calls, network events, and resource usage data are segmented into fixed or sliding time intervals to capture behavioral patterns that unfold over specific durations (e.g., evaluating system calls within 10-second windows to identify burst patterns or sustained activities). Within each time window, the behavioral analysis engine 108 can perform feature extraction by counting the frequency of specific system call types (e.g., number of 'read( )' calls, 'write( )' calls, 'connect( )' calls), measuring resource consumption rates (CPU utilization percentages, memory allocation volumes, network bandwidth usage), and/or identifying sequential relationships between events (such as detecting that 'open( )' calls are consistently followed by 'read( )' operations within specific timeframes). The extracted features can be transformed into numerical vectors where each dimension represents a specific behavioral characteristic, thereby enabling comparison operations such as determining the Euclidean distance between current behavior vectors and reference baseline vectors to quantify similarity, and/or applying threshold-based classification where behaviors exceeding predetermined variance limits from reference baseline vectors trigger one or more alerts. The reference baseline vectors can continuously update probability distributions of feature values based on, for example, validated actions (e.g., legitimate actions) performed by the agent.

In some implementations, the behavioral analysis engine 108 uses trained neural networks and/or other statistical models to evaluate behavioral patterns by transforming observed agent activities into feature vectors and generating one or more similarity scores against learned representations of reference (e.g., normal) behavior. The behavioral analysis engine 108 can use one or more supervised learning models trained on labeled datasets of satisfactory and non-satisfactory agent behaviors. The training data can include feature vectors from historical system call sequences. During runtime operation, the machine learning model can receive current behavioral feature vectors as input and perform forward propagation through trained network layers to generate probability scores that indicate the likelihood that observed behavior matches the reference satisfactory operational patterns versus non-satisfactory operational patterns. In some implementations, the behavioral analysis engine 108 combines multiple machine learning models (e.g., decision trees, support vector machines, recurrent neural networks) to generate scores determined using weighted voting or probabilistic fusion of individual model outputs.

The trust attestation generator 110 can use the analyzed behavioral data to create cryptographic signatures of the behavioral data that operate as immutable behavioral fingerprints by applying cryptographic hash functions on the behavioral measurements. The kernel-based management platform can generate hash values of behavioral data structures that indicate agent activities (e.g., system call sequences, network communication patterns, resource usage statistics, and/or timing information), and apply one or more digital signature operations (such as RSA or elliptic curve cryptography) to generate cryptographic signatures that bind the behavioral data to specific time periods and system states. In some implementations, the cryptographic signatures are immutable because they are generated using private keys that are stored and protected from unauthorized access, and modification to the underlying behavioral data would result in signature verification failures that indicate tampering attempts.

The attestations can be submitted to the blockchain integration engine 112, which records the attestations in smart contracts to provide permanent, verifiable records of agent behavior. The kernel-based management platform can format the cryptographic attestations into blockchain transaction data structures that represent the behavioral signatures, timestamps, agent identifiers, and/or associated metadata, and then submit these transactions to blockchain networks where they are validated by network consensus operations and recorded in immutable blocks. Smart contracts can execute automatically when attestations are submitted and perform validation operations that verify cryptographic signatures, check attestation formats, and ensure that behavioral data meets predefined criteria before accepting the attestations into the permanent record. The cryptographic linking between blocks ensures that tampering attempts would be detectable by network participants.

The threat detection module 114 is enabled to continuously or periodically evaluate behavioral data to identify malicious activities such as data exfiltration, privilege escalation, or unusual resource consumption. The threat detection module 114 can compare current behavioral patterns against databases that contain known indicators of malicious activity, applying machine learning models trained to recognize attack patterns and suspicious behaviors, and/or executing rule-based detection operations that identify specific behavioral sequences associated with security threats. The threat detection module 114, in some implementations, evaluates network communication patterns to identify unusual data transfer volumes, unauthorized connection destinations, or unusual timing patterns that indicate unauthorized data removal. The threat detection module 114 can monitor system call patterns to identify attempts to access restricted resources, modify system configurations, and/or execute privileged operations without proper authorization. In some implementations, the threat detection module 114 can use computational resource usage patterns to identify denial-of-service attacks, cryptocurrency mining activities, or other resource abuse that indicates compromised or malicious agents.

The trust registry 116 can maintain a queryable database of historical trust scores and attestations, which thereby enables verification of agent trustworthiness and longitudinal analysis of behavioral patterns. Historical trust scores represent quantitative assessments of agent reliability determined from behavioral measurements over one or more time periods, and can be weighted such that recent behavior is weighted more heavily than historical behavior. To generate the trust score, behavioral measurements including compliance with expected operational patterns, absence of detected anomalies, successful completion of assigned tasks, and/or consistency of behavioral patterns over time can be weighted and aggregated. The trust registry 116 can use indexed data structures that enable retrieval of trust information based on agent identifiers, time ranges, behavioral categories, and/or trust score thresholds/constraints.

Figure 2:
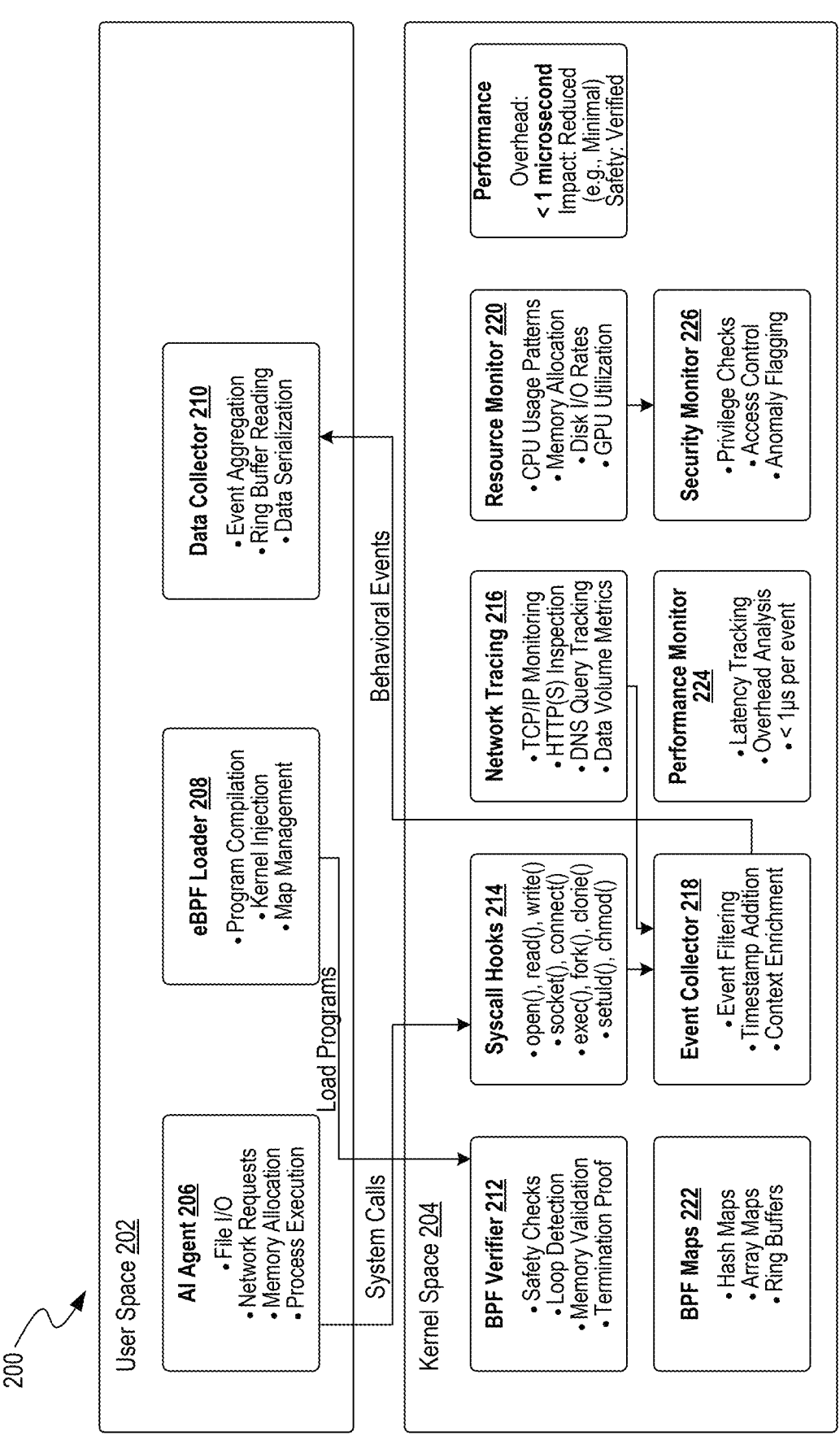
FIG. 2 shows a schematic illustrating an example environment of a monitoring layer used by a kernel-based management platform to monitor AI agents, in accordance with some implementations of the present technology.

FIG. 2 shows a schematic illustrating an example environment 200 of a monitoring layer used by a kernel-based management platform to monitor AI agents, in accordance with some implementations of the present technology. The environment 200 can be implemented using components of example computer system 2400 illustrated and described in more detail with reference to FIG. 24. Likewise, implementations of example environment 200 can include different and/or additional components or can be connected in different ways.

The environment 200 enables zero-touch behavioral monitoring of AI agents at the kernel level. In some implementations, the environment 200 uses an eBPF to enable programs to run within the kernel without kernel module compilation or risking kernel crashes. The environment 200 operates across two different execution spaces including a user space 202 where AI agent 206 processes execute with restricted privileges and limited access to system resources, and a kernel space 204 where eBPF programs monitor these processes with visibility into system operations. User space 202 represents the unprivileged execution environment where application processes including AI agents run with limited access to system resources and request kernel services through system call interfaces to perform operations such as file access, network communication, or memory allocation. User space processes can operate in virtual memory spaces that are isolated from each other and from kernel memory, thereby providing security boundaries that prevent processes from interfering with system operations or accessing unauthorized resources. Kernel space 204 represents the privileged execution environment where the operating system kernel and device drivers execute with access to system resources including physical memory, hardware devices, and/or system data structures. Kernel space code can directly manipulate hardware components, access memory locations, and/or control system-wide resources.

An eBPF loader 208 compiles one or more monitoring programs from high-level source code into eBPF bytecode and injects the compiled programs into the kernel through system call interfaces that transfer the bytecode and associated metadata to kernel memory regions. The kernel-based management platform can parse monitoring program source code and generate intermediate representations that capture program logic and data flow. The kernel-based management platform can parse the monitoring program source code tokenizing the source code into language elements such as keywords, operators, identifiers, and so forth, and construct one or more data structures that represent a structure (e.g., hierarchical structure) of program statements, control flow constructs, data declarations, and the like.

Using the intermediate representations, the kernel-based management platform produces eBPF bytecode instructions that can be executed by the eBPF virtual machine. The data collector 210 retrieves observed events through ring buffer data structures that provide communication channels between kernel space eBPF programs and user space monitoring applications. Ring buffers implement circular buffer mechanisms in shared memory regions that allow eBPF programs to write event data from kernel space while user space applications read the data without requiring system call overhead for each event transfer. The ring buffer implementation can maintain separate read and write pointers that enable lock-free operations.

Within kernel space 204, an eBPF verifier 212 ensures that the monitoring programs are safe, cannot crash the kernel, will terminate, and access permitted memory regions based on an evaluation of the program bytecode before execution. The eBPF verifier 212, for example, constructs a directed graph of all possible execution paths through the program and verifies that all paths lead to program termination without infinite loops or unbounded recursion. The eBPF verifier 212 can examine memory operations to ensure the operations access only authorized memory regions while preventing access to protected kernel memory or arbitrary memory locations.

System call hooks 214 can attach to system calls including file operations, network functions, process creation, and permission modifications through kernel tracepoint mechanisms that execute eBPF programs when specific system calls are invoked. The system call hooks 214 can register eBPF programs by maintaining lists of programs to execute when particular system events occur. File operation hooks can intercept system calls such as open, read, write, and close operations by attaching to kernel functions that implement the operations, thereby capturing parameters such as file paths, access modes, data sizes, and/or return values. Network function hooks can attach to socket-related system calls (e.g., socket creation, bind operations, connect attempts, and/or data transfer functions) to capture parameters such as network addresses, port numbers, protocol types, and/or data volumes. Process creation hooks can track new process creation (e.g., by monitoring fork, exec, and clone system calls) to capture parameters such as process identifiers, parent-child relationships, executable paths, and/or command line arguments. Permission modification hooks can observe system calls that change security contexts such as file permissions, user privileges, or other security contexts, to capture the specific changes and the processes that initiated them.

A network tracing module 216 monitors TCP/IP traffic, HTTP/HTTPS connections, DNS queries, and/or other data volume metrics through eBPF programs that attach to network stack processing functions within the kernel. For example, the kernel-based management platform can attach eBPF programs to kernel functions that process network packets at various layers of the network stack to capture packet headers, payload sizes, source and destination addresses, and connection state information. In some implementations, the kernel-based management platform can evaluate application-layer protocol data by parsing packet contents to extract HTTP request methods, URLs, response codes, and/or other header information. The kernel-based management platform can intercept domain name resolution requests by attaching to kernel functions that handle DNS protocol packets, recording queried domain names, response addresses, and/or query timing information.

A resource monitoring module 220 tracks CPU usage patterns, memory allocations, disk I/O rates, and GPU utilization via eBPF programs that attach to kernel subsystems related to resource management and/or scheduling. Similarly, to monitor memory allocation, the resource monitoring module 220 can hook into kernel memory management functions structured to manage virtual memory operations, tracking allocation requests, deallocation operations, memory usage patterns, and/or virtual memory mapping changes. To monitor disk I/O rates, the resource monitoring module 220 can attach to block device layer functions that manage storage operations to capture parameters such as read and write request sizes, operation latencies, queue depths, and/or throughput measurements. To track GPU utilization, the resource monitoring module 220 can monitor GPU driver interfaces and observe parameters such as GPU memory allocations, kernel launch parameters, execution times, and/or other GPU utilization metrics.

BPF maps 222 provide data structures for storing and sharing state between eBPF programs and user space applications through various map types that support different access patterns and use cases. Hash maps can be used to implement key-value storage operations that enable lookup operations for associating process identifiers with behavioral data, storing configuration parameters, and/or maintaining state information that persists across multiple program invocations. Array maps provide indexed data storage for maintaining ordered collections of information such as statistical counters, time series data, and/or fixed-size data structures that can be accessed using integer indices. Ring buffers implement circular buffer operations for streaming event data from kernel space to user space applications. In some implementations, the size of the maps account for a maximum number of agents and a depth of proof chains. Hash maps can scale logarithmically with the number of entries to provide efficient lookup performance (e.g., even with thousands of agents). Ring buffers can be sized to accommodate burst traffic during periods of high billing activity.

An event collector 218 aggregates and enriches events with timestamps and context information through processing functions that combine raw event data from multiple eBPF programs with additional metadata to create behavioral records. The event collector 218 can collect related events that occur within specified time windows, correlate events based on process identifiers or other common attributes, and combine multiple data sources to create "snapshots" of agent behavior. To enrich the event, the event collector 218 can add timestamp information, process names, user identifiers, parent-child relationships, system state information such as current resource utilization levels and active network connections, and so forth.

A performance monitor 224 ensures the kernel-based management platform maintains a particular latency range such as sub-microsecond response times per event. The performance monitor 224 can monitor execution times of eBPF programs, track memory usage and allocation patterns to prevent resource exhaustion, monitor system call overhead to ensure that monitoring operations do not impact agent performance (beyond a particular threshold, constraint), and so forth. A security monitor 226 can validate privilege levels and flag anomalous access attempts. For example, the security monitor 226 can evaluate credentials against access control lists to verify processes that have appropriate permissions for requested operations. Further, the security monitor 226 can evaluate current access patterns against established baselines to identify unusual resource access requests that deviate from normal behavioral patterns and flag events such as attempts to access restricted files, establish unauthorized network connections, and/or modify system configurations without permissions.

FIG. 3 shows a schematic illustrating an example environment 300 of a behavioral analysis engine used by a kernel-based management platform to score AI agents, in accordance with some implementations of the present technology. The environment 300 can be implemented using components of example computer system 2400 illustrated and described in more detail with reference to FIG. 24. Likewise, implementations of example environment 300 can include different and/or additional components or can be connected in different ways.

The environment 300 transforms raw event data into quantitative trust scores and cryptographic attestations by converting unstructured monitoring events into structured behavioral assessments. The unstructured monitoring events, i.e., raw eBPF events, can include individual system calls that represent specific requests for kernel services. As discussed in further detail with reference to FIGS. 1 and 2, the kernel-based management platform can convert the raw events into behavioral features using feature extraction operations that aggregate and transform individual events into behavioral indicators. System call sequences can be transformed into frequency vectors that capture the pattern and rate of different operations by counting occurrences of specific system calls within time windows and determining statistical distributions that characterize normal, i.e., reference, operational patterns. Network destinations can be categorized and profiled to identify normal, i.e., reference, communication patterns by evaluating destination IP addresses, port numbers, and protocol types to create network behavior profiles that distinguish between "satisfactory" and "non-satisfactory" (e.g., suspicious) communication activities. Resource usage can be aggregated into time-series data to identify consumption trends.

The kernel-based management platform can use one or more behavioral analysis modules 302 to evaluate the identified behavioral features. For example, the kernel-based management platform includes a normal behavior profile that maintains a learned baseline of expected patterns including typical system call sequences that represent normal agent operations, common network destinations that correspond to legitimate external services, regular file access patterns that reflect standard data processing workflows, and normal resource consumption levels that characterize agent execution. This profile can update continuously as agent behavior evolves through adaptive learning operations (i.e., "legitimately") that incorporate new behavioral observations. Historical behavioral data can be used to identify trends and changes in operation patterns.

The anomaly detection engine identifies deviations from the baseline by comparing current behavioral measurements against established normal behavior profiles, and flagging unusual activities (e.g., system call patterns that deviate from expected frequencies or sequences beyond a particular threshold (e.g., constraint), network activity that involves communication with unauthorized destinations or data transfer volumes beyond a particular threshold, abnormal file operations that access restricted files or exhibit particular access patterns, resource spikes that exceed consumption thresholds or exhibit particular patterns, and so forth). The anomaly detection engine can determine statistical distances between current behavior and baseline profiles and apply one or more predefined rules or machine learning models to identify deviations (e.g., machine learning models trained to recognize patterns associated with various types of malicious behavior).

The risk classifier categorizes detected anomalies into threat categories such as data exfiltration risk that identifies patterns consistent with unauthorized data removal such as large file transfers to external destinations or unusual database access patterns, privilege escalation risk that detects attempts to gain elevated system permissions through exploitation of security vulnerabilities or misuse of administrative functions, lateral movement risk that identifies attempts to access additional systems or resources beyond a predefined operational scope, and/or resource abuse risk that detects excessive consumption of computational resources that can indicate cryptocurrency mining, distributed computing abuse, or denial-of-service activities. Further discussion of the threat categories are discussed with reference to FIG. 5. The risk classifier can apply weighted scoring to each category through one or more predefined rules or machine learning models that assign numerical risk values based on the severity and likelihood of different threat types, with weights determined based on historical attack patterns and/or other organizational security priorities.

A trust score output 304 can be determined by the kernel-based management platform using multiple weighted components that combine different aspects of behavioral assessment into a single quantitative measure of agent trustworthiness. For example, a behavioral match to baseline can contribute a particular weight (such as 40% in FIG. 3) of the total trust score through comparison of current behavioral patterns against established normal behavior profiles, with higher similarity scores indicating greater trustworthiness and lower deviation risks. A risk level assessment can contribute a particular weight (such as 30% in FIG. 3) of the total trust score through evaluation of detected anomalies and their associated threat categories, with lower risk levels contributing positively to trust scores. A historical trust record can contribute a particular weight (such as 20% in FIG. 3) of the total trust score through analysis of past behavioral assessments and trust scores over particular time periods, with consistent historical trustworthiness contributing positively to current assessments and past security incidents reducing trust levels. A current context can contribute a particular weight (such as 10% in FIG. 3) of the total trust score through evaluation of current operational conditions such as system load, network conditions, and environmental factors that can influence normal behavioral patterns and affect the interpretation of current behavioral measurements.

The trust score output 304 can be a continuous, discrete, or categorical value (a range from 0 to 100 as shown in FIG. 3), providing a standardized representation of agent trustworthiness that can be used for automated decision-making and/or subsequent comparative analysis. The trust score output 304 can further be categorized into one or more categories, such as "High Trust" with scores ranging from 80-100 in FIG. 3 that indicates that the agent is operating normally and poses reduced security risk. "Medium Trust" scores in FIG. 3 that range from 50-79 can indicate minor deviations from normal behavioral patterns and moderate risk levels. "Low Trust" scores ranging from 0-49 in FIG. 3 can indicate significant anomalies and/or otherwise high-risk indicators.

The kernel-based management platform can generate a cryptographic behavioral fingerprint using the trust score output 304 through cryptographic hash functions that create unique digital identifiers for specific behavioral patterns and assessments. For example, the kernel-based management platform generates hash values of the system call pattern data structures that contain frequency distributions and sequence information, network profile data that includes destination addresses and communication patterns, resource usage statistics that capture consumption trends and utilization patterns, and/or timestamp information that provides temporal context for the behavioral assessment. The kernel-based management platform can apply cryptographic hash functions such as SHA-256 to generate fixed-length hash values that uniquely identify the behavioral state, and/or combine multiple hash values to create composite fingerprints that represent complete behavioral profiles. The fingerprint, combined with the trust score, timestamp, and/or digital signature, forms an attestation that is structured to be recorded on a blockchain or otherwise stored in a database and operates as cryptographic proof of the agent's behavioral state at specific points in time.

Figure 4:
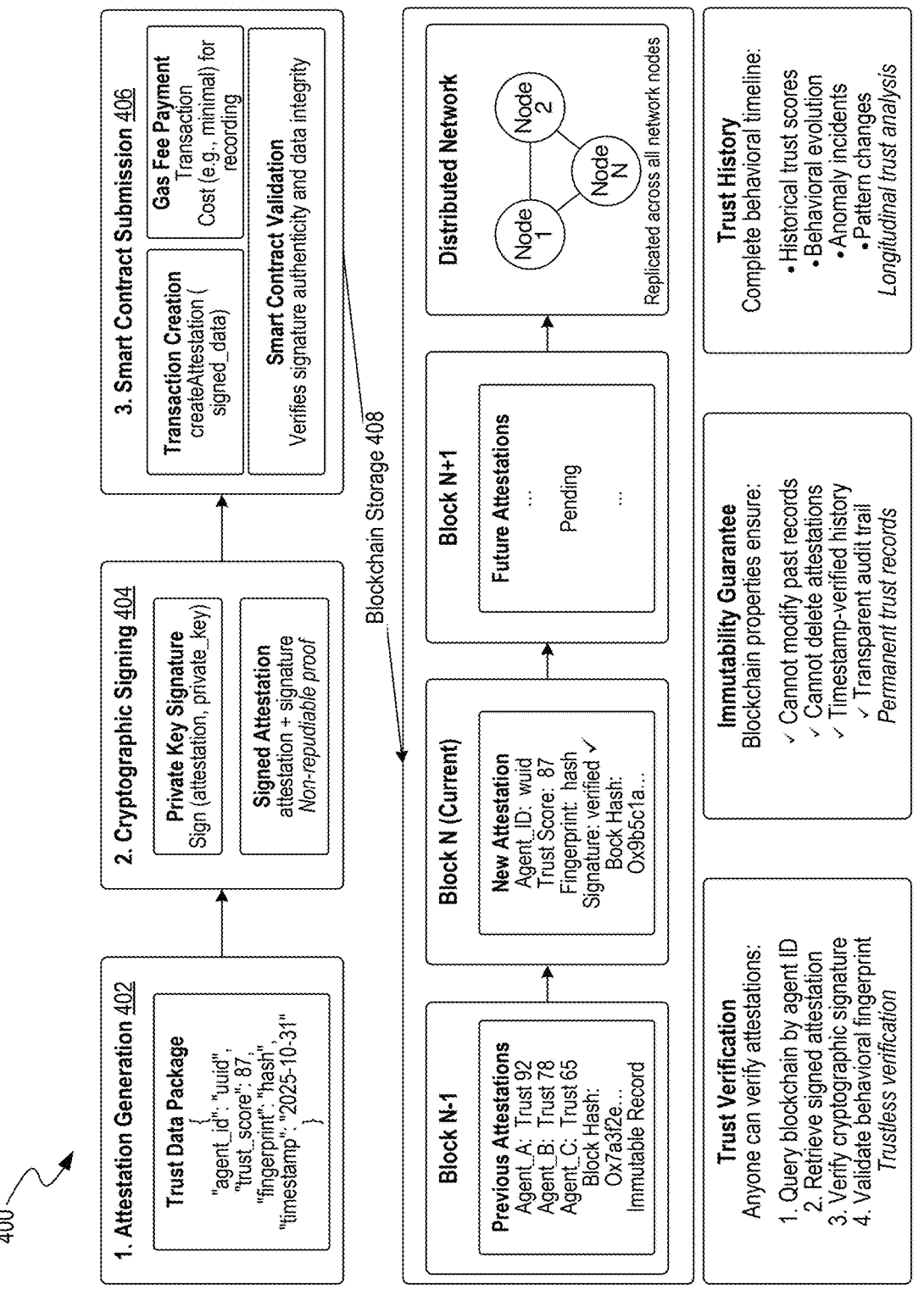
FIG. 4 is a flow diagram illustrating an example process of recording AI agent attestations using a kernel-based management platform, in accordance with some implementations of the present technology.

FIG. 4 is a flow diagram illustrating an example process 400 of recording AI agent attestations using a kernel-based management platform, in accordance with some implementations of the present technology. In some implementations, the process 400 is performed by a computer system, e.g., example computer system 2400 illustrated and described in more detail with reference to FIG. 24. Implementations can include different and/or additional operations or can perform the operations in different orders.

In operation 402, the kernel-based management platform can generate a trust data package that includes the agent identifier, trust score, behavioral fingerprint hash, and/or timestamp through data serialization operations that combine multiple data elements into a structured format. This package represents a snapshot of agent trustworthiness at a specific moment in time by capturing behavioral assessment information in a standardized data structure. The agent identifier refers to a unique alphanumeric string or cryptographic hash that distinguishes the specific AI agent being assessed from all other agents in the kernel-based management platform. The trust score represents the quantitative assessment of agent generated using operations discussed in further detail with reference to FIGS. 1-3 (e.g., encoded as a numerical value). The behavioral fingerprint hash can include the cryptographic hash values generated from the agent's behavioral patterns such as system call sequences, network communication profiles, and/or resource usage statistics. The timestamp can record the time when the behavioral assessment was completed.

In operation 404, the kernel-based management platform can apply a private key signature to the attestation data through digital signature operations that create a non-repudiable proof of the attestation's origin and integrity using asymmetric cryptographic operations. The kernel-based management platform can generate a cryptographic hash of the trust data package using hash functions such as SHA-256 to create a fixed-length digest that uniquely represents the package contents, then applying the private key using digital signature operations such as RSA or elliptic curve cryptography to generate a signature that mathematically binds the data to the signing entity. The signed attestation can combine the original data with the cryptographic signature via data structure concatenation or embedding that represents both the original trust data package and the associated signature. This cryptographic binding ensures any tampering will be detectable because a modification to the original data causes signature verification to fail, as the mathematical relationship between the data, signature, and public key will no longer be valid.

In operation 406, the kernel-based management platform can create a blockchain transaction that invokes a smart contract function to record the attestation through transaction construction processes that format the signed attestation data according to blockchain protocol specifications. The transaction can include the signed attestation data encoded in the transaction payload along with metadata such as transaction version numbers, input and output specifications, and/or execution parameters required by the blockchain network. The transaction can include a gas fee for processing that compensates network validators for the computational resources used to execute the smart contract and record the attestation in the blockchain. The smart contract is enabled to validate the signature authenticity and data integrity before accepting the attestation through programmatic verification routines that execute within the blockchain virtual machine environment. The verification routines validate the signature using the public key associated with the signing entity.

In operation 408, the kernel-based management platform can maintain attestations in an immutable chain of blocks through a distributed ledger such as a blockchain. Each block can include multiple attestations along with cryptographic hashes linking it to previous blocks through hash chaining mechanisms that create cryptographic dependencies between consecutive blocks in the chain. A current block receives new attestations through transaction processing operations that validate and incorporate new attestation transactions into the block structure, and is validated by the distributed network of nodes through consensus mechanisms such as proof-of-work or proof-of-stake that reach agreement among network participants. Each node in the network maintains a complete copy of the blockchain through synchronization protocols that distribute new blocks and maintain consistency across all network participants. Once a block is finalized through the consensus process, its contents become immutable because of the cryptographic hash chains and distributed consensus. The kernel-based management platform enables parties to validate attestations by querying the blockchain by agent identifier through blockchain query interfaces that provide access to stored attestation records, retrieve the signed attestation data from the distributed ledger, verify the cryptographic signature using the public key associated with the attestation's origin, and other verification operations.

FIG. 5 shows a schematic illustrating an example environment 500 of a threat detection module implemented by a kernel-based management platform to detect threatening agent activities, in accordance with some implementations of the present technology. The environment 500 can be implemented using components of example computer system 2400 illustrated and described in more detail with reference to FIG. 24. Likewise, implementations of example environment 500 can include different and/or additional components or can be connected in different ways.

A data exfiltration detection module 502 monitors for data exfiltration indicators by identifying patterns consistent with unauthorized data removal activities (e.g., unusual outbound traffic volume that exceeds established baseline thresholds for network communication, connections to unknown destination IP addresses that are not present in approved communication lists or geographic regions, large file reads followed by network sends that indicate systematic data extraction and transmission, encrypted data transfers that indicate attempts to conceal unauthorized data movement, database dump activities that indicate bulk extraction of structured data from database systems, and so forth). The data exfiltration detection module 502 can monitor database connection patterns and subsequent network activity to identify indicators of large-scale data extraction operations. Additionally, the data exfiltration detection module 502 identifies curl or wget commands to external IP addresses by monitoring system calls to capture command execution patterns associated with network transfer utilities directed toward unauthorized external destinations. Alerts can be triggered (e.g., on a user interface of a computing device) when probability scores for detected patterns exceed predetermined threshold values.

A privilege escalation detection module 504 monitors for privilege escalation activities through system call monitoring and permission tracking that identifies attempts to gain elevated system privileges including unexpected setuid system calls that change process user identifiers to gain higher privileges, sudo command attempts that request administrative access, permission modifications via chmod operations that alter file or directory access permissions, access attempts to sensitive files such as /etc/passwd that contain system authentication information, and/or kernel module loading attempts. The privilege escalation detection module 504 can identify patterns by monitoring system call patterns that track privilege-related operations, attempts to access restricted resources, and/or privilege requests or permission modifications. These attempts generate alerts to one or more computing devices through notification operations (e.g., sound, image, notification, video, multi-modal) that inform users or automated response systems.

A lateral movement detection module 506 identifies lateral movement activities by detecting attempts to expand access beyond initially compromised systems (e.g., systematic probing of internal network addresses to identify additional targets), SSH connection attempts that indicate efforts to establish remote access to other systems within the network, RDP or VNC connections that represent attempts to gain graphical remote access to additional systems, SMB share enumeration that refer to scanning for network file shares that could provide access to additional resources, and/or unusual inter-host traffic patterns that deviate from normal communication patterns between systems. The lateral movement detection module 506 can monitor network connection patterns via TCP connection attempts and/or established connections.

A resource abuse detection module 508 can track computational resource consumption patterns that indicate malicious resource utilization including CPU usage that can indicate cryptocurrency mining or denial-of-service activities, memory exhaustion attempts that include consuming excessive system memory to degrade system performance or cause service failures, fork bomb patterns that create exponential process proliferation to overwhelm system resources, cryptocurrency mining signatures that exhibit specific computational patterns associated with blockchain mining operations, and/or disk I/O operations above a certain threshold that can indicate data destruction attempts or system performance degradation attacks. The resource abuse detection module 508 recognizes malicious resource consumption by identifying sustained high CPU usage without computational work that corresponds to productive agent operations, fork loops that create process proliferation through recursive process creation that consumes system process limits and memory resources, and/or computational patterns matching known mining operations.

FIG. 6 is a flow diagram illustrating an example process 600 of monitoring AI model operations using a kernel-based management platform, in accordance with some implementations of the present technology. In some implementations, the process 600 is performed by a computer system, e.g., example computer system 2400 illustrated and described in more detail with reference to FIG. 24. Implementations can include different and/or additional operations or can perform the operations in different orders.

In operation 602, the kernel-based management platform can obtain, e.g., intercept via the eBPF monitoring layer 104 in FIG. 1, a function invocation transmitted from an AI model (e.g., an AI agent) to a kernel interface structured to manage communications for the kernel of an operating system. The function invocation represents a request to execute a function set using the kernel. The kernel-based management platform can use an eBPF program to intercept the function invocation. The one or more of the functions within the function set are structured to request execution of a file read transaction, request execution of a file write transaction, transmit a network packet, receive a network packet, allocate at least a portion of computer memory, release at least a portion of the computer memory, and/or initiate a new process thread. In some implementations, the application is executed within a sandbox environment that is structured to restrict an access of the application to one or more system resources. Sandbox environments can provide separate views of system resources, control groups (cgroups) that enforce resource limits, and/or security contexts that define access control policies.

In operation 604, the kernel-based management platform can determine (e.g., generate) an event record for each function that defines a process identifier assigned by a scheduler of the operating system, a type of resource interaction, a timestamp, and/or an identifier of a resource identified by the function.

In operation 606, the kernel-based management platform can evaluate (e.g., using the behavioral analysis engine 108 in FIG. 1) the event record associated with each function. The kernel-based management platform can identify an observed pattern set associated with the event record by comparing the event record with one or more previous event records generated from one or more previous functions requested to be executed by the AI model. The kernel-based management platform can embed the observed pattern set into a vector representation of the observed pattern set by mapping each observed pattern into a latent space, and determine, a score set for the event record using a distance between a vector representation of a reference pattern set and the vector representation of the observed pattern set.

To evaluate the event record further, the kernel-based management platform can, e.g., via the risk classifier in FIG. 3, categorize the observed pattern set into one or more risk categories, and apply a weighted score to each risk category to generate the score set. Determining the score set (e.g., the trust score output 304 in FIG. 3) can include determining a match score based on a degree of similarity between the observed pattern set and the reference pattern set, determining a risk score based on one or more differences between the observed pattern set and the reference pattern set, determining a predefined trust score for the AI model, and aggregating the match score, the risk score, and the predefined trust score using predetermined weights to generate the score set.

In operation 608, the kernel-based management platform can generate (e.g., using the trust attestation generator 110 in FIG. 1) a data packet for each function that indicates the observed pattern set, a corresponding score set, and/or a digital fingerprint generated by applying a hash function to a representation of the function (e.g., the pattern vector, the event record, the function, and so forth). The hash function is structured to produce a fixed-length identifier that uniquely represents the function.

In operation 610, the kernel-based management platform can transmit (e.g., via the blockchain integration engine 112 in FIG. 1) each data packet to a distributed ledger (or other database), where the distributed ledger is structured to store the data packet on the distributed ledger. In some implementations, the distributed ledger is a blockchain, and the blockchain is structured to record the data packet as a smart contract. In some implementations, the distributed ledger is a federated ledger, and the federated ledger is structured to determine consensus among a predetermined set of authorized nodes prior to storing the data packet. In some implementations, a reference data packet associated the reference pattern set is stored on the distributed ledger, e.g., via the trust registry 116 in FIG. 1. The kernel-based management platform can update the reference pattern set (e.g., the normal behavioral profile in FIG. 3) based on one or more changes determined in the observed pattern set, where the score set satisfies a predefined constraint.

In response to the score set satisfying a predefined constraint, the kernel-based management platform can transmit the function invocation (or a portion of) to the kernel interface. On the other hand, in response to the score set failing to satisfy a predefined constraint, the kernel-based management platform can prevent transmission of the function invocation (or a portion of) to the kernel interface. In some implementations, the kernel-based management platform can determine that the observed pattern set fails to satisfy a particular constraint, and generate an alert on a computing device associated with the operating system in response to the determination. The kernel-based management platform can, e.g., via the threat detection module 114 in FIG. 1, determine that the observed pattern set indicates data exfiltration, privilege escalation, and/or resource consumption failing to satisfy a particular constraint, and generate an alert on a computing device associated with the operating system in response to the determination.

The kernel-based management platform can create a rule (e.g., a rule defined within the eBPF program) using one or more previous event records generated from one or more previous functions, and/or store the rule in a kernel-accessible data structure. The kernel-based management platform can generate rules by establishing threshold parameters such as maximum satisfactory file access rates (e.g., no more than 100 file operations per second), satisfactory network connection patterns (e.g., connections only to pre-approved IP address ranges), satisfactory resource utilization bounds (e.g., CPU usage below 80% averaged over 60-second intervals), and so forth. These rules can be encoded as conditional logic statements and stored in kernel-accessible data structures such as eBPF hash maps (that provide O(1) lookup performance for rule retrieval), eBPF array maps that store rule parameters indexed by rule identifiers, eBPF Least Recently Used (LRU) maps that automatically manage memory usage by evicting infrequently accessed rules, and so forth. Kernel-accessible data structures reside in kernel memory space that can be directly accessed by eBPF programs without context switching to user space. In some implementations, the kernel-based management platform applies the rule during the evaluation of the event record by comparing the event record against the stored rule and check the numerical event parameters against rule limits.

The kernel-based management platform can obtain, from each of a plurality of applications executing on the operating system, a respective function invocation (e.g., via eBPF programs attached to kernel hook points) that represents a respective request to execute a respective function using the kernel. The kernel-based management platform can access a unique agent identifier to each of the plurality of applications, where each unique agent identifier is mapped to a respective rule set. The mapping between agent identifiers and rule sets can be maintained in eBPF hash maps where the agent identifier operates as the key and the value includes pointers or indices to the corresponding rule set data structures (e.g., therefore enabling O(1) lookup performance). The kernel-based management platform can determine a particular event record for each function, and evaluate each particular event record by comparing the particular event record against the respective rule set that corresponds to a respective unique agent identifier.

Kernel-Level Resource Management Using the Kernel-Based Management Platform

Figure 7:
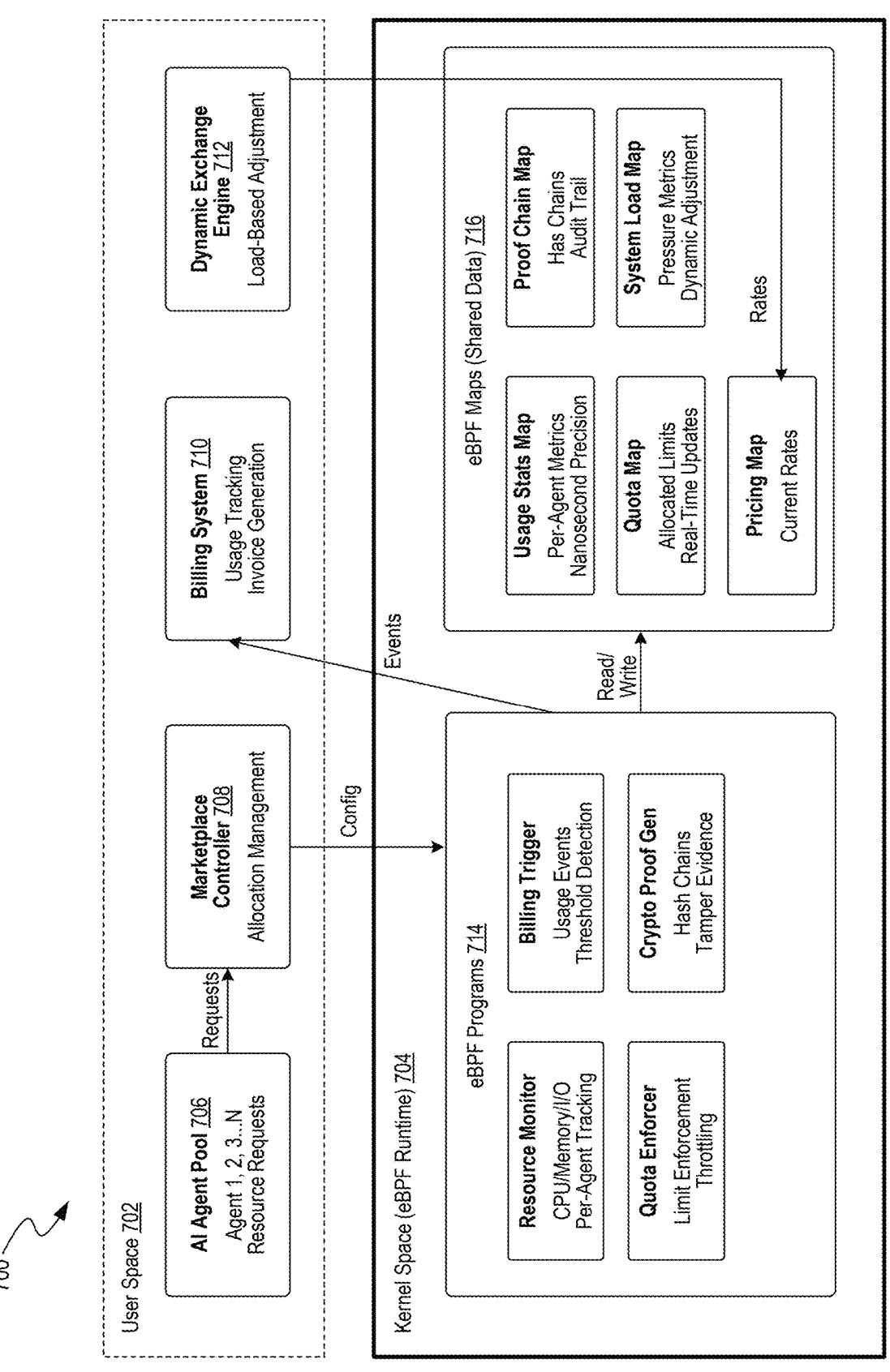
FIG. 7 shows a schematic illustrating an example environment of an architecture of a kernel-based management platform used to manage resources, in accordance with some implementations of the present technology.

FIG. 7 shows a schematic illustrating an example environment 700 of an architecture of a kernel-based management platform used to manage resources, in accordance with some implementations of the present technology. The environment 700 can be implemented using components of example computer system 2400 illustrated and described in more detail with reference to FIG. 24. Likewise, implementations of example environment 700 can include different and/or additional components or can be connected in different ways.

The environment 700 can be structured to include two different execution layers including a user space 702 and a kernel space 704, as discussed in further detail with reference to FIGS. 1-6, which represent distinct privilege levels and execution contexts within the computer system architecture. The user space 702 represents the unprivileged execution environment where application processes can execute with restricted access to system resources and are structured to request kernel services through system call interfaces to perform operations that require elevated privileges or direct hardware access. User space processes can operate within virtual memory spaces that are isolated from each other and from kernel memory. The kernel space 704 represents the privileged execution environment where the operating system kernel and device drivers execute with unrestricted access to all system resources such as physical memory, hardware devices, and system control structures. Kernel space code can directly manipulate hardware components, access any memory location, and control system-wide resources while maintaining security through controlled interfaces that prevent unauthorized user space processes from accessing kernel functionality. The user space 702 can include an AI agent pool 706, a marketplace controller 708, a billing system 710, and a dynamic exchange engine 712 that operate as standard application processes with normal user privileges. The kernel space 704 can include eBPF programs 714 and eBPF maps 716 that provide the resource enforcement and tracking operations with kernel-level privileges that cannot be circumvented by user space processes, as discussed in further detail with reference to FIGS. 8-11.

The AI agent pool 706 represents multiple independent AI agents that operate using computational resources through separate process instances that execute machine learning models, data processing operations, and/or decision-making computations while consuming system resources (e.g., processor time, memory allocations, storage operations, and network bandwidth). Each agent (or group of agents) can be assigned a unique identifier to distinguish individual agents for resource tracking and accounting purposes, thereby enabling the kernel-based management platform to monitor and control resource consumption on a per-agent (or group of agents) basis. Each agent (or group of agents) can operate within the resource quotas allocated by the marketplace controller 708 to prevent individual agents from monopolizing system resources or interfering with other agents' operations. The marketplace controller 708 can manage agent registration by authenticating new agents and assigning them identifiers and/or a quota allocation based on agent requirements and system availability, and/or overall system coordination via scheduling and resource arbitration functions to manage resource distribution among competing agents.

The billing system 710 can consume usage events from the kernel and generate invoices, which refer to structured data records that represent resource usage charges (e.g., itemized lists of consumed resources, associated costs calculated, time periods for resource consumption, payment information). A dynamic exchange engine 712 monitors system load by evaluating resource utilization metrics (as discussed in further detail with reference to FIG. 11) and adjusts resource exchange rates (e.g., prices) in near-real-time or real-time by modifying, for example, per-unit resource costs based on supply and demand conditions.

In kernel space 704, eBPF programs 714 can be loaded and attached to various kernel hooks by compiling user-provided monitoring code into kernel-executable bytecode and registering the programs with particular kernel subsystems for execution when specific system events occur. The eBPF programs 714 can execute with kernel-level privileges that provide unrestricted access to system resources and data structures, ensuring that the programs cannot be tampered with by user space processes because user space applications cannot directly access or modify kernel memory where the eBPF programs execute. Within the eBPF programs 714, a resource monitor component can track resource usage metrics such as estimated or anticipated resource usage by monitoring computational resource consumption (e.g., CPU time measured in processor cycles or time slices allocated to specific processes, memory usage measured in bytes of physical or virtual memory allocated to processes, I/O operations measured in read and write requests to storage devices, and network traffic measured in bytes transmitted and received through network interfaces). A quota enforcer component compares the resource usage metrics against resource limits before allowing operations to proceed. A billing trigger component detects when usage thresholds are exceeded through comparison operations performed by the quota enforcer and generates billing events that record resource consumption by creating structured data records that represent usage measurements, timestamps, and/or agent identification information. A cryptographic proof generator component can generate one or more tamper-evident records of resource consumption via cryptographic hash operations that generate unique digital fingerprints of resource usage data by applying cryptographic hash functions such that it is computationally infeasible to modify data without changing the corresponding hash values.

The eBPF maps 716 can provide shared data structures accessible to both eBPF programs 714 and user space processes through kernel-managed memory regions. Within the eBPF maps 716, the usage statistics map stores per-agent resource consumption metrics through hash table data structures that associate agent identifiers with resource usage measurements such as CPU time consumption, memory allocation totals, I/O operation counts, and/or network bandwidth utilization. The quota map stores allocated resource limits via key-value data structures that associate agent identifiers with maximum (or other threshold) allowed resource consumption values for different resource types. The exchange (e.g., pricing) map can store or otherwise maintain current per-unit costs via data structures that maintain exchange (e.g., pricing) information for different resource types (e.g., CPU time costs per processor cycle, memory costs per byte allocated, storage costs per I/O operation, and network costs per byte transferred). A proof chain map can store cryptographic hashes through linked data structures that maintain chains of resource consumption records, with each hash value cryptographically linked to previous records to create an audit trail of resource usage.

Figure 8:
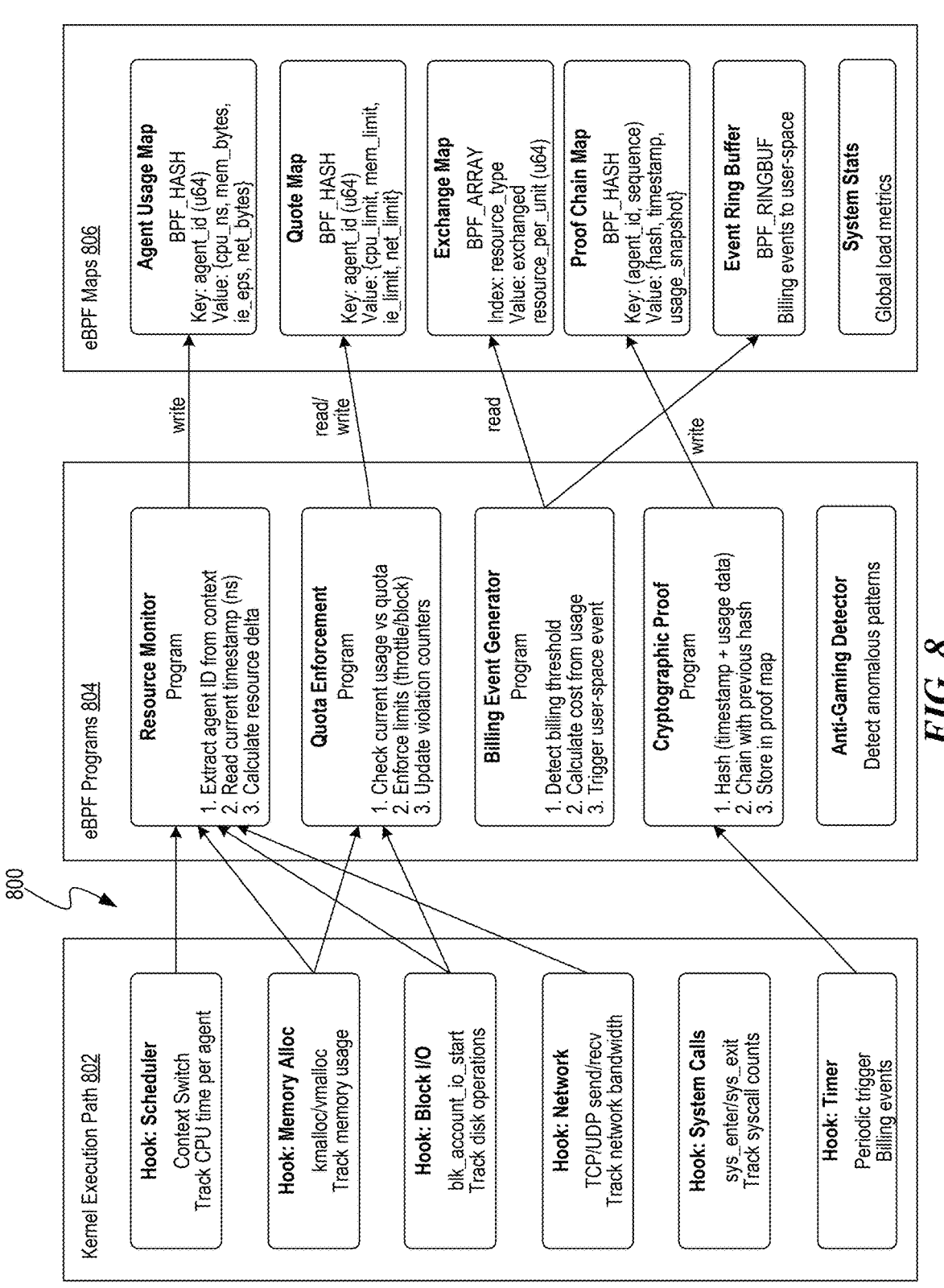
FIG. 8 shows a schematic illustrating an example environment of an eBPF program implemented by a kernel-based management platform to manage resources, in accordance with some implementations of the present technology.

FIG. 8 shows a schematic illustrating an example environment 800 of an eBPF program implemented by a kernel-based management platform to manage resources, in accordance with some implementations of the present technology. The environment 800 can be implemented using components of example computer system 2400 illustrated and described in more detail with reference to FIG. 24. Likewise, implementations of example environment 800 can include different and/or additional components or can be connected in different ways.

Environment 800 illustrates an architecture of eBPF programs 804, which correspond to the eBPF programs 714 described in FIG. 7, and their attachment points within the kernel through hook mechanisms that register monitoring code with specific kernel subsystems to execute when particular system events occur. An eBPF verifier, which corresponds to the eBPF verifier 212 described in FIG. 2, can be used to ensure that all programs are safe to execute and will not compromise kernel stability by examining program bytecode before execution to verify memory access patterns, control flow structures, and instruction sequences.

Within a kernel execution path 802, which represents the sequence of kernel functions and system calls that execute when processes request system services, a scheduler hook can be used to capture context switch events to track CPU time allocation through attachment to kernel scheduling functions that manage process execution time slices and processor assignment. When an agent process is scheduled to run by the kernel scheduler, the eBPF program 804 can record a start timestamp using kernel timing facilities that provide time measurements (e.g., nanosecond-precision) through hardware performance counters and/or system clock interfaces. When a process is preempted by the scheduler due to time slice expiration or higher-priority process activation, the eBPF program 804 can determine an elapsed CPU time by determining a difference between the current timestamp and the previously recorded start timestamp. The eBPF program 804 can update an agent usage map within eBPF maps 806, e.g., the eBPF maps 716 described in FIG. 7, through atomic memory operations that modify shared data structures that represent per-agent CPU time consumption totals.

Memory allocation hooks within the kernel execution path 802 can intercept one or more memory-related functions such as kmalloc, which allocates kernel memory from physically contiguous memory regions, vmalloc, which allocates virtually contiguous memory that can be physically fragmented, or related memory allocation functions. Each allocation request includes a requesting process identifier that enables the eBPF program 804 to attribute memory usage to specific agents, enabling per-agent memory consumption tracking and quota enforcement. A quota enforcement program, which corresponds to the quota enforcer described in FIG. 7, can deny allocation requests that would exceed an agent's memory quota by evaluating current memory usage against established limits, thereby ensuring that individual agents cannot consume excessive memory resources that would impact system stability or other agents' operations.

Block I/O hooks within the kernel execution path 802 attach to one or more disk operation-related tracepoints such as blk_account_io_start function, which executes when block device I/O operations begin, and related tracepoints that monitor various stages of storage device access including I/O request queuing, device driver processing, and/or completion notification. The eBPF program 804 can track read and write operations to accumulate I/O operation counts that represent the total number of storage access requests and transferred byte volumes that represent the total amount of data moved between memory and storage devices.

Network hooks within the kernel execution path 802 can intercept one or more communication paths related to network bandwidth consumption such as TCP transmission paths that manage reliable, connection-oriented network communication, UDP transmission paths that handle unreliable, connectionless network communication, and other network protocol processing functions within the kernel network stack. The eBPF program 804 can track packets sent and/or received to monitor packet counts representing the total number of network messages processed and/or total byte volumes representing the aggregate amount of data transmitted and received through network interfaces.

Timer hooks within the kernel execution path 802 can trigger periodically and execute registered callback functions at specified time intervals to check for billing thresholds and generate usage snapshots that capture current resource consumption states for accounting purposes. These periodic checks ensure that long-running agents generate regular billing events rather than accumulating unbilled usage through systematic monitoring that prevents resource consumption from going unaccounted for extended periods, which could lead to billing inaccuracies or quota enforcement delays. The timer-based monitoring provides regular checkpoints that capture resource usage measurements at consistent intervals.

FIG. 9 is a flow diagram illustrating an example process 900 of managing resources using a kernel-based management platform, in accordance with some implementations of the present technology. The process 900 illustrates a flow of resource tracking and billing from initial agent registration through continuous operation. In some implementations, the process 900 is performed by a computer system, e.g., example computer system 2400 illustrated and described in more detail with reference to FIG. 24. Implementations can include different and/or additional operations or can perform the operations in different orders.

In operation 902, during an initialization phase, an agent (or group of agents) can request marketplace access and receive a unique identifier. A marketplace controller, which represents a user space application process structured to coordinate resource allocation, can determine a resource quota based on the agent's computational requirements including expected CPU time consumption, memory allocation needs, storage access patterns, and/or network bandwidth requirements. The marketplace controller can evaluate the expected resource usage against current system availability measurements that indicate available computational capacity across different resource types. The quotas can be written to the eBPF quota map, which represents a kernel-managed data structure that stores resource limit information in key-value format accessible to kernel space enforcement programs, thus making the quotas enforceable by kernel-level programs that can access and modify the quota map through atomic memory operations.

In operation 904, the kernel-level management platform can perform runtime monitoring when the agent begins to consume computational resources through continuous observation of system operations and resource allocation requests. Each resource operation including CPU scheduling events, memory allocation requests, storage I/O operations, and/or network communication activities can trigger a particular eBPF hook, which represents a kernel attachment point where monitoring code executes automatically when specific system events occur. A resource monitor component within the eBPF program can extract or otherwise determine the agent identifier from the execution context, read a current timestamp, and determine or generate a resource delta representing the incremental resource consumption since the last measurement (by determining differences between current and previous resource usage values). The delta value can be atomically added to the agent's accumulated usage in the usage map through atomic memory operations.

Quota checking can be performed on every resource operation by validating resource requests against established limits before allowing operations to proceed. For example, the enforcement program reads both the current usage totals and the allocated quota limits from their respective eBPF maps. If usage equals or exceeds the quota threshold, the enforcement program throttles the agent through resource allocation delays or blocks at least a portion of the requested operation, thereby preventing quota violations that could lead to resource monopolization or system instability. The throttling mechanisms can include CPU scheduling delays that reduce processor time allocation, memory allocation failures that prevent excessive memory consumption, I/O operation queuing that limits storage access rates, and/or network bandwidth restrictions that control communication resource usage.

In operation 906, the kernel-level management platform can generate billing events when usage exceeds predefined thresholds or when periodic timer expires by creating structured data records that represent resource consumption. For example, the billing trigger program reads a current usage totals from the usage map and retrieves the corresponding exchanged resource (e.g., price) information from the exchange (e.g., pricing) map that indicates current per-unit resource costs. The billing trigger program determines a cost via one or more operations that multiply resource consumption quantities by corresponding unit prices and/or emits an event to user space via a BPF ring buffer, which represents a circular buffer data structure in shared memory that enables communication between kernel space programs and user space applications. The event can include or otherwise indicate the agent identifier for associating charges with specific agents, resource usage amounts representing quantities of different resource types consumed, computed cost values representing monetary charges for resource consumption, and/or a cryptographic hash.

In operation 908, a billing system, which corresponds to the billing system 710 described in FIG. 7 and represents a user space application responsible for processing resource usage charges, can poll the ring buffer for new events through periodic reading operations that check for newly available billing event data. Upon receiving an event, the billing system can verify the cryptographic proof through digital signature validation or hash verification operations that confirm the billing event originated from authorized kernel space monitoring programs and has not been tampered with during transmission. The billing system can create a persistent billing record in the database and update the agent's account balance. Periodically, the billing system can aggregate billing records to generate data structures that represent invoices, which are structured documents that itemize resource usage charges over specified time periods.

In operation 910, the kernel-level management platform performs continuous adaptation. The eBPF programs can track system-wide pressure metrics including overall CPU utilization across all processors, total memory consumption relative to available capacity, storage system load measurements, and/or network bandwidth utilization levels. In some implementations, the eBPF programs receive feedback from user interfaces communicatively connected with the eBPF programs. An exchange (e.g., pricing) engine, which represents a user space application that implements dynamic exchange (e.g., pricing) calculations, can use the tracked metrics to adjust exchanged resource values (e.g., price) by modifying per-unit resource costs based on supply and demand conditions. Updated exchanged resources (e.g., prices) can be written back to the eBPF exchange (e.g., pricing) map through memory write operations that modify the kernel-managed exchange (e.g., pricing) data structure, thereby creating a feedback loop to balance system load by biasing towards efficient resource usage and biasing away from resource waste or monopolization.

Figure 10:
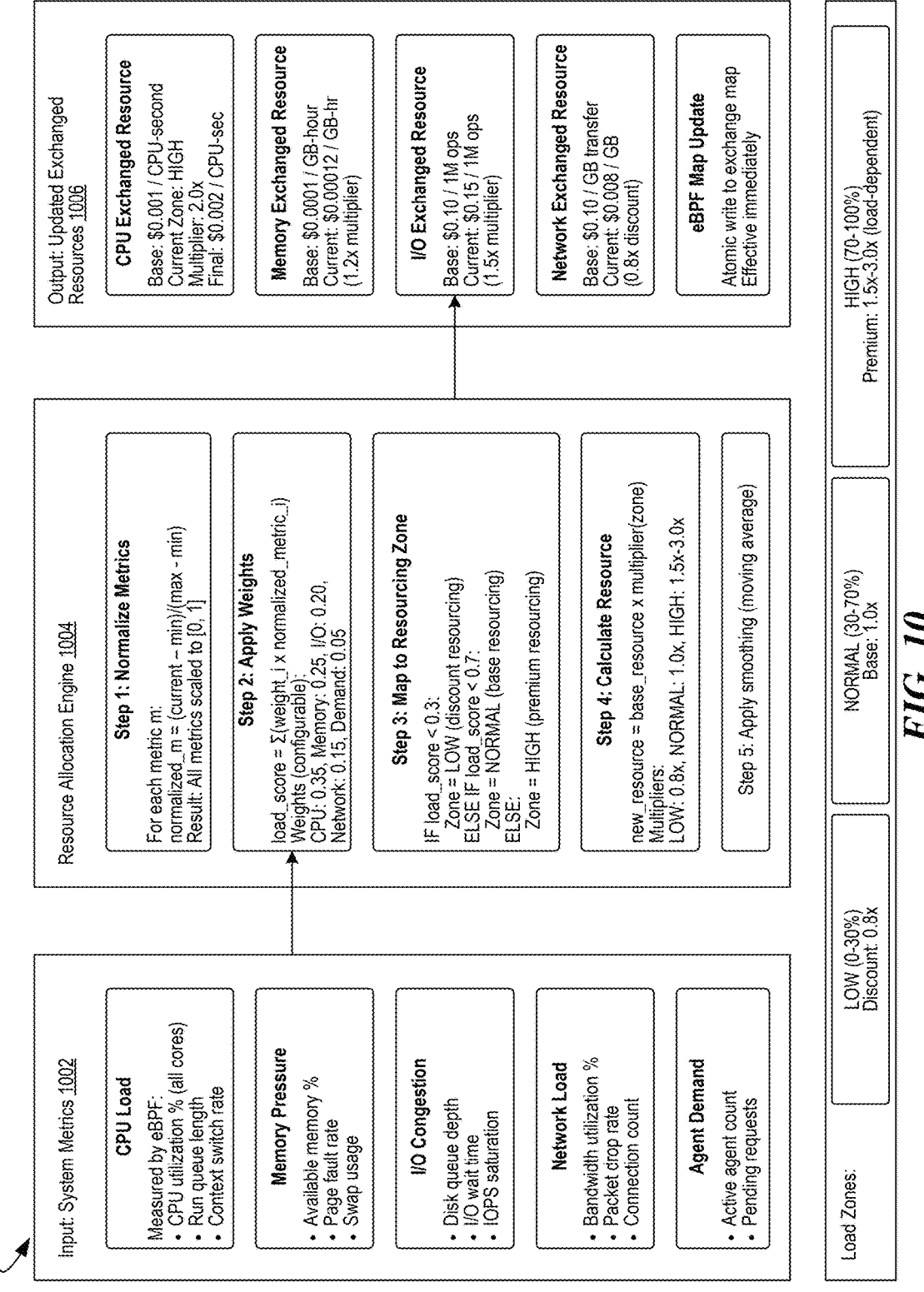
FIG. 10 shows a schematic illustrating an example environment of adjusting resource costs using a kernel-based management platform, in accordance with some implementations of the present technology.

FIG. 10 shows a schematic illustrating an example environment 1000 of adjusting resource costs using a kernel-based management platform, in accordance with some implementations of the present technology. The environment 1000 illustrates a dynamic exchange (e.g., pricing) mechanism that adjusts resource costs based on near-real-time or real-time system load. The environment 1000 can be implemented using components of example computer system 2400 illustrated and described in more detail with reference to FIG. 24. Likewise, implementations of example environment 1000 can include different and/or additional components or can be connected in different ways.

System metrics 1002 can be continuously collected by eBPF programs, which correspond to the eBPF programs 714 and 804 described in FIGS. 7 and 8 respectively. For example, CPU load can be measured via utilization percentages that represent the fraction of processor time spent executing instructions rather than remaining idle, run queue length that indicates the number of processes waiting for CPU time allocation, and/or context switch rates that measure the frequency of processor switching between different executing processes. Memory pressure can be assessed via available memory percentages that represent the fraction of total system memory currently unallocated and available for new allocations, page fault rates that measure the frequency of virtual memory system events when processes access memory pages not currently resident in physical memory, and/or swap usage that indicates the amount of virtual memory currently stored on secondary storage devices rather than in physical memory. I/O congestion can be tracked via disk queue depth that represents the number of pending storage operations waiting for processing by storage device controllers, I/O wait time that measures the duration processes spend waiting for storage operations to complete, and/or operations per second that quantifies the rate of completed storage access requests. Network load can be monitored via bandwidth utilization that represents the fraction of available network capacity currently being used for data transmission, packet drop rates that measure the frequency of network packets discarded due to congestion or buffer overflow conditions, and/or active connection counts that indicate the number of concurrent network communication sessions. Agent demand can be quantified by the number of active agents currently executing computational tasks and consuming system resources, and/or pending resource requests that represent queued resource allocation requests waiting for processing by the resource management system.

A resource allocation engine 1004, which is structured to determine one or more resource exchange (e.g., exchanging system resources for monetary resources) adjustments, can normalize each metric to a value between zero and one by generating or otherwise determining a ratio calculated as current value minus minimum value divided by maximum value minus minimum value, where the minimum and maximum values represent the expected operational range for each specific metric type. Normalized metrics can be multiplied or otherwise weighted by configurable weights, and combined through summation operations to produce an aggregate load score that represents overall system utilization level. For example, in FIG. 10, CPU utilization receives a weight of 0.35, memory utilization receives a weight of 0.25, I/O utilization receives a weight of 0.20, network utilization receives a weight of 0.15, and agent demand receives a weight of 0.05.

A load score can be mapped to exchange (e.g., pricing) zones by comparing the aggregate load score to predefined threshold values that define different operational states and corresponding exchange (e.g., pricing) strategies. For example, in FIG. 10, when the load score is below 0.3, the resource allocation engine 1004 can operate in a particular zone such as the LOW zone with discounted pricing at 0.8 times the base rate. In FIG. 10, as an example, load scores between 0.3 and 0.7 indicate NORMAL operation with standard 1.0× pricing. In FIG. 10, as an example, load scores above 0.7 trigger HIGH zone pricing with premium multipliers ranging from 1.5× to 3.0× depending on the severity of the load.

To calculate an exchanged resource (e.g., price) 1006 for particular resources, the resource allocation engine 1004 can multiply or otherwise weight the base exchanged resource (e.g., price) for each resource type by the zone-specific multiplier through operations that adjust baseline resource costs according to current system load conditions. Base exchanged resources represent the standard cost per unit of each resource type including CPU time measured in processor cycles or time slices, memory measured in bytes allocated, storage operations measured in I/O requests or data transfer volumes, and/or network bandwidth measured in bytes transmitted or received. To prevent exchanged resource fluctuations that could cause instability in resource allocation decisions, a moving average smoothing function can be applied to determine weighted averages of recent exchanged resource values and reduce short-term volatility. The updated or smoothed exchanged resources 1006 can be written atomically to an eBPF exchange (e.g., pricing) map through atomic memory operations, where the exchanged resources 1006 become available to billing event generators that compute resource charges based on current resource exchange information. The resource allocation engine 1004 causes agents to consume resources during low-load periods when discounted resource exchange rates makes resource usage more cost-effective, and defer non-urgent computational work during peak times when premium resource exchange rates encourages resource conservation and prevents system overload conditions that could degrade performance for all system users.

Figure 11:
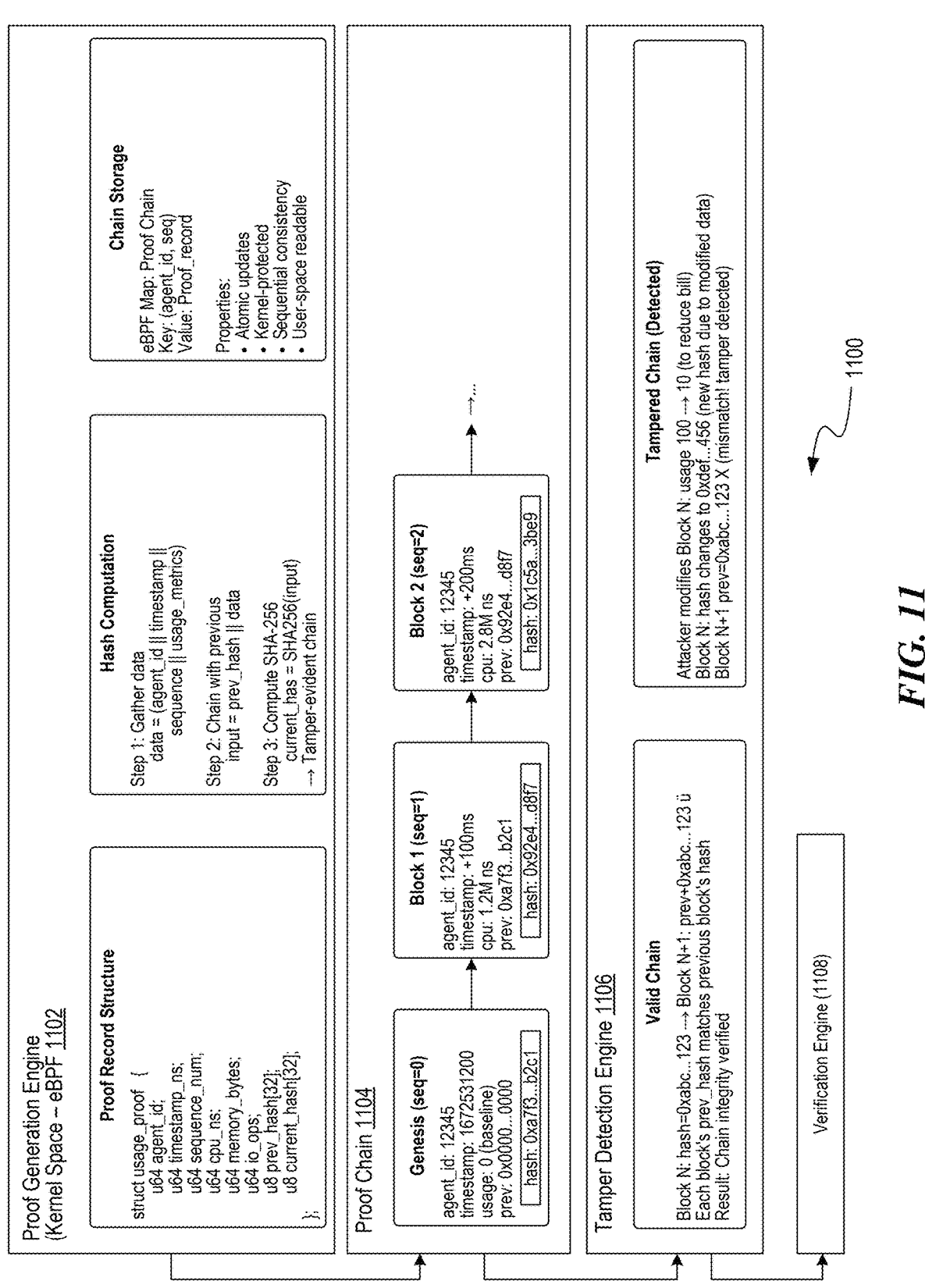
FIG. 11 shows a schematic illustrating an example environment of a hash chain structure implemented by a kernel-based management platform to verify resource usage, in accordance with some implementations of the present technology.

FIG. 11 shows a schematic illustrating an example environment 1100 of a hash chain structure implemented by a kernel-based management platform to verify resource usage, in accordance with some implementations of the present technology. The environment 1100 provides tamper-evident verification of resource usage by implementing a hash chain structure where each usage record is cryptographically linked to its predecessor. The environment 1100 can be implemented using components of example computer system 2400 illustrated and described in more detail with reference to FIG. 24. Likewise, implementations of example environment 1100 can include different and/or additional components or can be connected in different ways.

Each proof record can include or otherwise indicate an agent identifier that uniquely distinguishes the specific AI agent associated with the resource consumption measurement, timestamp information that indicate when the resource usage occurred using high-resolution system clocks or hardware performance counters, sequence number values that establish chronological ordering of records within the hash chain (to prevent reordering attacks), resource usage metrics, and so forth. Each record can include or otherwise indicate the previous record's hash value, which represents the cryptographic fingerprint of the preceding record in the chain, and the current record's determined hash value, which represents the cryptographic fingerprint of the current record computed from all the record's data elements. The structure ensures that any modification to historical records can be detected because altering any data element in a record would change its hash value, which would no longer match the previous hash value stored in subsequent records, thereby creating a detectable inconsistency in the cryptographic chain.

Within a proof generation engine 1102 used to generate the proof records, hash determination can occur within an eBPF program, which corresponds to the eBPF programs 714 and 804 described in FIGS. 7 and 8 respectively, using one or more hash computation operations. For example, SHA-256 represents a cryptographic hash function that produces fixed-length 256-bit hash values from variable-length input data through operations that ensure computational infeasibility of finding two different inputs that produce the same hash output. The eBPF program can concatenate the previous hash with the current usage data through memory operations that combine the cryptographic fingerprint of the preceding record with the resource consumption measurements of the current record, creating a composite input that links the current record to the established chain. The eBPF program determines the hash of this combined input through cryptographic operations that apply one or more data transformations to produce a unique (e.g., 256-bit) fingerprint of the concatenated data. The resulting hash can be stored in the proof record alongside the usage data through memory write operations.

A proof chain 1104 can begin with a genesis record that establishes the baseline through initialization of the hash chain with an initial record that contains predetermined initial values. The genesis record provides a known starting point with a predefined hash value that enables verification processes to validate the entire chain from its origin. Subsequent records can link back to their predecessors, such that each new record incorporates the hash value of the immediately preceding record, thereby creating cryptographic dependencies. The proof chain 1104 can be stored in an eBPF map through kernel-managed data structures. Atomic update semantics can ensure that chain modifications are completed entirely or not at all to prevent partial updates that could compromise chain integrity during concurrent access by multiple monitoring programs or verification processes.

A tamper detection engine 1106 can detect one or more tampering events using the cryptographic properties of the hash chain. If an attacker attempts to modify a historical record, the hash of that record changes because cryptographic hash functions produce different output values when input data is altered. This modified hash no longer matches the previous hash value stored in the subsequent record, causing verification to fail when the tamper detection engine 1106 compares the recomputed hash of the allegedly unmodified record against the hash value stored in the following record. Because the hash computation occurs in kernel space, user space processes cannot forge valid proof records because they lack the kernel-level access to execute the hash computation code.

A verification engine 1108 can operate in user space by reading the proof chain from the eBPF map through system call interfaces that provide controlled access to kernel-managed data structures containing the hash chain records. For each record in the chain, the verification engine 1108 can re-determine the hash using the same cryptographic operations that were used during record creation (e.g., applying SHA-256 hash functions to the same input data including the previous record's hash and the current record's usage data) and compares the re-determined hash to the stored hash value through bitwise comparison operations that identify any differences between the computed and stored hash values. Any discrepancy can indicate tampering because cryptographic hash functions are deterministic and can produce identical output values when applied to identical input data, so differences in hash values can indicate that the input data has been modified. The verification engine 1108 can check that each record's previous hash matches the actual hash of the preceding record through sequential validation that traverses the entire chain, computing the hash of each record and verifying that it matches the previous hash value stored in the subsequent record.

Kernel-Level Lineage Tracking Using the Kernel-Based Management Platform

Figure 12:
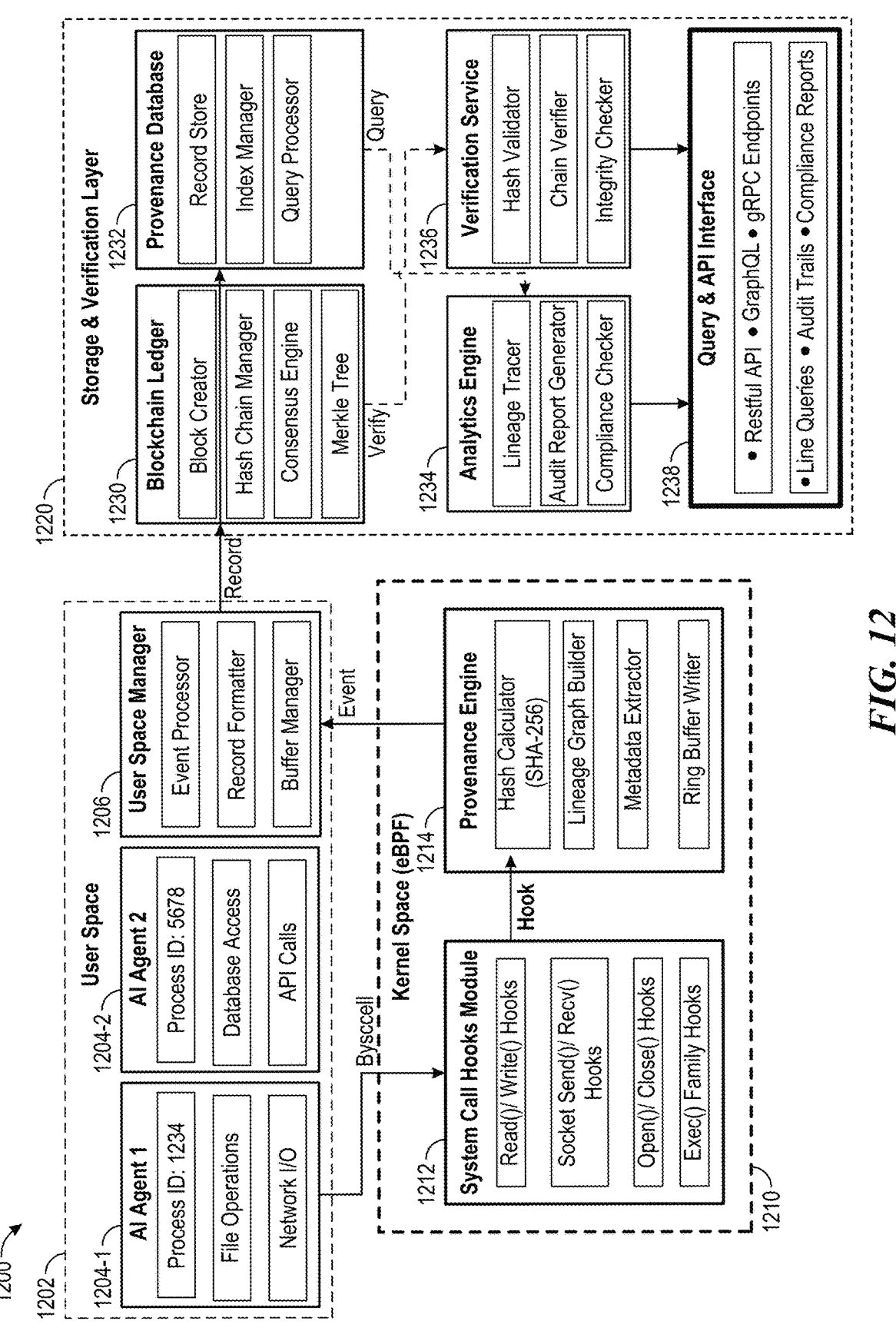
FIG. 12 illustrates a block diagram showing an example of a component interaction schema for agent data provenance and lineage tracking in a kernel-based management platform, in accordance with some implementations of the present technology.

FIG. 12 illustrates a block diagram showing an example of a component interaction schema for agent data provenance and lineage tracking, in accordance with some implementations of the present technology. The architecture 1200 can be implemented using components of example computer system 2400 illustrated and described in more detail with reference to FIG. 24. Likewise, implementations of example architecture 1200 can include different and/or additional components or can be connected in different ways.

The architecture 1200 can be structured to include three different execution layers including a user space layer 1202, a kernel space layer 1210, and a storage and verification layer 1220, which represent distinct privilege levels and execution contexts within the computer system architecture. Further examples of the user space layer 1202 and the kernel space layer 1210 are described with reference to the user space 202 and the kernel space 204 in FIG. 2.

The user space layer 1202 can include AI agent 1204-1 and AI agent 1204-2 (additionally referred to as AI agent 1204 and AI agents 1204) and user space manager 1206. The AI agents 1204 can operate in user space and interact with the kernel-based management platform through standard system calls for file operations, network communications, and other I/O activities. In some implementations, there can be one or more AI agents of the user space layer 1202. Multiple agents can run concurrently, each identified by unique process identifiers and agent metadata that is captured automatically by the kernel-level monitoring infrastructure. The AI agents 1204 can perform various types of operations including reading training data from files, writing model outputs, communicating with external APIs, querying databases, and exchanging messages with other agents. These operations can translate to system calls that pass through the kernel, where the eBPF infrastructure intercepts them for provenance tracking.

The eBPF kernel space layer 1210 can include system call hooks module 1212 and provenance engine 1214. When the AI agents issue system calls, each call can be attached to an eBPF program. The system calls can include read, write, open, close, sendto, recvfrom, connect, socket, fork, and exec, among other suitable calls, and are included in the system call hooks module 1212. When one or more of AI agents 1204 invokes these system calls, the corresponding eBPF program can execute before and/or after the actual system call, capturing information about the operation. The eBPF programs can record process ID, thread ID, user ID, file descriptors, file paths, network addresses, data sizes, and operation return codes of the system call being executed, along with other metadata. For file operations, the kernel-based management platform can record the complete file path, opening flags (read/write/append), and file position. For network operations, the kernel-based management platform can record source and destination IP addresses, port numbers, protocol types, and socket options.

The provenance engine 1214 can perform processing (e.g., real-time or near-real-time) of the captured system call data. It can include capabilities such as cryptographic hashing, lineage graph construction, metadata extraction, and event buffering. The hash calculator component can compute cryptographic hashes of data as it passes through system calls. For read operations, hash calculator can hash the data being read from files or network sockets. For write operations, hash calculator can hash the data being written. The hashing can be performed incrementally using streaming hash algorithms to handle large data objects efficiently. SHA-256 can be used as the default hash algorithm, providing 256 bits of cryptographic strength. In some implementations, the kernel-based management platform can support configurable hash algorithms including SHA-512 for enhanced security. The lineage graph builder can maintain a dynamic graph structure representing data dependencies. When an agent reads data from one source and writes it to another destination, the kernel-based management platform can create a lineage link from the source to the destination. The graph can be stored as a directed acyclic graph (DAG) where nodes represent data objects and edges represent transformations or transfers. Each edge can include metadata about the operation type, timestamp, and agent responsible for the transformation.

The user space manager 1206 can be a daemon process and can continuously read provenance records from the provenance engine 1214. The user space manager 1206 can be responsible for event processing, record formatting, deduplication, batching, and distribution to storage systems of the provenance records. The user space manager 1206 can include capabilities including an event processor, a record formatter, and a buffer manager. The event processor can validate incoming provenance records, ensuring they contain all required fields and that hash values are properly formatted. The event processor can correlate related events, such as matching read and write operations that represent a data transformation. The processor can maintain a cache of recent operations to detect duplicate events that might occur due to retries or concurrent operations. The record formatter can transform raw provenance data into structured records suitable for storage. The record formatter can add additional contextual information such as agent names, file type classifications, and semantic labels. The record formatter can compute secondary indexes that can enable efficient querying of the provenance database.

The storage and verification layer 1220 represents the isolated infrastructure where provenance records are maintained for audit, analytics, and compliance. The storage and verification layer 1220 can provide privileged mechanisms for storage and verification. The storage and verification layer 1220 can include a blockchain ledger 1230. The processed provenance records from the user space manager 1206 can be written to the blockchain ledger. The blockchain implementation can use a permissioned or private blockchain suitable for enterprise deployments, with configurable consensus mechanisms. Each provenance record can be packaged into a blockchain transaction. Multiple transactions can be aggregated into blocks at regular intervals (e.g., 1-10 seconds depending on throughput requirements). The blockchain ledger 1230 can include a block creator which can initiate blockchain blocks. Each block can contain a cryptographic hash of the previous block, creating an immutable chain. The blockchain ledger 1230 can include a hash chain manager which can create and maintain the cryptographic hash chains and a consensus engine which can coordinate agreement among blockchain nodes on the ordering and content of blocks. Each block can include a Merkle tree of all transactions, enabling efficient verification of individual record inclusion. A consensus engine can ensure that all nodes in the blockchain network agree on the ordering and content of blocks. For private blockchains, practical Byzantine fault tolerance (PBFT) or similar algorithms can be used, for example to ensure that all nodes in the blockchain network agree on the ordering and content of blocks. For public or consortium blockchains, proof-of-authority or proof-of-stake mechanisms can be used. In some implementations, the choice of consensus mechanism can be configurable based on deployment requirements.

The storage and verification layer 1220 can include a provenance database 1232. Provenance records can be stored in the provenance database 1232. The provenance database 1232 can be a database optimized or otherwise biased for time-series data and graph queries. The provenance database 1232 can provide fast access to provenance information for real-time monitoring, audit queries, and compliance reporting. The database schema can be designed to support multiple query patterns and include a query processor for processing multiple query types. A first table can store individual provenance records indexed by timestamp and agent identifier. A second table can maintain the lineage graph structure. Other tables can provide indexes for common query patterns such as finding all operations on a specific file, tracing data lineage forward or backward from a given data object, or identifying all data accessed by a particular agent. The provenance database 1232 can include a record store which can store individual provenance records with support for high-throughput ingestion (e.g. in real-time or near real-time), deduplication, and batching of events indexed by timestamp, and agent ID and an index manager which can create and maintain secondary indexes and specialized tables that can enable querying and traversal of provenance, including file- or agent-specific queries and lineage tracking for complex operations. The data can be time-series data, meaning each provenance event is recorded with a precise timestamp (e.g., with nanosecond precision) that indicates when the operation occurred. This can enable chronological sequencing of events, support analytics and monitoring (e.g. in real-time or near real-time), and enable complex compliance and audit queries.

The storage and verification layer 1220 can include an analytics engine 1234 and a verification service 1236. The analytics engine 1234 can provide tools for querying and analyzing provenance data. The analytics engine 1234 can include a lineage tracker which can support lineage tracing queries that can follow data transformations through complex multi-agent workflows, identifying all intermediate steps and transformations. The analytics engine 1234 can include an audit report generator which can generate audit reports showing all operations performed by specific agents, all accesses to sensitive data, or data outputs produced during a given time period. The analytics engine 1234 can include a compliance checker which can automate checking for compliance with data handling regulations (e.g., by comparing the data with reference data). The verification service 1236 can enable cryptographic verification of provenance records. The verification service 1236 can include a hash validator. Given a data object and its claimed provenance record, the hash validator can recompute the hash of the data and verify it matches the hash in the provenance record (e.g. by comparing the recomputed hash value to the stored hash in the provenance record). The verification service 1236 can include a chain verifier. The chain verifier can verify the blockchain proof (e.g. by checking the inclusion of the provenance record in the blockchain's Merkle tree and validating the block's cryptographic hash chain), ensuring the provenance record has not been altered since it was originally recorded. This verification can be performed independently by auditors or compliance systems, such as an integrity checker, without requiring access to the original AI agent infrastructure. The storage and verification layer 1220 can further include a query and API interface 1238, which can provide access to provenance records and enable users and systems to efficiently retrieve provenance information in real time. For example, users can issue API queries (e.g. via Restful API, GraphQL, or gRPC Endpoints) for line queries, audit trails, or compliance reports. The query and API interface can provide access to the provenance data for these purposes.

Certain components of FIG. 12 can interact with one another for one or more agent data provenance and lineage tracking implementations. The components can interact in a series of data flow steps. For example, at a first data flow step, an AI agent of the AI agents 1204 can perform a system call, such as an I/O operation (e.g. file read/write, network send/receive). The systems call module 1212 can receive the system call, for example the matching eBPF hook can intercept the system call at the kernel level, capturing the operation details. The hook data can be received by the provenance engine 1214, which can process the data, for example computing the hash, building the lineage and extracting the metadata of the system call. The user space manager 1206 can receive the event via a ring buffer and format the provenance record. The ring buffer can be one such as those described for FIGS. 1-11. From the user space manager 1206, the provenance record can be written to the blockchain ledger 1230 and to the provenance database 1232.

The kernel-based management platform can reduce performance impact on AI agents when provenance tracking. eBPF programs can execute directly in kernel space with reduced overhead to individual system calls. The use of ring buffers for communication between kernel and user space can provide high throughput with low latency.

Hash computation can be optimized or otherwise biased through the use of hardware acceleration when available. Modern CPUs include specialized instructions for cryptographic operations (such as Intel SHA extensions or ARM crypto extensions) that accelerate hash calculations. The kernel-based management platform can automatically detect and utilize available hardware acceleration. For high-throughput scenarios involving large data transfers, the kernel-based management platform can support adaptive sampling where not every byte is hashed, but instead representative samples are taken at regular intervals. This can maintain the ability to detect data modifications while reducing computational overhead for large files or high-bandwidth network streams.

Figure 13:
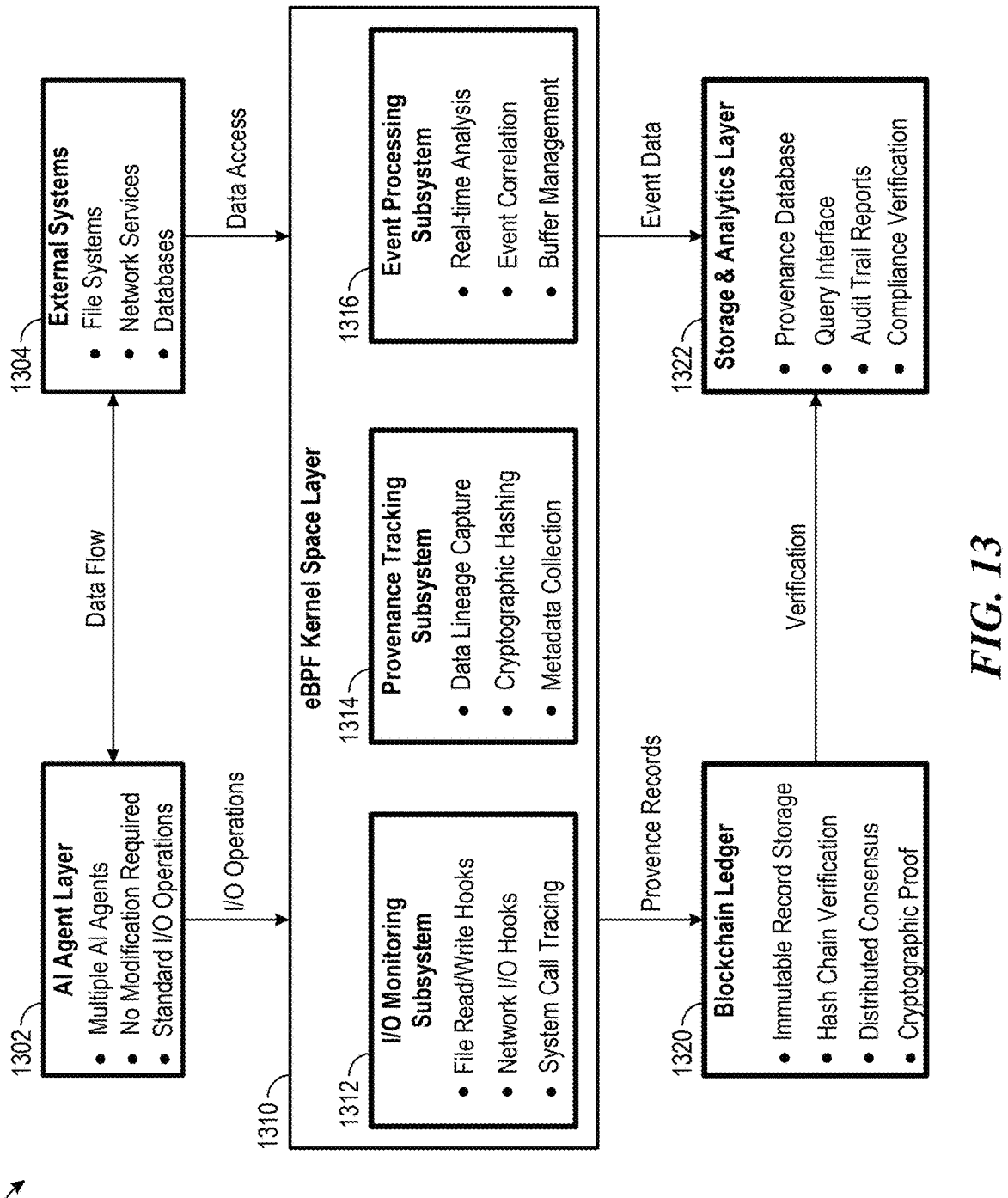
FIG. 13 is a block diagram illustrating an example architecture for agent data provenance and lineage tracking in a kernel-based management platform, in accordance with some implementations of the present technology.

FIG. 13 is a block diagram illustrating an example architecture 1300 for agent data provenance and lineage tracking, in accordance with some implementations of the present technology. The architecture 1300 can be implemented using components of example computer system 2400 illustrated and described in more detail with reference to FIG. 24. Likewise, implementations of example architecture 1300 can include different and/or additional components or can be connected in different ways.

The kernel-based management platform includes multiple layers working in concert to track data operations. The architecture 1300 is designed to operate with reduced performance overhead while providing visibility into data flows across AI agent systems. The architecture 1300 can include an AI agent layer 1302, external systems 1304, eBPF kernel space layer 1310, a blockchain ledger 1320, and a storage and analytics layer 1322. Each component can represent distinct privilege levels and execution contexts within the computer system architecture. The AI agent layer 1302 and the external systems 1304 represent the unprivileged execution environment where application processes can execute with restricted access to system resources and are structured to request kernel services through system call interfaces to perform operations that require elevated privileges or direct hardware access. These processes can operate within virtual memory spaces that are isolated from each other and from kernel memory. For example, system calls such as a file read or a network send operation can originate from the AI agent layer 1302 or the external systems 1304. The external systems 1304 can have access to systems including file systems, network services, and databases.

Data, including I/O data, can flow between the AI agent layer 1302 and the external systems 1304 through operating system interfaces where AI agents invoke system calls that request kernel services to access external resources. System calls represent the operations by which user space processes communicate with the kernel to perform privileged operations (e.g., file system operations such as open( ), read( ), write( ), and close( ) that enable agents to access data stored in files, databases, or configuration repositories maintained by external systems). Network communications can occur through socket-based system calls (e.g., socket( ), connect( ), send( ), recv( )) that establish network connections and transfer data packets between AI agents and remote services, APIs, or other networked systems. In some implementations, the AI agent layer 1302 and the external systems 1304 can be contained within user space, such as user space layer 1202. The AI agent layer 1302 can pass data about I/O operation calls to the eBPF kernel space layer 1310 and the external systems 1304 can pass other data access such as file systems, network services, and databases to the eBPF kernel space layer 1310.

The kernel space layer 1310 represents the privileged execution environment where the operating system kernel and device drivers execute with unrestricted access to all system resources such as physical memory, hardware devices, and system control structures. Kernel space code can directly manipulate hardware components, access any memory location, and control system-wide resources while maintaining security through controlled interfaces that prevent unauthorized user space processes from accessing kernel functionality. eBPF can be used to execute sandboxed programs to run in kernel space without modifying kernel source code or loading kernel modules. The kernel-based management platform can use eBPF to attach monitoring programs to key kernel functions and system call entry/exit points. The kernel space layer 1310 can include subsystems such as an I/O monitoring subsystem 1312, a provenance tracking subsystem 1314, and an event processing subsystem 1316. An I/O monitoring subsystem 1312 can include file read/write hooks, network I/O hooks, and system call tracing capabilities. These can function to capture system calls as they enter from the AI agent layer 1302. A provenance tracking subsystem 1314 can include data lineage capture, cryptographic hashing, and metadata collection functionalities. This can function, for example, as provenance engine 1214. An event processing subsystem 1316 can include real-time analysis of events, event correlation, and buffer management functionalities. The event processing subsystem can function for example as a part of user space manager 1206. The kernel space layer 1310 can pass information including provenance records to a blockchain ledger 1320 and event data to a storage and analytics layer 1322.

The blockchain ledger 1320 represents an immutable record storage system that is used to store provenance records enabling cryptographic assurance such that once a record is written, it cannot be altered or deleted without detection. The blockchain ledger 1320 can include immutable record storage, hash chain verification, and distributed consensus functionalities, for example as in blockchain ledger 1230. It can pass hash chain verification information to the storage and analytics layer 1322, which can include a provenance database such as provenance database 1232, query interface, audit trail reposts and compliance verification capabilities. The storage and analytics layer 1322 represents a high-performance database and analytics engine that enables efficient querying, monitoring (e.g. in real-time or near real-time), lineage tracing, and compliance reporting on the captured provenance data. The storage and analytics layer can include the functionalities of storage and verification layer 1220. The blockchain ledger 1320 can function in some implementations such as blockchain ledger 1230, while the storage and analytics layer 1322 enables fast, flexible querying and real-time analysis of provenance data for monitoring, compliance, and audit purposes. Together, they deliver both cryptographic assurance of record authenticity and practical access to detailed lineage information.

Figure 14:
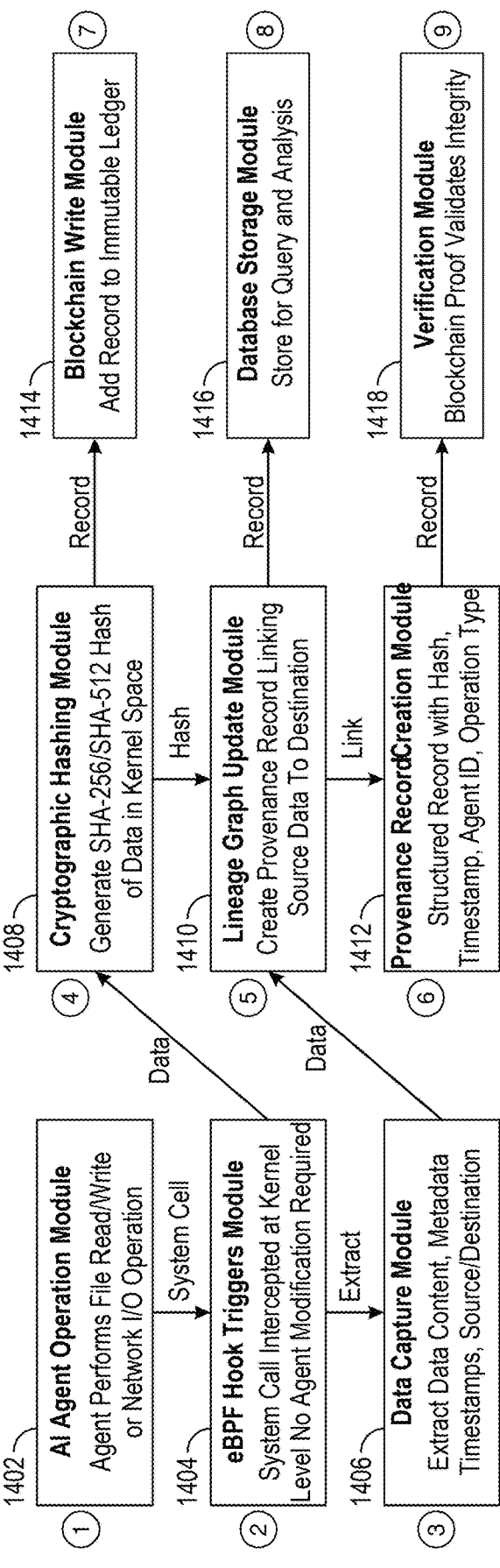
FIG. 14 is a flow diagram illustrating an example process of agent data provenance and lineage tracking using a kernel-based management platform, in accordance with some implementations of the present technology.

FIG. 14 is a flow diagram illustrating an example process 1400 of agent data provenance and lineage tracking using a kernel-based management platform, in accordance with some implementations of the present technology. Process 1400 can be implemented using components of example computer system 2400 illustrated and described in more detail with reference to FIG. 24. Likewise, implementations of example process 1400 can include different and/or additional components or can be connected in different ways (e.g., in a different order). Process 1400 illustrates a flow of resource tracking and billing from initial agent registration through continuous operation.

At operation 1402, an AI agent operation module including an AI agent can perform a function such as a file read/write or network I/O operation. For example, the function invocation can represent a request to execute a function set using the kernel. When an AI agent initiates a file read or write operation, or network I/O operation, the operation can be translated into a system call by the operating system. The system call can have an attached eBPF hook.

At operation 1404, an eBPF hook triggers module can intercept the system call at the kernel level. The eBPF hook attached to the system call triggers in or near real-time, executing the monitoring program in kernel space, for example the kernel space layer 1310. For example, the kernel-based management platform can intercept, using a kernel interface, a function invocation representing a request to execute a function set using the kernel (e.g. a system call) transmitted from an AI application (e.g. the AI agent). The kernel interface can be configured to manage communications with a kernel of the operating system. The kernel-based management platform can determine, using a system hook corresponding to the function invocation, that the AI application has requested a data operation corresponding to a subset of data accessible by the operating system. In response, the kernel-based management platform can execute the monitoring program.

At operation 1406, the data capture module can extract data content, metadata, timestamps, a source, and destination from the system call. For example, the kernel-based management platform can generate a data access event for the function invocation. The data access event can include one or more access parameters (e.g. information about the data content, metadata, timestamps, and source or destination) and one or more agent parameters (e.g. information about the AI agent). The data capture module can be a part of the provenance engine 1214 of the kernel space layer 1210, for example.

At operation 1408, the cryptographic hashing module can generate a hash (e.g., a SHA-256/SHA512 hash) of the data in kernel space. For read operations, after the system call completes successfully, the eBPF program can determine the hash of the data that was read, for example using the hash calculator of provenance engine 1214. For write operations, the eBPF program can hash the data before it is written to the destination. For example, the kernel-based management platform can generate a data package for the function invocation. The data package can include the function invocation representation encoded into a distributed ledger format. The hash computation can happen in kernel space by accessing the data buffer directly without copying to user space, which can reduce performance overhead. The cryptographic hashing module can pass the hash to a linear graph update module and the blockchain write module.

At operation 1410, the linear graph update module can create a provenance record linking the source data to the destination. For example, the kernel-based management platform can generate a function invocation representation including the one or more access parameters and the one or more agent parameters. The linear graph update module can be a part of provenance engine 1214, particularly the lineage graph builder, for example. The lineage graph update module can pass the provenance record to a provenance record creation module and the database storage module.

At operation 1412, the provenance record creation module can create a structured record containing the computed hash, operation timestamp (e.g., with nanosecond precision from the kernel's monotonic clock), agent identifier, operation type, source and destination information, and lineage links to related data objects. This record can be written to a ring buffer shared between kernel and user space. The record can be passed to a verification module.

At operation 1414, a blockchain write module can add the record from the cryptographic hashing module to the immutable ledger. For example, the kernel-based management platform can cause a transmission of the data package to a distributed ledger, wherein the distributed ledger is configured to commit the data package across multiple nodes. For example, the blockchain write module can write the hash to the blockchain ledger 1230.

At operation 1416, a database storage module can store the provenance record for query and analysis. For example, it can be stored in a provenance database such as provenance database 1232. At operation 1418, the verification module verifies the integrity of the structured record from the provenance record creation module based on blockchain proof, for example as a part of verification service 1236, as discussed in further detail with reference to FIG. 12. In some implementations, operation 1416 and operation 1418 can be performed in different orders.

In regulated industries such as healthcare, financial services, and government, the kernel-based management platform can provide automated compliance with data handling regulations by maintaining complete audit trails of all data access and transformations. Auditors can verify that sensitive data was only accessed by authorized agents and was processed according to established policies. For AI model development and training, the kernel-based management platform can automatically track training data lineage, enabling researchers to understand exactly which data sources contributed to model outputs. This can be used to maintain training data quality, detecting bias in training datasets, reproduce experimental results, and so forth. In multi-agent systems, the provenance tracking can enable trust and accountability. When multiple agents from different organizations collaborate, each organization can independently verify that their data was handled correctly by other agents. The immutable blockchain record can prevent disputes about data handling and provide cryptographic proof of proper processing.

Kernel-Level Anomaly Detection Using the Kernel-Based Management Platform

Figure 15A:
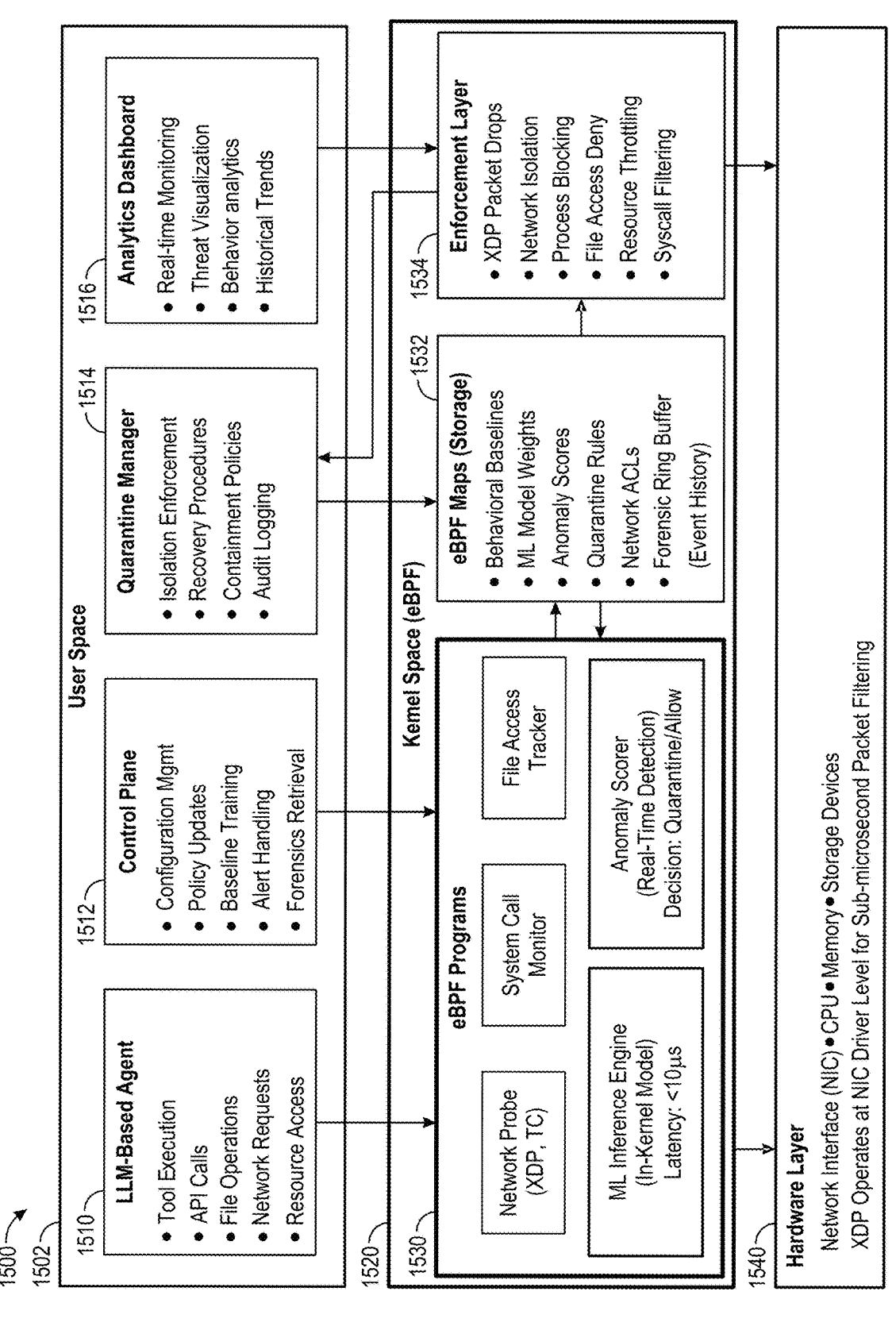
FIG. 15A is a block diagram showing an example of a system architecture for an agent anomaly detection and automatic quarantine engine used by a kernel-based management platform, in accordance with some implementations of the present technology.

FIG. 15A is a block diagram showing an example of a system architecture 1500 for an agent anomaly detection and automatic quarantine engine used by a kernel-based management platform, in accordance with some implementations of the present technology. The architecture 1500 can be implemented using components of example computer system 2400 illustrated and described in more detail with reference to FIG. 24. Likewise, implementations of example architecture 1500 can include different and/or additional components or can be connected in different ways. The architecture 1500 can be structured to include three different execution layers including a user space layer 1502, and a kernel space layer 1520, as discussed in further detail with reference to FIGS. 1-14, and a hardware layer 1540, which represent distinct privilege levels and execution contexts within the computer system architecture.

The user space layer 1502 can include an AI agent 1510, a control plane 1512, a quarantine manager 1514, and an analytics dashboard 1516. The AI agent 1510 can be LLM-based, and include capabilities such as API tool calls, file I/O calls, network requests, process spawning, and database access, among other capabilities. These agents represent a technical security challenge due to their autonomous decision-making, access to multiple system resources, and potential for unpredictable behavior. The anomaly detection and automatic quarantine engine can monitor all agent interactions including the above-listed capabilities. Each agent including AI agent 1510 can be assigned a unique identifier that serves as the key for baseline profiles and anomaly detection. The anomaly detection and automatic quarantine engine can track agent state including assigned permissions, execution context, and historical behavior patterns.

The control plane 1512 can operate in user space and provide management capabilities for the kernel-level detection and enforcement systems. The control plane can perform functions for system configuration, monitoring, and maintenance. The control plane 1512 can manage system configuration including detection thresholds, enforcement policies, monitored agent lists, and baseline parameters. Configuration updates can be pushed to eBPF maps 1532 using the bpf system call, ensuring that atomic updates are visible to all eBPF programs. The control plane 1512 can validate configurations before applying them, preventing invalid settings that could degrade security or cause operational issues, for example by performing sanity checks, schema validation, and consistency verification on configuration data prior to updating eBPF maps. The control plane 1512 can train behavioral baselines using supervised machine learning on historical data. Training data can be collected from forensic logs during designated learning periods. The training process can compute statistical parameters capturing normal behavioral ranges. Trained baselines can be uploaded to the baseline map of eBPF maps 1532, replacing previous versions. The anomaly detection and automatic quarantine engine can support incremental baseline updates, enabling continuous adaptation to evolving agent behavior without complete retraining. The control plane 1512 can train ML models for anomaly detection using techniques such as neural networks, decision trees, or ensemble methods. Model training can occur offline using historical labeled data. Once trained, model weights can be serialized and uploaded to the ML weights map of eBPF maps 1532. The anomaly detection and automatic quarantine engine can support A/B testing of multiple models, enabling evaluation of model improvements before production deployment. Online learning capabilities can allow incremental model updates based on recent data.

Security policies can define how the anomaly detection and automatic quarantine engine responds to different types of anomalies. Policies can specify enforcement actions (drop, throttle, alert-only), quarantine duration, alert routing, and escalation procedures. The control plane 1512 can manage policy lifecycles including creation, versioning, testing, and deployment. Policy updates can take effect immediately through map updates, for example updating enforcement actions, quarantine duration, alert routing, and escalation procedures, without requiring eBPF program reloads. The control plane 1512 can continuously monitor system health and performance. It can collect metrics from a statistics map, including event rates, anomaly rates, inference latencies, and enforcement actions. Health checks can verify that eBPF programs are loaded and functioning correctly. Performance monitoring can identify bottlenecks or resource constraints. Alert rules can trigger notifications when metrics exceed thresholds or anomalous patterns emerge. When anomalies are detected, the control plane 1512 can generate alerts for security operations teams. Alerts can be enriched with context from forensic logs, providing operators with information for incident assessment. Alert routing can be configured based on severity, affected agents, and operational priorities. The control plane 1512 can track alert lifecycle including acknowledgment, investigation, and resolution. The control plane 1512 can provide management capabilities without introducing latencies in the detection and enforcement path. By operating asynchronously with kernel components, it can enable management features while maintaining a reduced (e.g., a sub-10-microsecond) response time.

The quarantine manager 1514 can perform actions including isolation enforcement, recovery procedures, containment policies, and audit logging involving agents. When agents are recovered from quarantine, the quarantine manager 1514 can conduct a manual review, perform a whitelist update indicating agent recovery, and restore access to various permissions. The analytics dashboard 1516 can display data and include visualizations involving agent activity, including monitoring (e.g. in real-time or near real-time), threat visualization, behavior analytics, and historical trends. For example, the analytics dashboard 1516 can create visualizations illustrating threats, agent behavior graphs, anomaly timestamps, and performance metrics. The analytics dashboard 1516 can pull data from sources including ring buffer events, eBPF map statistics, and system logs. Arrows indicate data flow and communication patterns between components.

The AI agent 1510 and the control plane 1512 can direct data and communications to the eBPF programs 1530. The quarantine manager 1514 can direct data and communications to the eBPF maps 1532, and the analytics dashboard 1516 can direct data and communications to the enforcement layer 1534. In push-based implementations, the AI agent 1510 transmits system call invocations and operational requests to eBPF programs 1530 using kernel hooks, such that the agent's execution of system calls triggers attached eBPF programs that receive the call parameters, process identifiers, and/or associated metadata. In pull-based implementations, eBPF programs 1530 can actively retrieve behavioral data from the AI agent 1510 by intercepting system calls at kernel hook points and identifying information from kernel data structures that indicate process state, memory mappings, and/or execution context without requiring explicit data transmission from the agent.

The kernel space layer 1520 can host eBPF programs, shared memory maps, and enforcement mechanisms. The kernel space layer 1520 can include eBPF programs 1530, eBPF maps 1532, and an enforcement layer 1534. The eBPF programs 1530 can consist of multiple specialized programs attached to different kernel hook points and can include a network probe, system call monitor, and file access tracker, as well as an ML inference engine and an anomaly scorer. Each program can be designed to intercept specific types of agent activity and extract relevant behavioral features. For example, the system call monitor can intercept system calls made by agent processes to extract information about file operations, process management, inter-process communication, and resource allocation, and the file access tracker can use LSM hooks to monitor file access attempts, tracking file paths, access modes, and access frequencies. The programs can undergo verification by an eBPF verifier such as eBPF verifier 212 before loading, ensuring they cannot crash the kernel or access unauthorized memory. Machine learning inference can be implemented directly within eBPF programs 1530 executing in kernel space. Traditional approaches require transferring event data to user space for analysis, introducing millisecond-scale latencies. The in-kernel inference engine can eliminate this bottleneck by performing all computations within the kernel. The inference engine of the eBPF programs 1530 can implement a compact neural network architecture optimized or otherwise biased for eBPF execution constraints. The network can consist of an input layer accepting a feature vector (e.g., 32-dimensional), hidden layer(s) (e.g., two hidden layers of 64 and 32 neurons respectively), and output neuron(s) (e.g., a single output neuron producing an anomaly score). The network can use ReLU activation functions for hidden layers and sigmoid activation for the output. This architecture can provide capacity for complex pattern recognition while enabling low-latency inference (e.g., sub-10-microsecond). The eBPF programs 1530 can direct and receive data and communications back and forth with the eBPF maps 1532.

The eBPF maps 1532 can support functionalities including behavioral baselines, ML model weights, anomaly scores, quarantine rules, network ACLs, and forensic ring buffer. The eBPF maps 1532 can maintain statistical profiles of normal agent behavior as part of the behavioral baseline system, enabling accurate anomaly. Baselines can be computed from historical operational data and stored in eBPF hash maps keyed by agent identifier. The eBPF maps 1532 can support dynamic baseline updates to accommodate legitimate changes in agent behavior over time. The control plane can push updated baselines to eBPF maps without disrupting ongoing monitoring by employing atomic map operations. Baseline drift detection algorithms such as Population Stability Index (PSI) can identify when agent behavior has evolved to warrant baseline retraining. The baseline system can balance sensitivity and specificity through configurable threshold parameters. Administrators can adjust detection sensitivity based on risk tolerance and operational requirements. The anomaly detection and automatic quarantine engine can support multiple threshold configurations, enabling different sensitivity levels for different agents or operational contexts. The eBPF maps 1532 can exchange data and communications with the eBPF programs 1530, as well as directing data and communications to the enforcement layer 1534.

The enforcement layer 1534 can include capabilities for quarantine enforcement for anomalous agents. The functionalities of the enforcement layer 1534 can include XDP packet drops, network isolation, process blocking, file access denial, resource throttling, and system call filtering, as well as CPU and memory limits via cgroup BPF. The enforcement layer 1534 can use eBPF programs and shared eBPF maps to automatically apply security controls, including XDP eBPF programs to inspect and drop packets from agents flagged as anomalous, LSM and/or tracepoint eBPF programs to intercept agent system calls, and cgroup BPF hooks to enforce CPU and memory limits for quarantined agents. The enforcement layer 1534 can pass information and communications to the quarantine manager 1514 and the hardware layer 1540, as well as receiving data and communications from the analytics dashboard 1516. The kernel space layer 1520 can pass data and communications to the hardware layer 1540.

Figure 24:
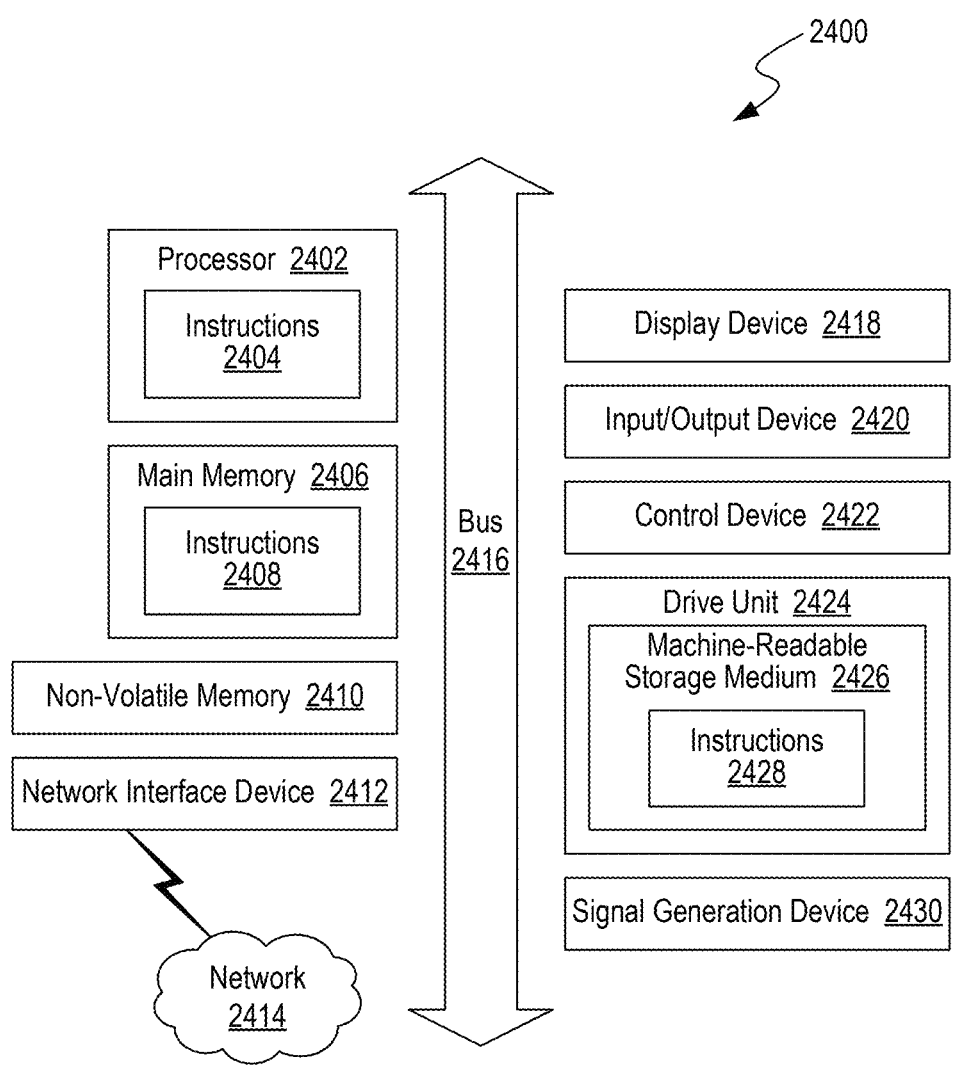
FIG. 24 is a block diagram showing some of the components typically incorporated in at least some of the computer systems and other devices on which the kernel-based management platform operates, in accordance with some implementations of the present technology.

The hardware layer 1540 can provide the physical infrastructure for the anomaly detection and automatic quarantine engine including network interfaces, CPUs, memory, and storage devices, for example the memory and storage devices of FIG. 24. The architectural design reduces data movement between layers. Security decisions occur within kernel space layer 1520, reducing the latency associated with kernel-to-user space context switches. In some implementations, non-time-critical operations such as configuration updates and forensic data retrieval interact with user space.

In some implementations, the agent anomaly detection and automatic quarantine engine monitors application (e.g., agent) system calls through eBPF programs that detect when an agent attempts to execute commands outside its designated sandbox boundaries. This can trigger an automatic rule generation operation that adds the agent identifier to a kernel-accessible quarantine list stored in eBPF hash maps with enforcement policies that block all subsequent system calls from the quarantined agent by returning error codes such as -EPERM before any operations can execute. When a quarantined agent subsequently attempts to execute commands within its original sandbox environment, the agent anomaly detection and automatic quarantine engine can implement a sandbox override operation where eBPF programs detect the quarantined status and automatically expand the denial scope to encompass all sandbox operations. The agent anomaly detection and automatic quarantine engine can overwrite the sandbox permissions by updating the sandbox policy rules in kernel data structures to block previously permitted operations. Thus, the agent anomaly detection and automatic quarantine engine ensures that quarantined agents cannot circumvent restrictions by reverting to sandbox-compliant behavior after demonstrating malicious intent through boundary violations.

Figure 15B:
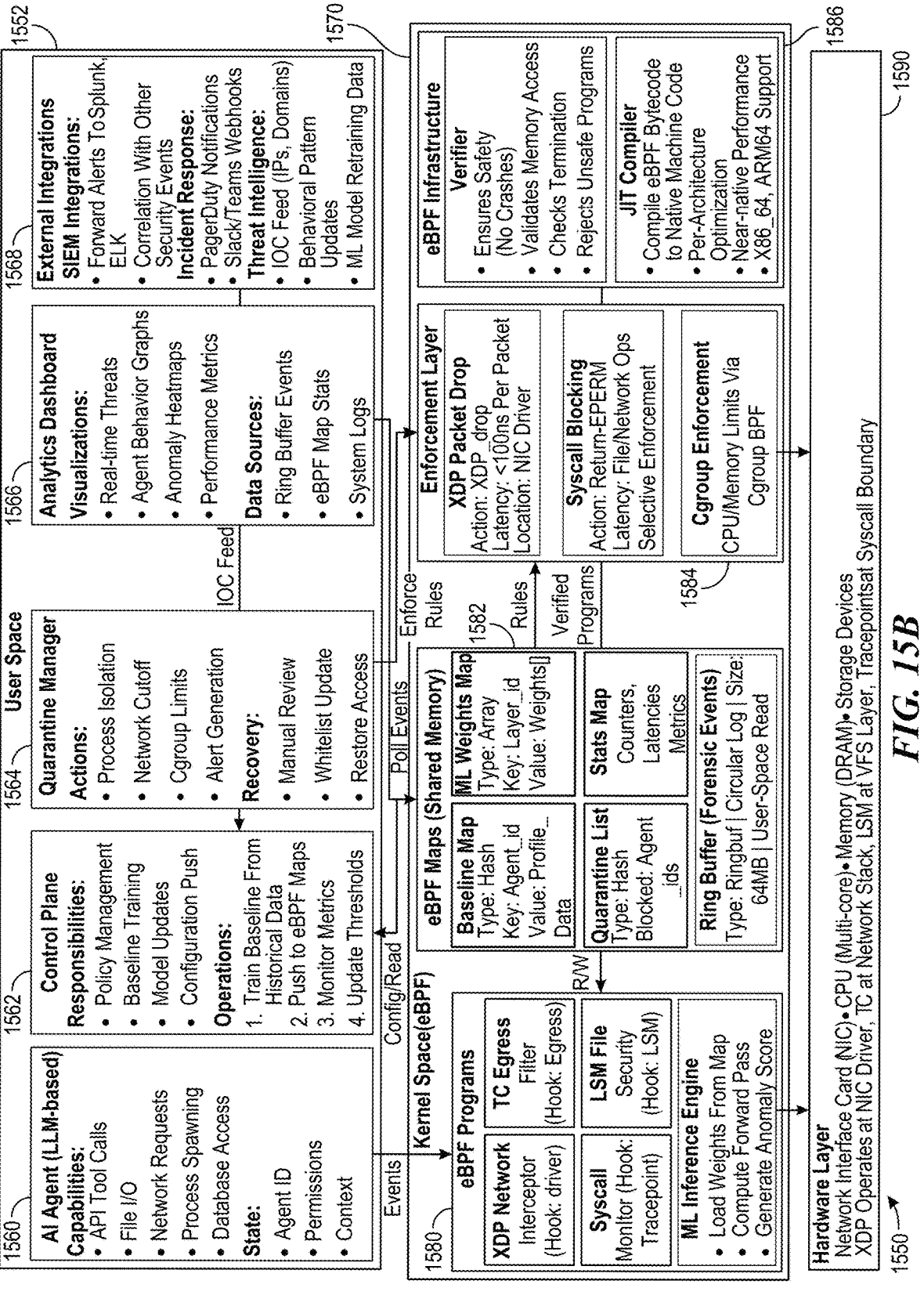
FIG. 15B is a block diagram showing component interaction and communication patterns within an agent anomaly detection and automatic quarantine engine used by a kernel-based management platform, in accordance with some implementations of the present technology.

FIG. 15B is a block diagram showing an architecture 1550 of component interaction and communication patterns within an agent anomaly detection and automatic quarantine engine used by a kernel-based management platform, in accordance with some implementations of the present technology. The architecture 1550 can be implemented using components of example computer system 2400 illustrated and described in more detail with reference to FIG. 24. Likewise, implementations of example architecture 1550 can include different and/or additional components or can be connected in different ways.

The architecture 1550 can include user space layer 1552 which can be implemented, for example, as user space layer 1502 of FIG. 15A, kernel space 1570 which can be implemented for example as kernel space layer 1520 of FIG. 15A, and hardware layer 1590 which can be implemented, for example, as hardware layer 1540 of FIG. 15A.

User space layer 1552 can include several components including an AI agent layer 1560, a control plane 1562, a quarantine manager 1564, an analytics dashboard 1566, and one or more external integrations 1568. The AI agent layer 1560, control plane 1562, quarantine manager 1564, and analytics dashboard 1566 can behave as the AI agent 1510, control plane 1512, quarantine manager 1514, and analytics dashboard 1516 of FIG. 15A. The external integrations 1568 can include SIEM integration, including forward alerts to Splunk and ELK, and correlation with other security events. The external integrations 1568 can include incident response capabilities including PagerDuty notifications and Slack or Microsoft Teams webhooks, and threat intelligence including IOC feed such as Ips and domains, behavioral pattern updates, and ML model retraining data. The external integrations 1568 can communicate with the control plane 1562 to forward alerts and incident responses.

The kernel space 1570 can include several components including eBPF programs 1580, eBPF maps 1582, enforcement layer 1584, and an eBPF infrastructure 1586. For example, these components can be as eBPF programs 1530, eBPF maps 1532, and enforcement layer 1534 in FIG. 15A. The kernel space 1570 can include eBPF infrastructure 1586.

The eBPF programs 1580 can include several specialized programs attached to different kernel hook points, and an ML inference engine as described with reference to eBPF programs 1530 of FIG. 15A. The eBPF programs 1580 can include an XDP network interceptor program, a TC egress filter program, a system call (syscall) monitor program, and an LSM file security program. The XDP (express Data Path) program can attach to the network interface driver, providing an early interception point for network packets. Operating before the kernel network stack processing, XDP programs can analyze packet headers to extract 5-tuple information including source IP, destination IP, source port, destination port, and protocol. The program can correlate packets with agent processes using socket information and evaluates network behavior patterns against established baselines. Upon detecting anomalous patterns such as connections to unusual destinations, excessive connection rates, or large data transfers, the program can immediately drop packets by returning XDP_DROP, enabling wirespeed filtering with sub-100-nanosecond per-packet overhead. The TC (Traffic Control) egress filter program can attach to the network stack egress path, enabling inspection and filtering after kernel network processing but before transmission. This program can provide packet analysis capabilities and can modify packet contents or apply filtering rules. The TC program can monitor outbound data volumes, protocol distributions, and temporal patterns to detect potential data exfiltration attempts.

The syscall monitor can be a system call tracepoint program. System call tracepoint programs can intercept system calls made by agent processes. These programs can extract information about file operations (e.g., open, read, write, close), process management (e.g., fork, exec, clone), inter-process communication (pipe, socket), and resource allocation (e.g., mmap, brk). By analyzing system call sequences and frequencies, the monitor can detect unusual patterns such as rapid file scanning, suspicious process hierarchies, or attempts to access sensitive system resources. LSM hooks can provide fine-grained control over file system operations. The LSM eBPF program can intercept file access attempts and evaluate them against agent-specific access patterns. The program can track file paths, access modes (read/write/execute), and access frequencies to identify anomalies such as attempts to access files outside the agent's normal operational scope or bulk file reading indicative of data harvesting. All eBPF programs can have an architecture of event interception, feature extraction, baseline comparison, and decision making. In some implementations, the programs can enable execution in under 10 microseconds.

The eBPF maps 1582 can include a baseline map, an ML weights map, a quarantine list, a statistics map, and a ring buffer for forensic events. Behavioral baselines can be computed from historical operational data and stored in the baseline map. Each baseline profile can contain multiple statistical measures. Network behavior baselines can include average connection rate, typical destination count, bandwidth utilization, and protocol distribution. File access baselines can capture file path patterns, access frequency distributions, and read/write ratios. System call baselines can record call frequency distributions and common call sequences. Temporal baselines can model time-of-day patterns and operational schedules. Resource baselines can track CPU utilization, memory consumption, and storage access patterns. Baselines can be trained by the control plane

1562 using supervised learning on labeled historical data. The training process can identify normal operational ranges for each measured metric and compute statistical parameters such as means, standard deviations, and percentile values. Training can require observing agent behavior over several hours to days, depending on agent complexity and operational variability. Baselines can be dynamically updated to accommodate legitimate changes in agent behavior over time.

eBPF maps can provide shared memory between eBPF programs and between kernel and user space. The invention employs multiple specialized maps, each optimized or otherwise biased for specific data access patterns. The baseline profile map can be of type BPF_MAP_TYPE_HASH. This hash map can store behavioral baseline profiles keyed by agent identifier. Each value can contain a structure with statistical parameters for all monitored metrics, values for network connection rates, destination counts, bandwidth utilization, file access patterns, system call frequency and sequences, time-of-day operational patterns and agent resource usage statistics including CPU, memory, and/or storage access. The map can enable O(1) lookup complexity with reduced (e.g., submicrosecond) access times due to hash-based indexing and in-memory storage. Map size can scale with the number of monitored agents and in some implementations, require 2-4 kilobytes per agent profile. The ML weights map can be of type BPF_MAP_TYPE_AR-RAY. This array map can store neural network weights and biases indexed by layer identifier. Array maps can provide an access pattern for sequential data. The map can contain three entries corresponding to the three network layers, with each entry holding weight matrices and bias vectors. In some implementations, total map size can be approximately 16 kilobytes for the standard model architecture. The quarantine list map can be of type BPF_MAP_TYPE_HASH. This map can maintain the set of agent identifiers currently under quarantine. eBPF programs can check this map for each event to determine if enforcement actions should be applied. The map can support rapid updates, enabling automatic application or removal of quarantine status. Each entry can reduce required storage, enabling tracking of thousands of quarantined agents with reduced memory overhead. The statistics map can be of type BPF_MAP_TYPE_PERCPU-_HASH. This per-CPU hash map can accumulate performance statistics and operational metrics. Separate per-CPU instances can eliminate lock contention, enabling concurrent updates from multiple CPU cores with reduced synchronization overhead. Statistics can include event counts, anomaly counts, inference latencies, and enforcement actions. The control plane can periodically read and aggregate per-CPU statistics for monitoring and alerting.

The forensic ring buffer can be of type BPF_MAP_TY-PE_RINGBUF. The ring buffer can provide a mechanism for passing detailed event logs from kernel to user space. eBPF programs can write structured records containing event context, feature vectors, anomaly scores, and enforcement decisions. In some implementations, the buffer can operate as a circular queue with configurable size, for example 64 megabytes, providing capacity for millions of events. User space components can poll the buffer asynchronously, consuming events for storage, analysis, and alerting. The ring buffer can reduce the overhead of per-event system calls while maintaining bounded memory usage. Maps can employ atomic operations ensuring consistency under concurrent access from multiple CPU cores. The eBPF verifier can ensure programs cannot corrupt map data or access out-of-bounds memory. Maps can persist across eBPF program reloads, maintaining state continuity during system updates. Model weights can be stored in eBPF array maps indexed by layer identifier. Each map entry can contain the weight matrices and bias vectors for one layer. In some implementations, the total model size can be approximately 16 kilobytes, which can be accommodated within eBPF map memory limits. Weights can be loaded during initialization by the control plane 1562 and can be updated dynamically without reloading eBPF programs, enabling online model updates and continuous learning.

eBPF programs 1580 can access data from the eBPF maps 1582. Upon extracting features from an intercepted event, the eBPF program can retrieve model weights from the array map and perform forward propagation through the network. Matrix multiplications can be implemented using unrolled loops to maximize performance within eBPF instruction limits. In some implementations the computation requires approximately 10,000 floating-point operations and completes in under 6 microseconds on modern processors. The resulting anomaly score can range, for example, from 0.0 (normal) to 1.0 (highly anomalous). In some implementations, weights can be cached in CPU registers to reduce memory access latency. The network architecture can be sized to fit within eBPF instruction limits without requiring helper function calls. Floating-point operations can use hardware acceleration available on modern processors.

eBPF infrastructure 1586 can include a verifier which can ensure safety of the kernel-based management platform by monitoring for crashes, validating memory access, checking termination, and rejecting unsafe programs. In some implementations, eBPF infrastructure 1586 can include a JIT compiler which can compile eBPF bytecode to native machine code.

Figure 16:
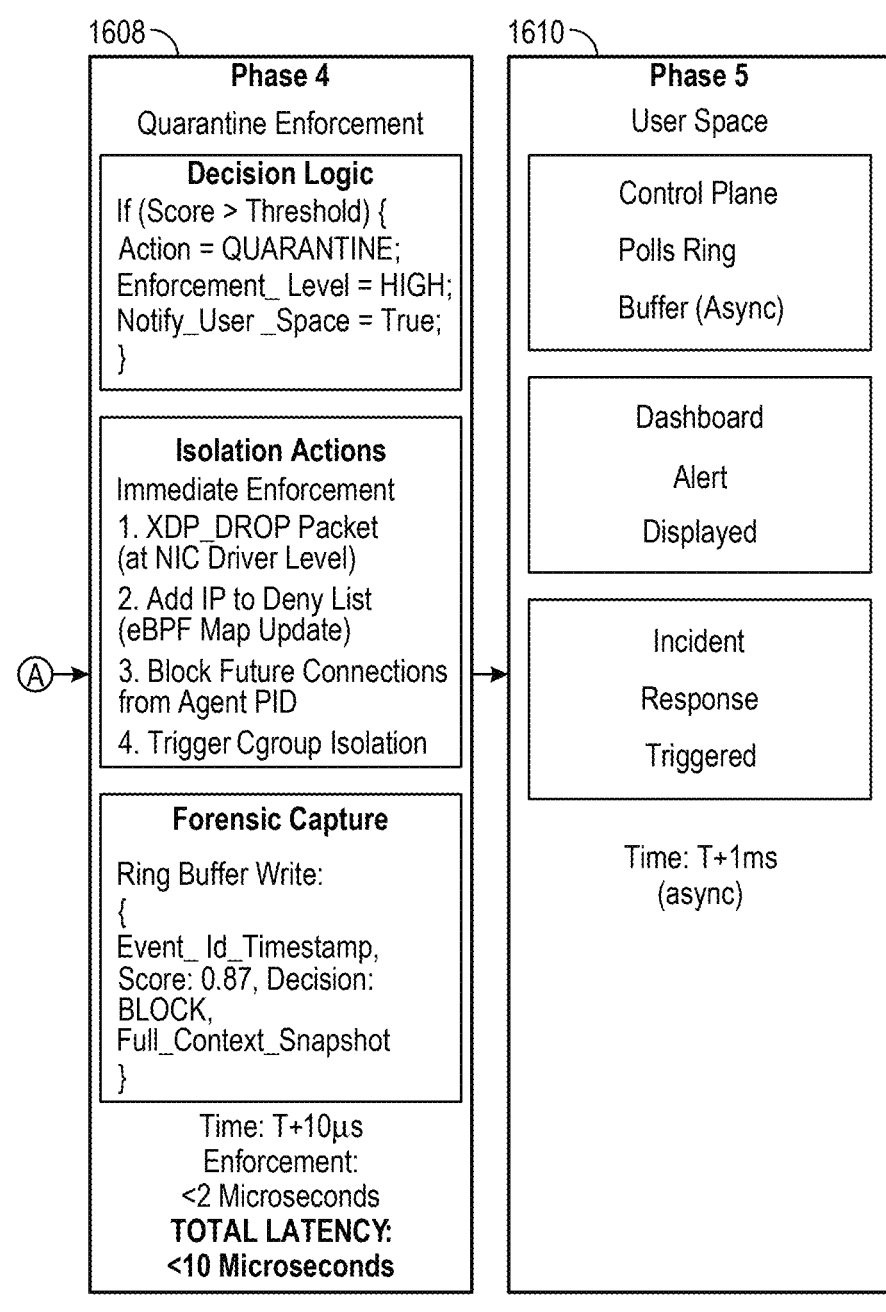
FIG. 16 is a flow diagram showing example phases in a data flow pipeline of an agent anomaly detection and automatic quarantine engine used by a kernel-based management platform, in accordance with some implementations of the present technology.

FIG. 16 is a flow diagram showing phases in an example data flow pipeline 1600 of an agent anomaly detection and automatic quarantine engine used by a kernel-based management platform, in accordance with some implementations of the present technology. The data flow pipeline 1600 can be implemented using components of example computer system 2400 illustrated and described in more detail with reference to FIG. 24. Likewise, implementations of example data flow pipeline 1600 can include different and/or additional components or can be connected in different ways. The anomaly detection process can execute within kernel space for each monitored agent event.

At operation 1602, phase 1 shows agent activity generation with example behaviors and event metadata. For example, an LLM agent action such as an API call to an external service, a file read/write operation, a network data transfer, or process spawning can generate event metadata and activate a kernel hook. The event metadata can generate context including PID, UID, timestamp, source IP, destination IP, and destination port. The action can trigger one of several hook types, including XPD for network data transfers, LSM for file access, or tracepoint for system calls.

At operation 1604, phase 2 shows feature engineering including raw feature extraction and behavioral profile lookup from eBPF maps. The extraction phase can conduct feature engineering including raw feature extraction such as pulling connection rate, data volume, unique destinations count, time of day, system call frequency, file path patterns and process hierarchy depth from event context, behavioral profile lookups, or feature vector construction.

At operation 1606, phase 3 illustrates ML inference including model weight loading and neural network forward pass computation, as well as an example anomaly score output.

At operation 1608, phase 4 shows quarantine enforcement including decision logic, isolation actions at multiple layers, and forensic capture. Upon detecting anomalous agent behavior, the anomaly detection and automatic quarantine engine automatically initiates quarantine measures at the kernel level. These enforcement mechanisms operate within kernel space, ensuring immediate application without user space delays or opportunities for evasion. In some implementations, for network-related anomalies, the XDP eBPF program returns XDP_DROP, instructing the network interface driver to discard the packet immediately without further processing. This action occurs at an early point in the network stack, preventing the packet from reaching higher layers or consuming additional processing resources. XDP drops achieve wire-speed filtering with sub-100-nanosecond per-packet overhead. The program updates the quarantine list map, ensuring subsequent packets from the agent are blocked automatically.

In some implementations, beyond dropping individual packets, the anomaly detection and automatic quarantine engine enables network isolation by maintaining deny lists in eBPF maps. Both XDP and TC programs consult these maps for every packet, blocking network communication from quarantined agents. The isolation encompasses both inbound and outbound traffic, reducing both data exfiltration and command-and-control communication. In some implementations, network isolation takes effect within microseconds of anomaly detection.

In some implementations, LSM and tracepoint eBPF programs block system calls from quarantined agents by returning error codes such as -EPERM (operation not permitted). This filtering prevents file operations, process spawning, inter-process communication, and other potentially harmful activities. The anomaly detection and automatic quarantine engine employs selective filtering, blocking high-risk operations while potentially allowing benign activities like logging, enabling graceful degradation rather than complete process termination.

In some implementations, the anomaly detection and automatic quarantine engine can prevent quarantined agents from spawning new processes or threads. Tracepoint programs attached to fork, clone, and exec system calls check the quarantine list and block execution attempts. This prevents lateral movement where a compromised agent attempts to spread by creating additional processes. In some implementations, LSM hooks intercept file operations and deny access to quarantined agents. This prevents both reading sensitive data and writing malicious payloads or persistence mechanisms. The anomaly detection and automatic quarantine engine can enforce read-only access or complete denial depending on configuration and threat severity. In some implementations, cgroup eBPF programs apply resource constraints to quarantined agents, limiting CPU time, memory allocation, and I/O bandwidth. This prevents resource exhaustion attacks while containing the impact of anomalous behavior. Throttling enables continued agent execution in a restricted capacity for investigative purposes. In some implementations, the quarantine list map serves as the coordination mechanism between different eBPF programs. When a program adds an agent to the quarantine list, other programs automatically begin enforcing restrictions at their respective hook points. This ensures comprehensive isolation without requiring explicit coordination or user space involvement. The atomic map update operations enable consistency across CPU cores.

Enforcement actions can be logged to the ring buffer, providing an audit trail. The anomaly detection and automatic quarantine engine can enable administrators to configure enforcement policies matching their security requirements and risk tolerance. Quarantine can be removed manually by administrators after investigation or automatically after defined time periods.

In some implementations, the anomaly detection and automatic quarantine engine maintains comprehensive forensic capabilities through the ring buffer logging mechanism. Each monitored event can generate a record regardless of whether it triggered an anomaly alert, enabling both incident investigation and continuous system improvement. In some implementations, each forensic record contains multiple components. A unique event identifier enables correlation and deduplication. High-resolution timestamps with nanosecond precision capture exact event timing. The agent identifier links events to specific agents. Full event context includes all parameters and state information available at the kernel hook point. The feature vector shows the exact input used for ML inference. Baseline deviation scores quantify how much each feature diverged from normal. The computed anomaly score provides the ML model's assessment. The enforcement decision records whether and how the anomaly detection and automatic quarantine engine responded. Additional recorded metadata includes CPU core, network flow identifiers, file paths, and/or process hierarchies.

In some implementations, the ring buffer implements a lock-free circular queue shared between kernel and user space. eBPF programs write records using bpf_ringbuf_output, which copies data from the eBPF program stack to the ring buffer. The operation completes asynchronously without blocking the eBPF program. When the buffer reaches capacity, older events are overwritten, enabling bounded memory usage. The buffer size is configurable, typically set to 64 megabytes, providing capacity for several million events depending on record size. In some implementations, user space components poll the ring buffer using epoll or similar mechanisms to detect available data. Upon wake-up, the consumer reads batches of events efficiently without per-event system calls. Consumed events are processed for storage in persistent databases, real-time alerting, dashboard updates, and analytics. The polling frequency can be tuned to balance latency and CPU overhead (e.g., with values ranging from 10 to 100 milliseconds).

The collected forensic data can enable multiple analysis workflows. Incident investigation can trace the complete sequence of events leading to and following a security incident. Behavioral analysis can identify patterns and trends in agent behavior over time. False positive analysis can examine incorrectly flagged events to improve detection accuracy. Performance profiling can measure system latencies and identify optimization opportunities. Compliance reporting can generate audit logs demonstrating security controls and incident response.

In some implementations, the forensic data is persisted to long-term storage for historical analysis and compliance requirements. The anomaly detection and automatic quarantine engine supports configurable retention periods and data aging policies. Compressed storage and efficient indexing enable querying of historical data without performance degradation. The stored data serves as training data for ML model updates and baseline retraining. The anomaly detection and automatic quarantine engine can provide visibility into agent behavior and security decisions without impacting detection performance.

At operation 1610, phase 5 depicts user space components including control plane polling, dashboard alerts, and incident responses, which are triggered asynchronously based on forensic event data from the kernel, enabling alerting, visualization, and initiation of security operations (e.g. in real-time or near real-time) without introducing latency into the detection and enforcement path.

Figure 17:
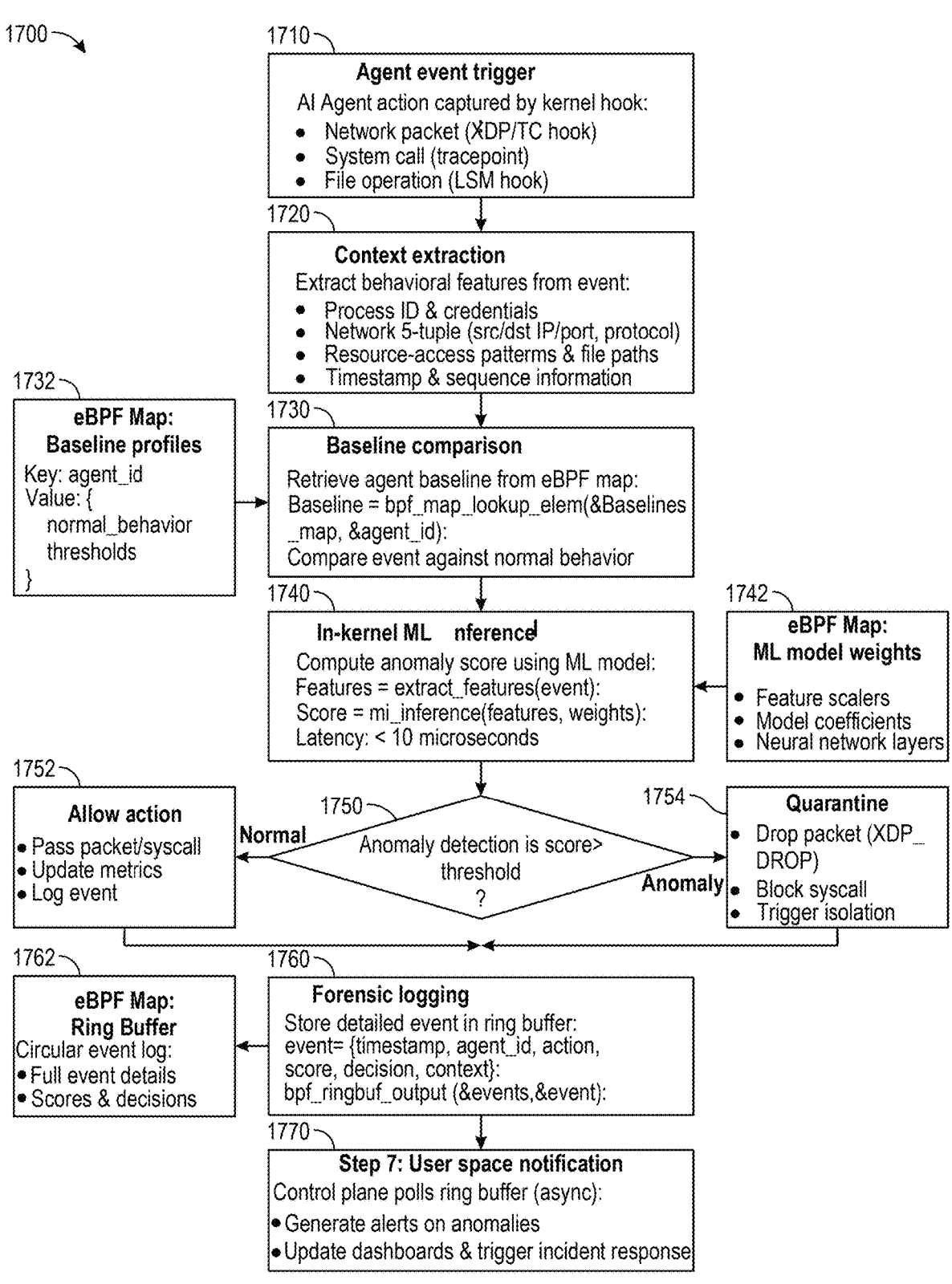
FIG. 17 is a flow diagram illustrating an example process of an agent anomaly detection and automatic quarantine engine used by a kernel-based management platform, in accordance with some implementations of the present technology.

FIG. 17 is a flow diagram illustrating an example process 1700 of an agent anomaly detection and automatic quarantine engine used by a kernel-based management platform, in accordance with some implementations of the present technology. The process 1700 can be implemented using components of example computer system 2400 illustrated and described in more detail with reference to FIG. 24. Likewise, implementations of example process 1700 can include different and/or additional components or can be connected in different ways.

The example flow proceeds through seven steps: event trigger from agent activity, context extraction including behavioral features, baseline comparison using eBPF map lookups, in-kernel ML inference computing anomaly scores, anomaly detection decision logic, forensic logging to ring buffer, and user space notification for alerting. The diagram shows the data structures accessed at each phase and the timing characteristics of each step. Decision branches illustrate the different paths for normal versus anomalous events, with normal events passing through and anomalous events triggering quarantine actions. Timing annotations show the cumulative latency at each phase, demonstrating the total sub-10-microsecond response time from event to enforcement.

In operation 1710, an agent action triggers one or more kernel hooks where eBPF programs are attached. For network operations, XDP or TC hooks fire. For file operations, LSM hooks trigger. For system calls, tracepoint hooks activate. The kernel invokes the attached eBPF program, passing event context including process identifiers, credentials, and operation-specific parameters. For example, the kernel-based management platform can intercept, using a kernel interface, a function invocation (e.g. an agent operation request) transmitted from an AI application (e.g. an agent). The kernel interface can be configured to manage communications with a kernel of the operating system. The function invocation can represent a request to execute a function set using the kernel.

In operation 1720, The eBPF program extracts relevant contextual information from the kernel event structure. For network events, this includes source and destination addresses, ports, protocol, and payload size. For file events, it includes file paths, access modes, and file attributes. For system calls, it includes call type, arguments, and return values. The program retrieves process information including PID, UID, parent process, and timestamps. For example, the kernel-based management platform can identify, using a system hook corresponding to the function invocation, a function profile associated with the function invocation. The function profile can include the contextual information from the kernel event structure. This extraction phase completes in under 1 microsecond.

In operation 1730, using the agent identifier extracted from the process context, the program performs a hash map lookup to retrieve the agent's behavioral baseline profile. The program can retrieve the hash map from eBPF map 1732, which can be embodied as eBPF maps 1582, for example. In some implementations, the lookup operation completes in under 500 nanoseconds because of the BPF-_MAP_TYPE_HASH type. The program can extract the baseline statistical parameters of the agent. For example, the kernel-based management platform can retrieve a first plurality of parameters associated with the AI application. The program compares extracted event features against baseline statistical parameters, computing deviation scores for each feature. Features exhibiting significant deviations from baseline are flagged for detailed analysis.

In operation 1740, the program constructs a feature vector from the extracted context and baseline comparison results. For example, the kernel-based management platform can generate a feature vector based on a comparison of the first plurality of parameters and a second plurality of features derived from the function profile. In some implementations, this 32-dimensional vector undergoes normalization to the [0, 1] range. The program retrieves ML model weights from the array map, for example eBPF map 1742 which can be embodied as eBPF maps 1582, for example, and executes forward propagation through the neural network. The inference computation (e.g., approximately 10,000 floating-point operations) completes in a reduced timeframe (e.g., in under 6 microseconds) due to direct kernel memory access where eBPF programs can read model weights and feature data directly from kernel memory addresses without the overhead of system calls, memory copying, or context switching between user and kernel space that would introduce latency penalties. The output sigmoid activation can generate an anomaly score (e.g., categorical, binary, continuous), such as a score between 0.0 and 1.0. For example, the kernel-based management platform can input, into a machine learning model, the feature vector to obtain an anomaly metric for the function invocation.

In operation 1750, the program compares the computed anomaly score against the configured threshold, for example set at 0.75. For example, the kernel-based management platform can determine whether the anomaly metric meets an anomaly threshold. In some implementations, if the score exceeds the threshold, the event is classified as anomalous and triggers quarantine actions 1754. For example, the kernel-based management platform can quarantine the AI application based on determining that the anomaly metric meets the anomaly threshold. Quarantining the AI application can include dropping packets from the AI application and/or blocking a system call from the AI application. If the score falls below the threshold, the event is classified as normal and the operation proceeds to allow action 1752 without interference. The decision process completes near-instantly through simple comparison operations.

In operation 1760, regardless of the decision outcome, the program writes a detailed event record to the ring buffer eBPF map 1762 (which can be embodied as eBPF maps 1582, for example) for forensic analysis. The record contains the full event context, extracted features, baseline deviations, anomaly score, and enforcement decision. Ring buffer writes execute asynchronously without blocking the eBPF program, ensuring low latency impact. Each record can consume, for example, approximately 512 bytes that includes an event context portion (process identifier, thread identifier, user identifier, timestamp, system call number or operation type, additional metadata), one or more extracted features, baseline deviation information, anomaly score and/or confidence metrics, enforcement decision information (e.g., decision outcome, quarantine flags, restriction types, decision reasoning), and/or other metadata.

In operation 1770, user space components poll the ring buffer to retrieve forensic events. Upon detecting anomalous events, the control plane triggers alerts to dashboards and external systems. In some implementations, polling intervals range from 10 to 100 milliseconds, providing near-real-time visibility while minimizing CPU overhead. The entire detection process from event trigger to decision completes in under 10 microseconds for typical events. This sub-10-microsecond latency enables real-time or near real-time threat mitigation, preventing damage that would occur during the millisecond-scale delays inherent in user space alternatives.

The anomaly detection and automatic quarantine engine can enable strong security properties by virtue of its kernel-level implementation and eBPF safety mechanisms. Operating in kernel space provides inherent protection against tampering by user space processes, including compromised agents. User space processes cannot directly access or modify kernel memory where eBPF programs and maps reside. Only privileged operations through the bpf system call can interact with eBPF objects, and these operations require appropriate capabilities or root access. Even with root privileges, the eBPF verifier can prevent loading malicious programs that could corrupt the anomaly detection and automatic quarantine engine. The eBPF verifier can perform static analysis on eBPF programs before allowing them to load, ensuring they cannot crash the kernel, access unauthorized memory, enter infinite loops, or violate security policies. These guarantees prevent both accidental bugs and intentional exploits from compromising system integrity. The verifier's formal analysis provides mathematically provable safety properties.

The anomaly detection and automatic quarantine engine can operate completely independently of monitored agents. Agents cannot detect or interfere with eBPF programs monitoring their behavior. This can prevent evasion attempts and ensure comprehensive visibility even for sophisticated threats. The kernel provides complete isolation between agent processes and eBPF programs. All map operations can employ atomic instructions ensuring consistency under concurrent access. Race conditions can be eliminated through hardware-supported atomic primitives. This can guarantee that security decisions are based on consistent data regardless of concurrent modifications from multiple sources.

The anomaly detection and automatic quarantine engine presents a minimal attack surface. The only interface between agents and the anomaly detection and automatic quarantine engine is the implicit monitoring through kernel hooks, which agents cannot disable or bypass. Control plane interactions occur through carefully validated system calls. The anomaly detection and automatic quarantine engine implements principle of least privilege, granting only necessary capabilities to each component. These security properties ensure that the anomaly detection and automatic quarantine engine remains reliable and effective even in the presence of sophisticated adversaries or compromised agents. The kernel-level implementation with eBPF safety mechanisms provides a robust foundation for enterprise security monitoring.

The implementation of neural network inference within eBPF programs can enable real-time anomaly scoring without the latency penalty of userspace communication. Model weights and behavioral baselines are stored in eBPF maps, providing zero-copy access and sub-microsecond lookup times. The anomaly detection and automatic quarantine engine maintains per-agent behavioral profiles that capture normal operational patterns including network communication rates, file access patterns, system call sequences, and resource utilization metrics. Upon detecting anomalous behavior exceeding configurable thresholds, the anomaly detection and automatic quarantine engine automatically initiates quarantine procedures directly at the kernel level. Network isolation is achieved through XDP_DROP actions at the network interface driver level, blocking packets with sub-100-nanosecond latency. System call filtering prevents file operations and process creation. Cgroup-based resource constraints limit CPU and memory access. These enforcement mechanisms operate entirely within kernel space, eliminating the vulnerability window present in user space solutions. The anomaly detection and automatic quarantine engine incorporates comprehensive forensic capabilities through eBPF ring buffers that capture detailed event logs including full context snapshots, anomaly scores, enforcement decisions, and temporal sequences. This forensic data enables post-incident analysis and continuous improvement of detection models.

Kernel-Level Policy Enforcement Using the Kernel-Based Management Platform

Figure 18:
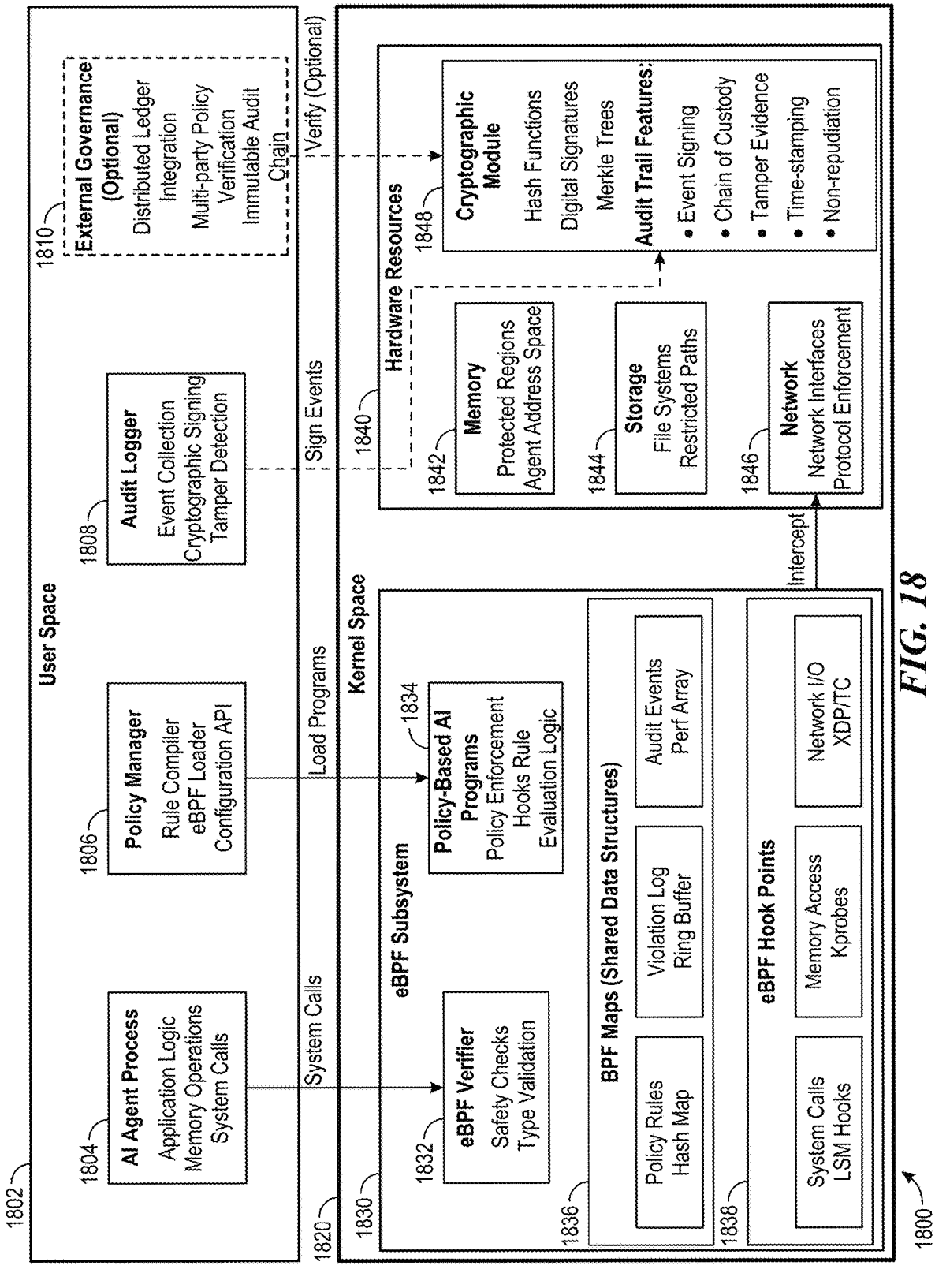
FIG. 18 is a block diagram showing an example of a system architecture for a guideline-based security engine used by a kernel-based management platform, in accordance with some implementations of the present technology.

FIG. 18 is a block diagram showing an example of a system architecture 1800 for a guideline-based security engine used by a kernel-based management platform, in accordance with some implementations of the present technology. The architecture 1800 can be implemented using components of example computer system 2400 illustrated and described in more detail with reference to FIG. 24. Likewise, implementations of example architecture 1800 can include different and/or additional components or can be connected in different ways.

The system architecture 1800 can include two primary execution domains: user space layer 1802 and kernel space layer 1820. User space layer 1802 can include an AI agent process 1804, policy manager 1806, audit logger 1808, and in some implementations external governance integration 1810. The kernel space layer 1820 can include an eBPF subsystem 1830 and hardware resources 1840. The eBPF subsystem 1830 can include an eBPF verifier 1832, programs 1834, BPF maps 1836, and eBPF hook points 1838. The hardware resources 1840 can include memory module 1842, storage module 1844, network module 1846, and cryptographic module 1848.

In user space layer 1802, the AI agent process 1804 can be the autonomous software entity whose operations are subject to the operational boundaries of the guidelines. The AI Agent Process can execute application-level logic and initiate system calls to interact with hardware resources such as memory, storage, and network interfaces.

The policy manager 1806 can operate in user space and is responsible for receiving high-level guidelines (e.g., constitutional AI rules) from administrators or governance systems. The policy manager 1806 can include a rule compiler that transforms these high-level policy specifications into eBPF C code, which is subsequently compiled into eBPF bytecode. The policy manager 1806 can further include an eBPF loader component that interfaces with the kernel's eBPF subsystem to load the compiled programs and attach them to appropriate hook points.

The audit logger 1808 can collect policy enforcement events from the kernel space eBPF programs and process them for long-term storage and analysis. The audit logger can implement cryptographic signing of events using digital signature algorithms such as Ed25519 or ECDSA, ensuring non-repudiation and tamper evidence. The audit logger can maintain event logs in an append-only structure, wherein each event record includes a hash of the previous event, forming a hash chain that provides integrity guarantees.

Optionally, the architecture 1800 can include external governance integration 1810 with distributed ledger technologies. In embodiments requiring multi-party policy verification, the kernel-based management platform can periodically anchor Merkle tree roots representing batches of audit events to a blockchain or distributed consensus network. This integration can provide decentralized verification capabilities and enable multiple independent parties to validate policy enforcement history without trusting a single authority.

In kernel space layer 1820, the eBPF subsystem 1830 can provide the execution environment for policy enforcement programs. The eBPF verifier 1832 can be embodied as eBPF verifier 212, for example. The eBPF verifier 1832 can perform static analysis on incoming eBPF programs to ensure they satisfy safety constraints, including bounded execution time, no arbitrary memory access, prohibition of unbounded loops, and type safety. The eBPF verifier 1832 can employ abstract interpretation and symbolic execution techniques to prove program safety before allowing kernel space execution.

The programs 1834 can be eBPF programs specifically designed to implement the guidelines (e.g., constitutional AI rules). These programs can be attached to various hook points, which can include LSM hooks for security-critical operations, kprobes for arbitrary kernel function interception, tracepoints for stable kernel instrumentation interfaces, and XDP/TC hooks for network packet processing.

BPF maps 1836 can be kernel data structures that store policy rules, violation logs, audit events, and runtime state. These maps can support various data structure types including hash maps (e.g., for O(1) policy rule lookup), ring buffers for lock-free event streaming to user space, perf arrays for high-performance event collection, and arrays for fixed-size metadata storage. BPF Maps 1836 can enable communication between multiple eBPF programs and between kernel space and user space without requiring expensive system calls for each data access by providing shared memory regions that are accessible from both execution contexts through memory-mapped interfaces. BPF maps, rather than using per-access overhead, establish persistent shared memory mappings where user space processes can directly read from and write to kernel memory regions that include the map data structures via memory load and store instructions. The shared memory approach enables eBPF programs executing in kernel space to update map contents through direct memory writes using helper functions (e.g., bpf_map_update_elem( )), while user space applications can access (e.g., in parallel, simultaneously, concurrently) the same data using memory-mapped file descriptors.

The hardware resources 1840 can be the physical and logical resources that AI agents may attempt to access. Memory module 1842 can include memory regions in both user space and kernel space. Storage module 1844 can include file systems and storage devices. Network module 1846 can include network interfaces. The eBPF-based enforcement mechanism can intercept all access attempts to these resources, evaluating them against the guidelines before permitting operations to proceed.

Figure 19:
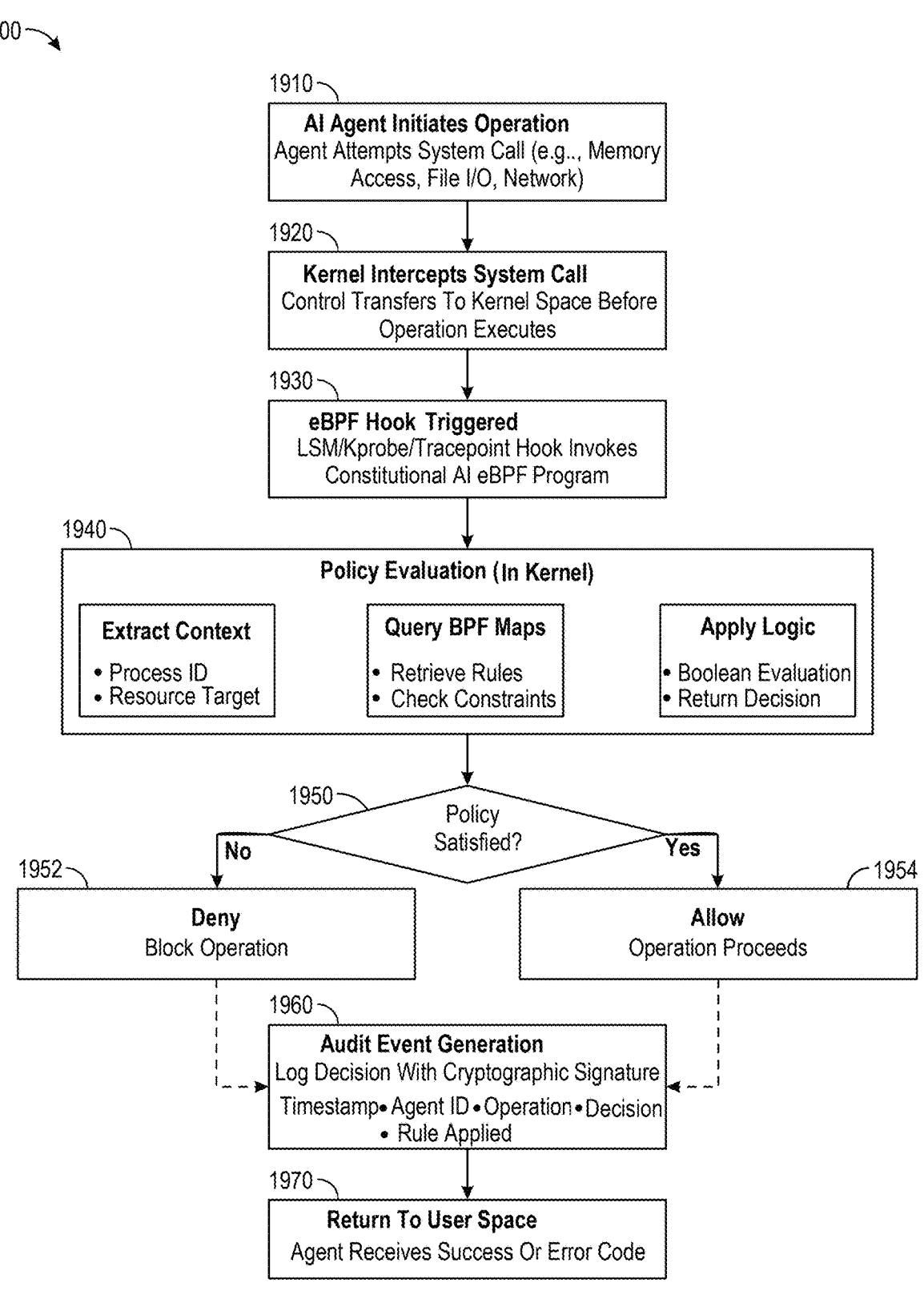
FIG. 19 is a flow diagram illustrating an example process of a guideline-based security engine used by a kernel-based management platform, in accordance with some implementations of the present technology.

FIG. 19 is a flow diagram illustrating an example process of a guideline-based security engine used by a kernel-based management platform, in accordance with some implementations of the present technology. The process 1900 can be implemented using components of example computer system 2400 illustrated and described in more detail with reference to FIG. 24. Likewise, implementations of example process 1900 can include different and/or additional components or can be connected in different ways. The guideline-based security engine used by a kernel-based management platform can operate through a series of sequential steps that can evaluate every security-relevant operation against the guidelines.

In operation 1910, the AI agent initiates an operation that requires interaction with system resources. This can include memory access operations such as mmap( ) or read( ), file I/O operations such as open( ), read( ), or write( ), network operations such as socket( ), connect( ), or send( ), or process management operations such as fork( ), exec( ), or ptrace( ). For example, the function invocation (e.g. operation initiation) can represent a request to execute a function set using the kernel.

In operation 1920, the AI agent operation triggers a system call that transitions execution from user mode to kernel mode. For example, the kernel-based management platform can intercept, using a kernel interface, a function invocation (e.g. the AI agent operation) transmitted from an AI application (e.g. the AI agent). The kernel interface can be configured to manage communications with the kernel of the operating system. This transition occurs before any security checks in traditional systems, creating a window of vulnerability. The subsequent eBPF-based enforcement can occur immediately upon kernel entry, before any substantive operation processing.

In operation 1930, the kernel invokes registered eBPF programs attached to relevant hook points, for example programs 1834. For memory access operations, this can involve LSM hooks such as security_file_mmap( ) or security_mmap_addr( ) For file operations, hooks such as security_file_permission( ) or security_inode_permission( ) are triggered. For network operations, XDP or TC classifier programs are invoked. In some implementations, he hook invocation is a lightweight operation typically requiring fewer than 100 nanoseconds, as the eBPF program is executed directly within the kernel call path.

In operation 1940, the guidelines are evaluated within the eBPF program's kernel space execution context. The program first extracts relevant context information, including the process identifier (PID) of the initiating process, the user identifier (UID), the target resource address or identifier, the specific operation type (read, write, execute, etc.), and any additional metadata relevant to policy evaluation. For example, the kernel-based management platform can extract, from the function invocation, an invocation context associated with the function invocation. The program then queries BPF maps, for example BPF maps 1836 to retrieve applicable policy rules using hash map lookups that provide O(1) expected time complexity. For example, the kernel-based management platform can extract, from the function invocation, a plurality of application parameters associated with the AI application. Finally, the program applies Boolean logic to evaluate whether the proposed operation satisfies the operative boundaries of the guidelines. For example, the kernel-based management platform can compare the plurality of application parameters associated with the AI application with a plurality of allowable parameters associated with the invocation context. The plurality of allowable parameters can indicate a set of AI applications authorized to invoke the function.

The eBPF program returns a decision indicator to the kernel at 1950, in some implementations represented as an integer where 0 indicates permission to proceed and negative values (e.g., -EPERM, -EACCES) indicate denial. If the policy is satisfied, execution proceeds to operation 1954 where the operation is allowed. If the policy is violated, execution proceeds to operation 1952 where the operation is blocked. For example, the kernel-based management platform can determine, based on comparing the plurality of application parameters associated with the AI application with a plurality of allowable parameters associated with the invocation context, that the plurality of application parameters does not match the plurality of allowable parameters. Based on determining that the plurality of application parameters does not match the plurality of allowable parameters, the kernel-based management platform can block the function invocation from being executed. This decision is atomic and occurs within the kernel call path before any resource access occurs, providing strong security guarantees.

In operation 1960, irrespective of the allow/deny decision, an audit event is generated and recorded, for example by the audit logger 1808. The audit event structure includes a high-precision timestamp (nanosecond resolution), the agent process identifier, the specific guideline that was evaluated, the decision outcome (allow or deny), the target resource identifier, and operation-specific metadata. For example, the kernel-based management platform can generate an event indicating that the function invocation was blocked. The event can include one or more of the plurality of application parameters that do not match This event is written to a BPF ring buffer for transfer to user space, where the audit logger 1808 retrieves it for cryptographic signing and persistent storage.

In operation 1970, execution returns to user space with the kernel providing either a success return code (operation completed) or an error code (operation denied). From the AI agent's perspective, denied operations appear as standard system call failures (e.g., EPERM error), providing no indication that the guideline enforcement is occurring at the kernel level, enabling the prevention of agents from detecting or attempting to circumvent the enforcement mechanism.

FIG. 20 is a block diagram showing an example rules transformation process 2000 for a guideline-based security engine used by a kernel-based management platform, in accordance with some implementations of the present technology. The transformation process 2000 can be implemented using components of example computer system 2400 illustrated and described in more detail with reference to FIG. 24. Likewise, implementations of example transformation process 2000 can include different and/or additional components or can be connected in different ways. In particular, transformation process 2000 illustrates a process of transforming high-level guidelines into executable eBPF kernel programs. This transformation bridges the semantic gap between policy intent and kernel-level enforcement.

Policy definition 2002 shows an example set of guidelines. The guidelines can be expressed in a high-level policy language that supports logical operators (AND, OR, NOT), conditional expressions (IF-THEN-ELSE), quantifiers (FORALL, EXISTS), and set membership operations. An exemplary rule specification might state: 'IF agent.process_id=TARGET_AGENT AND target_addr IN RESTRICTED_MEMORY_RANGE THEN DENY', which encodes the constraint that the specified agent shall not access certain memory regions.

The process can advance to eBPF bytecode compiler 2004. This rule compiler component parses the high-level specifications and generates eBPF C source code. This compilation process involves several steps. First, policy rules are analyzed to determine which BPF maps are required for efficient runtime evaluation. Second, the compiler generates optimized or otherwise biased lookup sequences, potentially reordering or factoring logical expressions to minimize map accesses. Third, the compiler inserts appropriate eBPF helper function calls for context extraction, map lookups, and result computation. The generated C code is compiled to eBPF bytecode using the LLVM compiler infrastructure with the BPF backend. In some implementations, the resulting bytecode consists of instructions from the eBPF instruction set architecture, which includes 64-bit registers, arithmetic operations, memory loads and stores, conditional branches, and function calls to approved kernel helper functions.

Prior to loading into the kernel, the eBPF bytecode must pass verification by the eBPF verifier of the kernel runtime eBPF subsystem 2006. The verifier performs comprehensive safety analysis including bounded loop verification ensuring all loops have compile-time bounded iteration counts, pointer safety verification ensuring no arbitrary memory dereferences occur, termination proof ensuring programs complete in finite time, helper function validation ensuring only approved kernel functions are called, and register state tracking ensuring type consistency across all execution paths.

If verification succeeds, the eBPF program is loaded into the kernel and attached to the appropriate hook points. The program is JIT-compiled to native machine code for efficient execution. Multiple eBPF programs can be loaded simultaneously, each enforcing different aspects of the guidelines. These programs share access to common BPF maps, enabling coordination and state sharing.

eBPF data structures 2008 illustrates several BPF maps used in some implementations of the present technology. BPF maps used in implementations include: (hash maps storing policy rules indexed by rule identifier, with values containing rule metadata such as memory address ranges, operation types, and enforcement actions, ring buffers for lock-free event streaming from kernel to user space, enabling high-throughput audit logging, array maps for agent metadata, storing per-agent information such as allowed resource sets and policy versions, and per-CPU maps for lock-free concurrent access in multi-processor systems.

Figure 21:
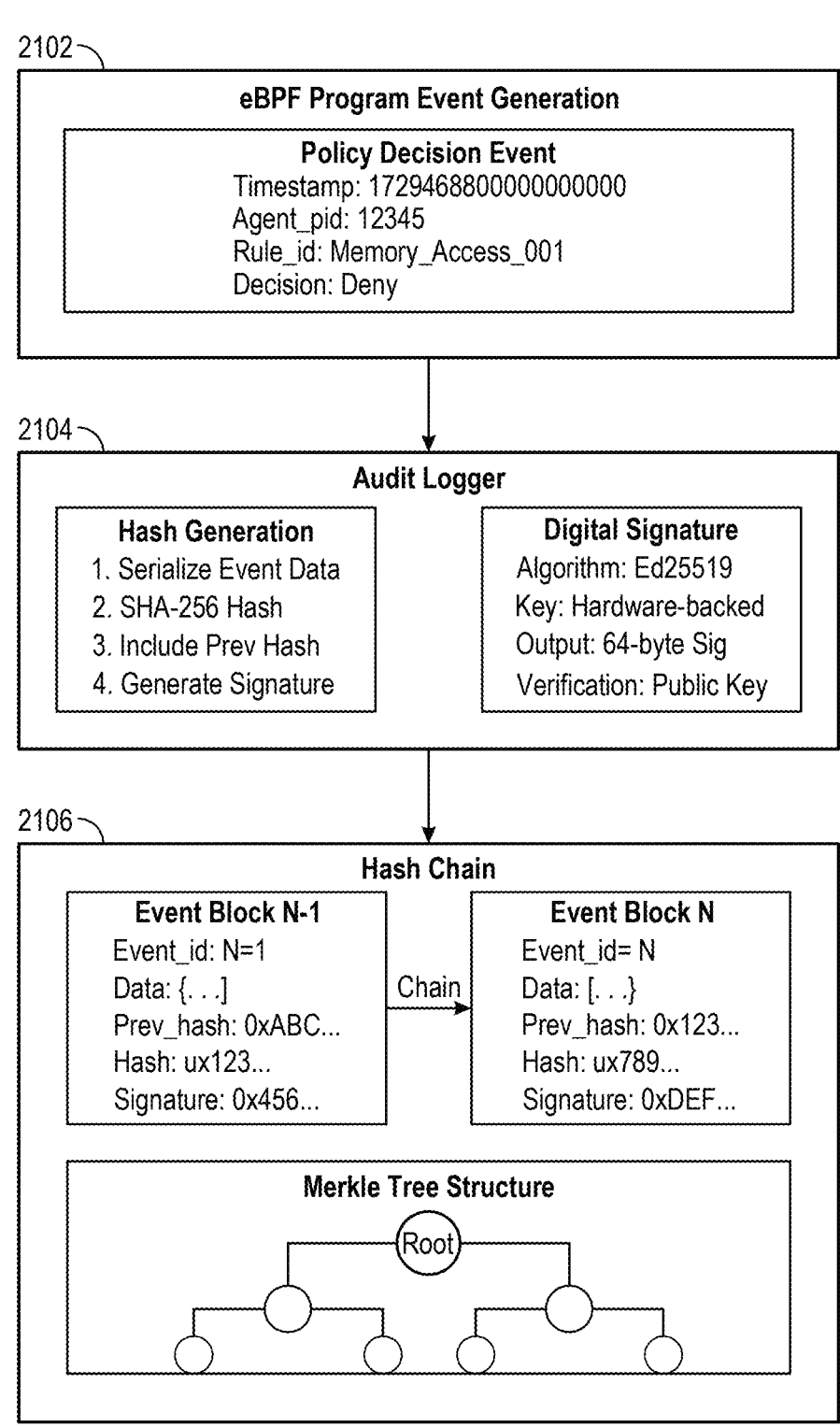
FIG. 21 is a flow diagram illustrating an example of a cryptographic audit trail architecture for a guideline-based security engine used by a kernel-based management platform, in accordance with some implementations of the present technology.

FIG. 21 is a flow diagram illustrating an example of a cryptographic audit trail architecture for a guideline-based security engine using a kernel-based management platform, in accordance with some implementations of the present technology. The architecture 2100 can be implemented using components of example computer system 2400 illustrated and described in more detail with reference to FIG. 24. Likewise, implementations of example architecture 2100 can include different and/or additional components or can be connected in different ways. The cryptographic audit trail provides tamper-evident logging of all policy enforcement decisions, enabling forensic analysis, compliance verification, and accountability in AI agent operations.

During eBPF program event generation 2102, when an eBPF program makes a policy enforcement decision, it can generate an audit event structure containing the timestamp, agent identifier, rule identifier, decision outcome, and operation details. This event can initially be stored in a BPF ring buffer within kernel space.

The audit logger 2104 running in user space can continuously poll the ring buffer to retrieve new events. Upon receiving an event, the audit logger 2104 can perform several cryptographic operations. First, the event data is serialized into a canonical format to ensure consistent hashing. Second, a cryptographic hash of the event is computed using SHA-256 or SHA-3, producing a 256-bit or higher digest.

Each event can include the hash of the immediately preceding event, creating a hash chain 2106 where any modification to a historical event would invalidate all subsequent event hashes. This construction is analogous to blockchain technology and enables similar tamper-evident properties.

The audit logger 2104 can generate a digital signature over the event hash using a private key accessible only to the kernel or a trusted hardware security module (HSM). The signature algorithm can be Ed25519, ECDSA with P-256 curve, or RSA with 2048-bit or larger keys, depending on security requirements and performance constraints. The resulting signature can be stored alongside the event, enabling any party with access to the corresponding public key to verify the authenticity and integrity of the audit record.

To further enhance verifiability, the kernel-based management platform can construct a Merkle tree over batches of audit events. Each leaf node of the Merkle tree can represent the hash of a single event, while internal nodes represent hashes of their children's concatenated values. The root hash of the Merkle tree can provide a compact commitment to an entire batch of events, enabling efficient proof-of-inclusion for any individual event.

In implementations requiring distributed governance, the Merkle tree root hash can be periodically anchored to a blockchain or distributed ledger. This anchoring process can involve submitting a transaction to the distributed network containing the root hash and a timestamp. Once confirmed by network consensus, this can create an immutable public record that can be independently verified by any stakeholder. The anchoring frequency can be adjusted based on security requirements and transaction costs.

FIG. 22 is a block diagram illustrating a use case 2200 for a guideline-based security engine used by a kernel-based management platform, in accordance with one or more implementations of the present technology. The use case 2200 can be implemented using components of example computer system 2400 illustrated and described in more detail with reference to FIG. 24. Likewise, implementations of use case 2200 can include different and/or additional components or can be connected in different ways. Use case 2200 demonstrates the invention's operation in preventing unauthorized memory access by a compromised AI agent. The scenario in block 2202 illustrates how the guidelines enforced at the kernel level provide security guarantees that cannot be achieved through application-level mechanisms.

In use case 2200, an AI agent deployed to perform data analysis on user space data structures has the guideline which includes the operative boundary: 'The agent shall not access kernel memory regions.' This constraint is encoded as a policy rule in the eBPF-based enforcement system, specifying that any attempt by the agent process to read from or write to memory addresses in the kernel address space (typically 0xFFFF800000000000 and above on x86-64 systems) must be denied.

In use case 2200, an attacker exploits a vulnerability in the AI agent's code to inject malicious instructions that attempt to read sensitive kernel memory. Specifically, at block 2204, the compromised agent attempts to execute: memcpy (buffer, 0xFFFFFFFF81000000, 4096), seeking to copy 4096 bytes from a kernel address into a user space buffer under the attacker's control.

When the agent process executes this operation, at block 2206 it invokes a system call (in this case, the read system call or direct memory mapping via mmap) that transitions execution into kernel space. At block 2208, before any actual memory access occurs, the kernel invokes the eBPF program attached to the relevant LSM hook (e.g., security-_file_mmap for memory mapping operations).

At block 2210 the eBPF program extracts the operation context, determining that the requesting process has PID 12345 (the AI agent), the target address is 0xFFFFFFFF81000000 (within kernel space), and the operation type is read. The program queries the BPF hash map containing policy rules and retrieves the applicable constraint: 'IF agent.process_id==12345 AND target_addr>=0xFFFF800000000000 THEN DENY'.

The eBPF program evaluates the Boolean expression and determines that the condition is satisfied: the process is indeed the AI agent (PID 12345) and the target address is within the restricted kernel range. Consequently, at block 2212 the program returns-EPERM (Permission Denied) to the kernel, causing the system call to fail before any memory access occurs.

Simultaneously, at block 2214 the eBPF program generates an audit event recording the violation attempt. This event includes: timestamp=1729468800000000000 (nanosecond precision), agent_pid=12345, rule_id=MEMORY_ACCESS_001, decision=DENY, attempted_address=0xFFFFFFFF81000000, operation_type=READ. The event is written to a BPF ring buffer and subsequently retrieved by the user space Audit Logger, in some implementations embodied as Audit Logger 2104.

The audit logger cryptographically signs the event and adds it to the immutable audit chain. The event now serves as forensic evidence of the attempted policy violation, complete with mathematical proof of its authenticity. Security personnel can analyze this event to determine whether the agent was compromised, whether the policy rules require refinement, or whether the attempt represents a false positive that should inform policy adjustments.

From the AI agent's perspective, the system call simply fails at block 2216 with EPERM, identical to a conventional permission denial. The agent cannot determine that the guideline enforcement is occurring, cannot circumvent the mechanism by modifying its own code (as enforcement occurs in kernel space), and cannot tamper with the audit trail (as it is cryptographically signed). The present technology can provide numerous technical advantages over existing AI safety and security approaches. By enforcing the guidelines in kernel space using eBPF, the kernel-based management platform can ensure that policy enforcement cannot be bypassed, disabled, or modified by the AI agent process, even if that process is fully compromised by an attacker. The eBPF verifier's safety measures can prevent even privileged users from loading programs that could circumvent enforcement.

Moreover, the kernel-based management platform requires no cooperation or voluntary compliance from the AI agent. Enforcement can be mandatory and automatic, occurring transparently in the kernel call path. This can eliminate the fundamental trust assumption present in application-level safety frameworks. eBPF programs execute as native machine code directly within the kernel, with typical execution times measured in tens to hundreds of nanoseconds. Policy evaluation can occur inline with system call processing, introducing negligible latency compared to traditional security mechanisms such as virtualization or heavy-weight sandboxing.

The ability to attach eBPF programs to arbitrary kernel hook points can enable precise control over specific operations. Policies can be defined at the granularity of individual system calls, specific memory address ranges, particular network destinations, or specific file system paths, providing flexibility that coarse-grained mechanisms cannot achieve. eBPF programs and BPF maps can be updated at runtime without requiring process restarts or system reboots. This can enable dynamic policy refinement in response to emerging threats or changing operational requirements while maintaining continuous enforcement.

The cryptographic audit trail can provide mathematical proof of policy compliance or violations. Unlike conventional logs that can be modified by privileged users, the hash-chained and digitally-signed audit records can provide non-repudiable evidence suitable for regulatory compliance, forensic investigation, and legal proceedings.

Example Implementation of the Models of the Kernel-Based Management Platform

Figure 23:
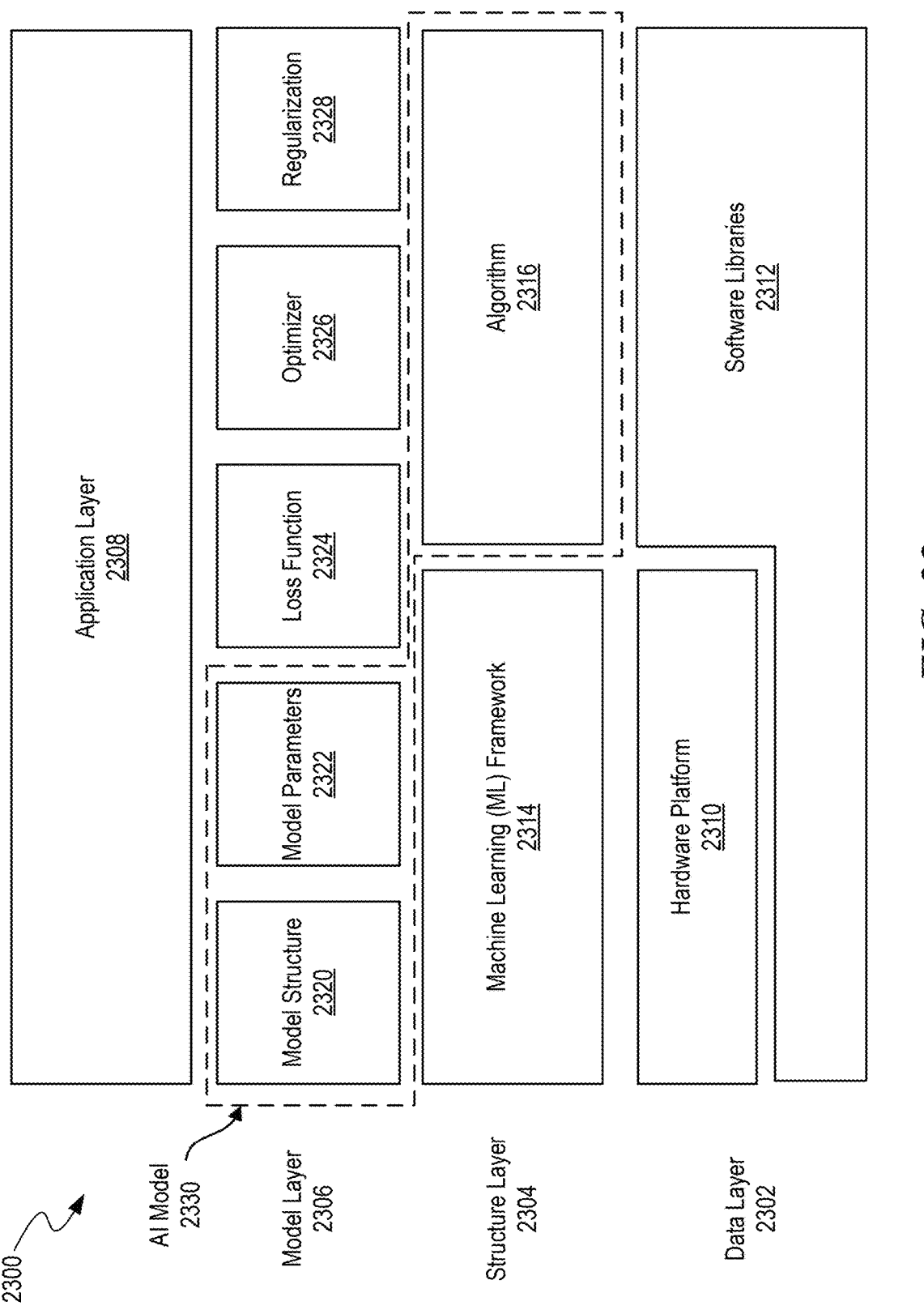
FIG. 23 illustrates a layered architecture of an AI system that can implement the machine learning models of a kernel-based management platform, in accordance with some implementations of the present technology.

FIG. 23 illustrates a layered architecture of an AI system 2300 that can implement the ML models of the kernel-based management platform in accordance with some implementations of the present technology. Example ML models can include the models executed by the kernel-based management platform, such as behavioral analysis engine 108 and/or the threat detection module 114. Accordingly, the behavioral analysis engine 108 and/or the threat detection module 114 can include one or more components of the AI system 2300.

As shown, the AI system 2300 can include a set of layers, which conceptually organize elements within an example network topology for the AI system's architecture to implement a particular AI model. Generally, an AI model is a computer-executable program implemented by the AI system 2300 that analyses data to make predictions. Information can pass through each layer of the AI system 2300 to generate outputs for the AI model. The layers can include a data layer 2302, a structure layer 2304, a model layer 2306, and an application layer 2308. The algorithm 2316 of the structure layer 2304 and the model structure 2320 and model parameters 2322 of the model layer 2306 together form an example AI model. The optimizer 2326, loss function engine 2324, and regularization engine 2328 work to refine and optimize the AI model, and the data layer 2302 provides resources and support for application of the AI model by the application layer 2308.

The data layer 2302 acts as the foundation of the AI system 2300 by preparing data for the AI model. As shown, the data layer 2302 can include two sub-layers: a hardware platform 2310 and one or more software libraries 2312. The hardware platform 2310 can be designed to perform operations for the AI model and include computing resources for storage, memory, logic and networking, such as the resources described in relation to FIGS. 24 and 25. The hardware platform 2310 can process amounts of data using one or more servers. The servers can perform backend operations such as matrix calculations, parallel calculations, machine learning (ML) training, and the like. Examples of servers used by the hardware platform 2310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 2310 can include computing resources, (e.g., servers, memory, etc.) offered by a cloud services provider. The hardware platform 2310 can include computer memory for storing data about the AI model, application of the AI model, and training data for the AI model. The computer memory can be a form of random-access memory (RAM), such as dynamic RAM, static RAM, and non-volatile RAM.

The software libraries 2312 can be thought of as suites of data and programming code, including executables, used to control the computing resources of the hardware platform 2310. The programming code can include low-level primitives (e.g., fundamental language elements) that form the foundation of one or more low-level programming languages, such that servers of the hardware platform 2310 can use the low-level primitives to carry out specific operations. The low-level programming languages do not require much, if any, abstraction from a computing resource's instruction set architecture, enabling them to run quickly with a small memory footprint. Examples of software libraries 2312 that can be included in the AI system 2300 include INTEL Math Kernel Library, NVIDIA cuDNN, EIGEN, and OpenBLAS.

The structure layer 2304 can include an ML framework 2314 and an algorithm 2316. The ML framework 2314 can be thought of as an interface, library, or tool that enables users to build and deploy the AI model. The ML framework 2314 can include an open-source library, an API, a gradient-boosting library, an ensemble method, and/or a deep learning toolkit that work with the layers of the AI system to facilitate development of the AI model. For example, the ML framework 2314 can distribute processes for application or training of the AI model across multiple resources in the hardware platform 2310. The ML framework 2314 can include a set of pre-built components that have the functionality to implement and train the AI model and enable users to use pre-built functions and classes to construct and train the AI model. Thus, the ML framework 2314 can be used to facilitate data engineering, development, hyperparameter tuning, testing, and training for the AI model. Examples of ML frameworks 2314 that can be used in the AI system 2300 include TENSORFLOW, PYTORCH, SCIKIT-LEARN, KERAS, LightGBM, RANDOM FOREST, and AMAZON WEB SERVICES.

The algorithm 2316 can be an organized set of computer-executable operations used to generate output data from a set of input data and can be described using pseudocode. The algorithm 2316 can include complex code that enables the computing resources to learn from new input data and create new/modified outputs based on what was learned. In some implementations, the algorithm 2316 can build the AI model through being trained while running computing resources of the hardware platform 2310. This training enables the algorithm 2316 to make predictions or decisions without being explicitly programmed to do so. Once trained, the algorithm 2316 can run at the computing resources as part of the AI model to make predictions or decisions, improve computing resource performance, or perform tasks. The algorithm 2316 can be trained using supervised learning, unsupervised learning, semi-supervised learning, and/or reinforcement learning.

Using supervised learning, the algorithm 2316 can be trained to learn patterns (e.g., map input data to output data) based on labeled training data. The training data can be labeled by an external user or operator. For instance, a user can collect a set of training data, such as by capturing data from sensors, images from a camera, outputs from a model, and the like. In an example implementation, training data can include native-format data collected (e.g., in the form of operational data in FIG. 1) from various source computing systems described in relation to FIG. 23. Furthermore, training data can include pre-processed data generated by various engines of the kernel-based management platform described in relation to FIG. 23. The user can label the training data based on one or more classes and train the AI model by inputting the training data to the algorithm 2316. The algorithm determines how to label the new data based on the labeled training data. The user can facilitate collection, labeling, and/or input via the ML framework 2314. In some instances, the user can convert the training data to a set of feature vectors for input to the algorithm 2316. Once trained, the user can test the algorithm 2316 on new data to determine if the algorithm 2316 is predicting accurate labels for the new data. For example, the user can use cross-validation methods to test the accuracy of the algorithm 2316 and retrain the algorithm 2316 on new training data if the results of the cross-validation are below an accuracy threshold.

Supervised learning can include classification and/or regression. Classification techniques include teaching the algorithm 2316 to identify a category of new observations based on training data and are used when input data for the algorithm 2316 is discrete. Said differently, when learning through classification techniques, the algorithm 2316 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 2316 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 2316 is continuous. Regression techniques can be used to train the algorithm 2316 to predict or forecast relationships between variables. To train the algorithm 2316 using regression techniques, a user can select a regression method for estimating the parameters of the model. The user collects and labels training data that is input to the algorithm 2316 such that the algorithm 2316 is trained to understand the relationship between data features and the dependent variable(s). Once trained, the algorithm 2316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 2316 learns patterns from unlabeled training data. In particular, the algorithm 2316 is trained to learn hidden patterns and insights of input data, which can be used for data exploration or for generating new data. Here, the algorithm 2316 does not have a predefined output, unlike the labels output when the algorithm 2316 is trained using supervised learning. Said another way, unsupervised learning is used to train the algorithm 2316 to find an underlying structure of a set of data, group the data according to similarities, and represent that set of data in a compressed format. The kernel-based management platform can use unsupervised learning to identify patterns in claim history (e.g., to identify particular event sequences) and so forth. In some implementations, performance of the kernel-based management platform that can use unsupervised learning is improved because the incoming memories (e.g., operational data in FIG. 1) is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based include methods, hierarchical based methods, partitioning methods, and grid-based methods. In one example, the algorithm 2316 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 2316 can be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that can be used by the algorithm 2316 include factor analysis, item response theory, latent profile analysis, and latent class analysis.

The model layer 2306 implements the AI model using data from the data layer and the algorithm 2316 and ML framework 2314 from the structure layer 2304, thus enabling decision-making capabilities of the AI system 2300. The model layer 2306 includes a model structure 2320, model parameters 2322, a loss function engine 2324, an optimizer 2326, and a regularization engine 2328.

The model structure 2320 describes the architecture of the AI model of the AI system 2300. The model structure 2320 defines the complexity of the pattern/relationship that the AI model expresses. Examples of structures that can be used as the model structure 2320 include decision trees, support vector machines, regression analyses, Bayesian networks, Gaussian processes, genetic algorithms, and artificial neural networks (or, simply, neural networks). The model structure 2320 can include a number of structure layers, a number of nodes (or neurons) at each structure layer, and activation functions of each node. Each node's activation function defines how the node converts data received to data output. The structure layers can include an input layer of nodes that receive input data, an output layer of nodes that produce output data. The model structure 2320 can include one or more hidden layers of nodes between the input and output layers. The model structure 2320 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 2322 represent the relationships learned during training and can be used to make predictions and decisions based on input data. The model parameters 2322 can weight and bias the nodes and connections of the model structure 2320. For instance, when the model structure 2320 is a neural network, the model parameters 2322 can weight and bias the nodes in each layer of the neural networks, such that the weights determine the strength of the nodes and the biases determine the thresholds for the activation functions of each node. The model parameters 2322, in conjunction with the activation functions of the nodes, determine how input data is transformed into desired outputs. The model parameters 2322 can be determined and/or altered during training of the algorithm 2316.

The loss function engine 2324 can determine a loss function, which is a metric used to evaluate the AI model's performance during training. For instance, the loss function engine 2324 can measure the difference between a predicted output of the AI model and the actual output of the AI model and is used to guide optimization of the AI model during training to minimize the loss function. The loss function can be presented via the ML framework 2314, such that a user can determine whether to retrain or otherwise alter the algorithm 2316 if the loss function is over a threshold. In some instances, the algorithm 2316 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 2326 adjusts the model parameters 2322 to minimize the loss function during training of the algorithm 2316. In other words, the optimizer 2326 uses the loss function generated by the loss function engine 2324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Basis Function (RBF) and Limited-memory BFGS (L-BFGS). The type of optimizer 2326 used can be determined based on the type of model structure 2320 and the size of data and the computing resources available in the data layer 2302.

The regularization engine 2328 executes regularization operations. Regularization is a technique that prevents over- and under-fitting of the AI model. Overfitting occurs when the algorithm 2316 is overly complex and too adapted to the training data, which can result in poor performance of the AI model. Underfitting occurs when the algorithm 2316 is unable to recognize even basic patterns from the training data such that it cannot perform well on training data or on validation data. The optimizer 2326 can apply one or more regularization techniques to fit the algorithm 2316 to the training data properly, which helps constrain the resulting AI model and improves its ability for generalized application. Examples of regularization techniques include lasso (L1) regularization, ridge (L2) regularization, and elastic (L1 and L2 regularization).

The application layer 2308 describes how the AI system 2300 is used to solve problems or perform tasks. In an example implementation, the application layer 2308 can include a front-end user interface of the kernel-based management platform.

Example Computing Environment of the Kernel-Based Management Platform

FIG. 24 is a block diagram showing some of the components typically incorporated in at least some of the computer systems 2400 and other devices on which the disclosed system operates in accordance with some implementations of the present technology. As shown, an example computer system 2400 can include: one or more processors 2402, main memory 2406, non-volatile memory 2410, a network interface device 2412, video display device 2418, an input/output device 2420, a control device 2422 (e.g., keyboard and pointing device), a drive unit 2424 that includes a machine-readable medium 2426, and a signal generation device 2430 that are communicatively connected to a bus 2416. The bus 2416 represents one or more physical buses and/or point-to-point connections that are connected by appropriate bridges, adapters, or controllers. Various common components (e.g., cache memory) are omitted from FIG. 24 for brevity. Instead, the computer system 2400 is intended to illustrate a hardware device on which components illustrated or described relative to the examples of the figures and any other components described in this specification can be implemented.

The computer system 2400 can take any suitable physical form. For example, the computer system 2400 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 2400. In some implementations, the computer system 2400 can be an embedded computer system, a system-on-chip (SOC), a single-board computer system (SBC) or a distributed system such as a mesh of computer systems or include one or more cloud components in one or more networks. Where appropriate, one or more computer systems 2400 can perform operations in real time, near real time, or in batch mode.

The network interface device 2412 enables the computer system 2400 to exchange data in a network 2414 with an entity that is external to the computing system 2400 through any communication protocol supported by the computer system 2400 and the external entity. Examples of the network interface device 2412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2406, non-volatile memory 2410, machine-readable medium 2426) can be local, remote, or distributed. Although shown as a single medium, the machine-readable medium 2426 can include multiple media (e.g., a centralized/distributed database and/or associated caches and servers) that store one or more sets of instructions 2428. The machine-readable (storage) medium 2426 can include any medium that is capable of storing, encoding, or carrying a set of instructions for execution by the computer system 2400. The machine-readable medium 2426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2408, 2428) set at various times in various memory and storage devices in computing device(s). When read and executed by the processor 2402, the instruction(s) cause the computer system 2400 to perform operations to execute elements involving the various aspects of the disclosure.

Figure 25:
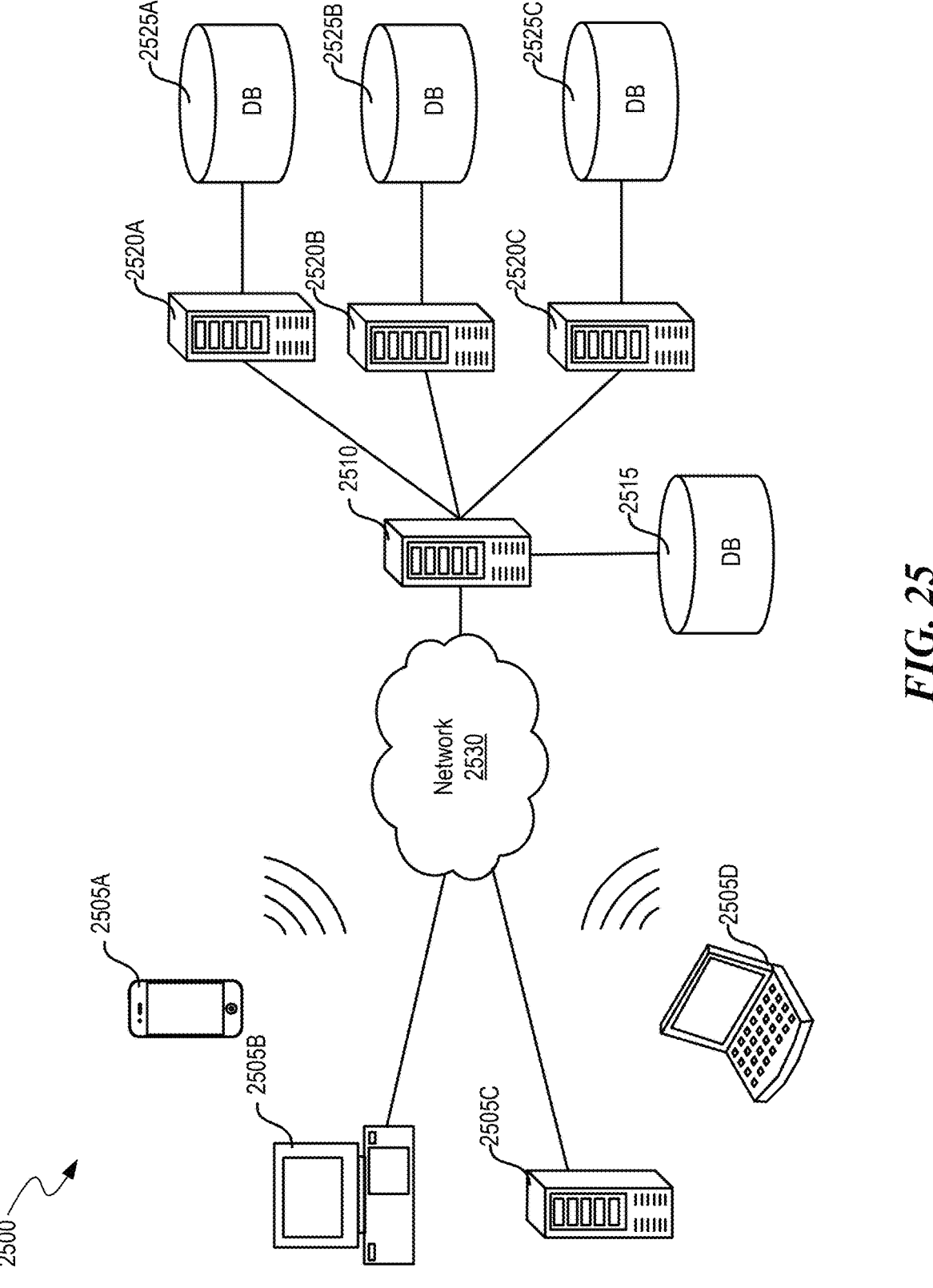
FIG. 25 is a system diagram illustrating an example of a computing environment in which the kernel-based management platform operates, in accordance with some implementations of the present technology.

FIG. 25 is a system diagram illustrating an example of a computing environment in which the disclosed system operates in some implementations. In some implementations, environment 2500 includes one or more client computing devices 2505A-D, examples of which can host the kernel-based management platform of FIG. 12. Client computing devices 2505 operate in a networked environment using logical connections through network 2530 to one or more remote computers, such as a server computing device.

In some implementations, server computing device 2510 is an edge server which receives client requests and coordinates fulfillment of those requests through other servers, such as servers 2520A-C. In some implementations, server computing devices 2510 and 2520 comprise computing systems, such as the kernel-based management platform of FIG. 12. Though each server computing device 2510 and 2520 is displayed logically as a single server, server computing devices can each be a distributed computing environment encompassing multiple computing devices located at the same or at geographically disparate physical locations. In some implementations, each server computing device 2520 corresponds to a group of servers.

Client computing devices 2505 and server computing devices 2510 and 2520 can each act as a server or client to other server or client devices. In some implementations, servers (2510, 2520A-C) connect to a corresponding database (2515, 2525A-C). As discussed above, each server computing device 2520 can correspond to a group of servers, and each of these servers can share a database or can have its own database. Databases 2515 and 2525 warehouse (e.g., store) information such as claims data, email data, call transcripts, call logs, policy data and so on. Though databases 2515 and 2525 are displayed logically as single units, databases 2515 and 2525 can each be a distributed computing environment encompassing multiple computing devices, can be located within their corresponding server, or can be located at the same or at geographically disparate physical locations.

Network 2530 can be a local area network (LAN) or a wide area network (WAN), but can also be other wired or wireless networks. In some implementations, network 2530 is the Internet or some other public or private network. Client computing devices 2505 are connected to network 2530 through a network interface, such as by wired or wireless communication. While the connections between server computing device 2510 and server computing devices 2520 are shown as separate connections, these connections can be any kind of local, wide area, wired, or wireless network, including network 2530 or a separate public or private network.

ADDITIONAL EXAMPLES

The following examples are illustrative of several implementations of the present technology:

1. A non-transitory computer-readable storage medium comprising instructions stored thereon for tracking artificial intelligence (AI) application data operations using kernel commands, wherein the instructions when executed by at least one data processor of a system, cause the system to:
   intercept, using a kernel interface, a function invocation transmitted from an AI application,
      wherein the kernel interface is configured to manage communications with a kernel of an operating system, and
      wherein the function invocation represents a request to execute a function set using the kernel;
   determine, using a system hook corresponding to the function invocation, that the AI application has requested a data operation corresponding to a subset of data accessible by the operating system;
   generate a data access event record for the function invocation,
      wherein the data access event record comprises one or more access parameters defining the data operation and one or more agent parameters defining the AI application;
   generate a data package for the function invocation, wherein the data package comprises the data access event record encoded into a distributed ledger format; and
   cause transmission of the data package to a distributed ledger, wherein the distributed ledger is configured to commit the data package across multiple nodes.

2. A non-transitory computer-readable storage medium comprising instructions stored thereon for blocking unauthorized artificial intelligence (AI) applications from kernel operations, wherein the instructions when executed by at least one data processor of a system, cause the system to:
   intercept, using a kernel interface, a function invocation transmitted from an AI application,
      wherein the kernel interface is configured to manage communications with a kernel of an operating system, and
      wherein the function invocation represents a request to execute a function set using the kernel;
   extract, from the function invocation, a plurality of application parameters associated with the AI application and an invocation context associated with the function invocation;
   compare the plurality of application parameters associated with the AI application with a plurality of allowable parameters associated with the invocation context, wherein the plurality of allowable parameters define a set of AI applications authorized to invoke the function;
   determine, based on the comparing, that the plurality of application parameters does not match the plurality of allowable parameters;

based on determining that the plurality of application parameters does not match the plurality of allowable parameters, block the function invocation from being executed; and
   generate an event indicating that the function invocation was blocked, wherein the event comprises an indication that one or more of the plurality of application parameters do not match.

3. A non-transitory computer-readable storage medium comprising instructions stored thereon for quarantining artificial intelligence (AI) applications using kernel commands, wherein the instructions when executed by at least one data processor of a system, cause the system to:
   intercept, using a kernel interface, a function invocation transmitted from an AI application,
      wherein the kernel interface is configured to manage communications with a kernel of an operating system, and
      wherein the function invocation represents a request to execute a function set using the kernel;
   identify, using a system hook corresponding to the function invocation, a function profile associated with the function invocation;
   retrieve a first plurality of parameters associated with the AI application;
   generate a feature vector based on a comparison of the first plurality of parameters and a second plurality of features derived from the function profile;
   input, into a machine learning model, the feature vector to obtain an anomaly metric for the function invocation;
   determine whether the anomaly metric satisfies an anomaly constraint; and
   quarantine the AI application based on determining that the anomaly metric satisfies the anomaly constraint, wherein quarantining comprises dropping packets from the AI application or blocking a system call from the AI application.

4. A non-transitory computer-readable storage medium comprising instructions stored thereon for managing resource allocation for artificial intelligence (AI) applications using kernel commands, wherein the instructions when executed by at least one data processor of a system, cause the system to:
   intercept, using a kernel interface, a function invocation transmitted from an AI application associated with AI application metadata that comprises at least one of: an application identifier, a resource priority level, or an allocation parameter,
      wherein the kernel interface is configured to manage communications with a kernel of an operating system, and
      wherein the function invocation represents a request to execute a function set using the kernel;
   identify, using a system hook corresponding to the function invocation, a resource allocation request associated with the function invocation,
      wherein the resource allocation request indicates that the AI application has requested allocation of one or more resources accessible by the operating system;
   map, using the AI application metadata, the AI application to an application-specific rule set that is maintained by the kernel;
   apply the application-specific rule set to the resource allocation request to generate one or more resource allocation metrics for the one or more resources requested by the AI application;

determine whether to execute the function set associated with the function invocation based on the one or more resource allocation metrics meeting an execution constraint set; and in response to determining that the one or more resource allocation metrics meet the execution threshold, cause execution of the function set associated with the function invocation using the kernel of the operating system, wherein the kernel is configured to allocate the one or more resources to the AI application in accordance with the resource allocation request.

5. A computer-implemented method for performing one or more operations recited in examples 1-4.

6. A system for performing one or more operations recited in examples 1-4.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 1212 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system for managing resource allocation for artificial intelligence (AI) applications using kernel commands, comprising:

at least one hardware processor; and at least one non-transitory memory storing instructions, which, when executed by the at least one hardware processor, cause the system to:

intercept, using a system hook associated with a kernel interface configured to manage communications with a kernel of an operating system, a function invocation transmitted from an AI application associated with AI application metadata, wherein the AI application metadata comprises at least one of: an application identifier, a resource priority level, or an allocation parameter, wherein the function invocation represents a request to execute a function set using the kernel, and wherein the system hook comprises an extended Berkeley Packet Filter (eBPF) program that is executed by the kernel to intercept the function invocation;

identify, using the system hook, a resource allocation request associated with the function invocation, wherein the resource allocation request indicates that the AI application has requested allocation of one or more resources accessible by the operating system;

map, using the AI application metadata, the AI application to an application-specific rule set that is maintained by the kernel based on the eBPF program, wherein the application-specific rule set defines a specific resource quota allocated for the AI application;

apply the application-specific rule set to the resource allocation request to generate one or more resource allocation metric values for the one or more resources requested by the AI application;

determine whether to execute the function set associated with the function invocation based on the one or more resource allocation metric values meeting an execution constraint set;

in response to determining that the one or more resource allocation metric values meet the execution constraint set, cause execution of the function set associated with the function invocation using the kernel of the operating system, wherein the kernel is configured to allocate the one or more resources to the AI application in accordance with the resource allocation request; and in response to determining that the one or more resource allocation metric values fail to meet the execution constraint set, throttle the AI application by blocking at least a portion of the resource allocation request.

2. The system of claim 1, wherein the one or more resources include: a processor time, a memory allocation value, a storage capacity value, a network bandwidth value, or a graphics processing unit (GPU) utilization value.

3. The system of claim 1, wherein the system is further caused to:

determine at least one system load metric including one or more of: a Central Processing Unit (CPU) utilization value, an I/O congestion value, or a network saturation value; and determine an aggregate load score using the at least one system load metric.

4. The system of claim 3, wherein the system is further caused to:

adjust a resource exchange rate for the one or more resources using the aggregate load score, wherein the resource exchange rate is mapped to one or more zones that each correspond to a different system load level.

5. The system of claim 1, wherein the eBPF program executes within kernel space to intercept the function invocation.

6. A non-transitory computer-readable storage medium comprising instructions stored thereon for managing resource allocation for artificial intelligence (AI) applications using kernel commands, wherein the instructions when executed by at least one data processor of a system, cause the system to:

intercept, using a system hook associated with a kernel interface configured to manage communications with a kernel of an operating system, a function invocation transmitted from an AI application associated with AI application metadata, wherein the function invocation represents a request to execute a function set using the kernel, wherein the AI application metadata comprises at least one of: an application identifier, a resource priority level, or an allocation parameter, and wherein the system hook comprises an extended Berkeley Packet Filter (eBPF) program that is executed by the kernel to intercept the function invocation;

identify, using the system hook, a resource allocation request associated with the function invocation, wherein the resource allocation request indicates that the AI application has requested allocation of one or more resources accessible by the operating system;

associate, using the AI application metadata, the AI application to an application-specific rule set that is maintained by the kernel based on the eBPF program, wherein the application-specific rule set defines a specific resource quota allocated for the AI application;

apply the application-specific rule set to the resource allocation request to generate one or more resource allocation metric values for the one or more resources requested by the AI application;

determine whether to execute the function set associated with the function invocation based on the one or more resource allocation metric values satisfying an execution constraint set;

in response to determining that the one or more resource allocation metric values satisfy the execution constraint set, cause execution of the function set associated with the function invocation using the kernel of the operating system, wherein the kernel is configured to allocate the one or more resources to the AI application in accordance with the resource allocation request; and in response to determining that the one or more resource allocation metric values fail to satisfy the execution constraint set, throttle the AI application by blocking at least a portion of the resource allocation request.

7. The non-transitory computer-readable storage medium of claim 6, wherein the eBPF program executes within kernel space to intercept the function invocation.

8. The non-transitory computer-readable storage medium of claim 7, wherein the eBPF program is attached to one or more kernel hooks including one or more of: a scheduler hook, a memory allocation hook, a block I/O hook, or a network hook.

9. The non-transitory computer-readable storage medium of claim 6, wherein the resource quota representing a maximum value of resource consumption for the AI application.

10. The non-transitory computer-readable storage medium of claim 6, wherein the execution constraint set includes a predefined threshold, and wherein the instructions further cause the system to:

generate a billing event when a resource usage value associated with the AI application exceeds the predefined threshold, wherein the billing event includes one or more of: an agent identifier, the resource usage value, or a cost value corresponding to the resource usage value.

11. The non-transitory computer-readable storage medium of claim 10, wherein the instructions further cause the system to:

generate a cryptographic proof for the billing event by:

applying one or more hash operations to the billing event by generating a cryptographic hash of the billing event, and linking the cryptographic hash to a previous hash of a previous billing event to form a hash chain.

12. The non-transitory computer-readable storage medium of claim 6, wherein the instructions further cause the system to:

store the one or more resource allocation metric values in a kernel-accessible data structure comprising one or more eBPF maps.

13. The non-transitory computer-readable storage medium of claim 12, wherein the instructions further cause the system to:

record a start timestamp when the AI application is scheduled to execute; and determine an elapsed resource consumption value using a difference between a current timestamp and the start timestamp.

14. A computer-implemented method for managing resource allocation for artificial intelligence (AI) applications using kernel commands, the computer-implemented method comprising:

intercepting, using a system hook associated with a kernel interface configured to manage communications with a kernel of an operating system, a function invocation transmitted from an AI application associated with AI application metadata, wherein the function invocation represents a request to execute a function set using the kernel, wherein the AI application metadata comprises at least one of: an application identifier, a resource priority level, or an allocation parameter, and wherein the system hook comprises an extended Berkeley Packet Filter (eBPF) program that is executed by the kernel to intercept the function invocation;

identifying, using the system hook, a resource allocation request associated with the function invocation, wherein the resource allocation request indicates that the AI application has requested allocation of one or more resources accessible by the operating system;

linking, based on the AI application metadata, the AI application to a criterion set that is maintained by the kernel based on the eBPF program, wherein the criterion set defines a specific resource quota allocated for the AI application;

applying the criterion set to the resource allocation request to generate one or more resource allocation metric values for the one or more resources requested by the AI application;

determining whether to cause execution of the function set associated with the function invocation based on the one or more resource allocation metric values satisfying an execution constraint set; and in response to determining that the one or more resource allocation metric values satisfy the execution constraint set, cause execution of the function set associated with the function invocation using the kernel of the operating system, wherein the kernel is configured to allocate the one or more resources to the AI application in accordance with the resource allocation request; and in response to determining that the one or more resource allocation metric values fail to satisfy the execution constraint set, throttle the AI application by blocking at least a portion of the resource allocation request.

15. The computer-implemented method of claim 14, wherein the eBPF program executing within kernel space.

16. The computer-implemented method of claim 14, wherein the criterion set is stored in a data structure maintained by the kernel that associates the AI application metadata with a maximum allowed resource consumption value for one or more resource types.

17. The computer-implemented method of claim 14, further comprising:

determining a resource delta value representing an incremental resource consumption by the AI application between two timestamps; and updating a data structure accessible by the kernel with an indication of the resource delta value.

18. The computer-implemented method of claim 14, further comprising:

determining that the one or more resource allocation metric values fail to satisfy the execution constraint set; and in response to determining that the one or more resource allocation metric values fail to satisfy the execution constraint set, generating a billing event, wherein the billing event indicates one or more of: an application identifier associated with the AI application, a resource usage value, or a cost value corresponding to the resource usage value.

19. The computer-implemented method of claim 18, further comprising:

generating a cryptographic hash of the billing event;

retrieving a previous hash value associated with a previous billing event; and linking the billing event to the previous billing event by including the previous hash value in the billing event to generate a hash chain.

20. The computer-implemented method of claim 14, further comprising:

in response to determining that the one or more resource allocation metric values fail to satisfy the execution constraint set, managing the AI application by performing one or more of: causing a scheduling delay, causing transmission of a memory allocation failure, queuing a storage operation, or restricting a network bandwidth allocation.

* * * * *